United States Patent [19]

Chugo et al.

[11] Patent Number: 5,425,019

[45] Date of Patent: Jun. 13, 1995

[54] CALL ACCOMMODATION SYSTEM CONTAINING EMERGENT CALLS AND NORMAL CALLS

[75] Inventors: Akira Chugo; Masafumi Katoh; Ichiro Iida; Kazuo Sakagawa; Yoshihiro Watanabe; Toshio Soumiya, all of Kawasaki, Japan

[73] Assignee: Fujitsu Limited, Kanagawa, Japan

[21] Appl. No.: 123,453

[22] Filed: Sep. 17, 1993

[30] Foreign Application Priority Data

Aug. 20, 1993 [JP] Japan ................... 5-205964

[51] Int. Cl.⁶ ............ H04J 3/26; H04L 1/22
[52] U.S. Cl. ..................... 370/16; 370/17; 370/94.1
[58] Field of Search ............ 370/13, 14, 16, 17, 370/79, 80, 85.6, 54; 340/825.01, 827; 371/8.1, 8.2, 11.1, 11.2, 20.1, 20.2

[56] References Cited

U.S. PATENT DOCUMENTS

| | | | |
|---|---|---|---|
| 4,953,157 | 8/1990 | Franklin et al. | 370/94.1 X |
| 5,040,171 | 8/1991 | Osaki | 370/17 |
| 5,077,730 | 12/1991 | Arrowood et al. | 370/16 |
| 5,093,824 | 3/1992 | Coan et al. | 370/16 |
| 5,153,877 | 10/1992 | Esaki et al. | 370/13 X |
| 5,163,042 | 11/1992 | Ochiai | 370/17 |
| 5,189,662 | 2/1993 | Kleine-Altekamp | 370/16 |
| 5,280,470 | 1/1994 | Buhrke et al. | 370/17 X |

Primary Examiner—Melvin Marcelo

[57] ABSTRACT

The present invention is designed such that the communication quality of a currently connected normal call is deteriorated and the transmission of the normal call is delayed in a network when an emergent call is set. As a result, the required bandwidth of the emergent call is successfully reserved. Furthermore, the present invention is designed such that a deteriorated normal call is detoured to a detour circuit to improve the communication quality of the normal call. In the detouring process, one or more detour circuits are managed for each normal call so that the possibility of a successful detour to a detour circuit can be raised. Additionally, in the normal call detouring process, a plurality of detour circuits guarantee a normal call its communication quality even if a single detour circuit is not enough to meet the required bandwidth of a normal call.

31 Claims, 52 Drawing Sheets

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/ OUT-OF-USE FLAG | VCI | OUTPUT LINK | RELAY LINK | IN-USE/ OUT-OF-USE FLAG |
| NODE B | VC1 | ab | IN-USE | VC5 | ac | cb | IN-USE |
| | VC2 | ab | OUT-OF-USE | VC6 | ac | cb | OUT-OF-USE |
| | VC3 | ab | OUT-OF-USE | | | | |
| | VC4 | ab | OUT-OF-USE | | | | |
| NODE C | VC7 | ac | OUT-OF-USE | | | | |
| | VC8 | ac | OUT-OF-USE | | | | |
| | VC9 | ac | OUT-OF-USE | | | | |

Fig. 12A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 3 | VC1 | ab | NORMAL |
| | | 0 | VC5 | ac | |

Fig. 12B

AVAILABLE BANDWIDTH MANAGEMENT TABLE IN NODE A

| LINK NUMBER | AVAILABLE BANDWIDTH | WAITING TIME $\mu$ IN OUTPUT BUFFER (SEC.) |
|---|---|---|
| ab | 7 | 30 |
| ac | 10 | 0 |
| cb | 7 | 30 |
| ba | 10 | 0 |
| bc | 10 | 0 |
| ca | 10 | 0 |

Fig. 12C

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/ OUT-OF-USE FLAG | VCI | OUTPUT LINK | RELAY LINK | IN-USE/ OUT-OF-USE FLAG |
| NODE B | VC1 | ab | IN-USE | VC5 | ac | cb | IN-USE |
| | VC2 | ab | IN-USE | VC6 | ac | cb | IN-USE |
| | VC3 | ab | OUT-OF-USE | | | | |
| | VC4 | ab | OUT-OF-USE | | | | |
| NODE C | VC7 | ac | OUT-OF-USE | | | | |
| | VC8 | ac | OUT-OF-USE | | | | |
| | VC9 | ac | OUT-OF-USE | | | | |

Fig. 14A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 3 | VC1 | ab | NORMAL |
| | | 0 | VC5 | ac | |
| 2 | 2 | 2 | VC2 | ab | NORMAL |
| | | 0 | VC6 | ac | |

Fig. 14B

AVAILABLE BANDWIDTH MANAGEMENT TABLE IN NODE A

| LINK NUMBER | AVAILABLE BANDWIDTH | WAITING TIME $\mu$ IN OUTPUT BUFFER (SEC.) |
|---|---|---|
| ab | 5 | 50 |
| ac | 10 | 0 |
| cb | 7 | 30 |
| ba | 10 | 0 |
| bc | 10 | 0 |
| ca | 10 | 0 |

Fig. 14C

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN USE/OUT OF USE FLAG | VCI | OUTPUT LINK | REALY LINK | IN-USE/OUT OF USE FLAG |
| NODE B | VC1 | ab | IN USE | VC5 | ac | cb | IN-USE |
| | VC2 | ab | IN USE | VC6 | ac | cb | IN-USE |
| | VC3 | ab | IN USE | --- | --- | --- | --- |
| | VC4 | ab | OUT OF USE | | | | |
| NODE C | VC7 | ac | OUT OF USE | | | | |
| | VC8 | ac | OUT OF USE | | | | |
| | VC9 | ac | OUT OF USE | | | | |

Fig. 16A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 2 | VC1 | ab | NORMAL |
| | | 0 | VC5 | ac | |
| 2 | 2 | 1 | VC2 | ab | NORMAL |
| | | 0 | VC6 | ac | |
| 3 | 7 | 7 | VC3 | ab | EMERGENT |
| | | --- | --- | --- | |

Fig. 16B

AVAILABLE BANDWIDTH MANAGEMENT TABLE IN NODE A

| LINK NUMBER | AVAILABLE BANDWIDTH | WAITING TIME $\mu$ IN OUTPUT BUFFER (SEC.) |
|---|---|---|
| ab | 0 | 100 |
| ac | 10 | 0 |
| cb | 7 | 30 |
| ba | 10 | 0 |
| bc | 10 | 0 |
| ca | 10 | 0 |

Fig. 16C

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/OUT-OF-USE FLAG | VCI | OUTPUT LINK | REALY LINK | IN-USE/OUT-OF-USE FLAG |
| NODE B | VC1 | ab | IN-USE | VC5 | ac | cb | IN-USE |
| | VC2 | ab | IN-USE | VC6 | ac | cb | IN-USE |
| | VC3 | ab | IN-USE | — | — | — | — |
| | VC4 | ab | OUT-OF-USE | | | | |
| NODE C | VC7 | ac | OUT-OF-USE | | | | |
| | VC8 | ac | OUT-OF-USE | | | | |
| | VC9 | ac | OUT-OF-USE | | | | |

Fig. 18A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 2 | VC1 | ab | NORMAL |
| | | 0 | VC5 | ac | |
| 2 | 2 | 0 | VC2 | ab | NORMAL |
| | | 2 | VC6 | ac | |
| 3 | 7 | 7 | VC3 | ab | EMERGENT |
| | | — | — | — | |

Fig. 18B

AVAILABLE BANDWIDTH MANAGEMENT TABLE IN NODE A

| LINK NUMBER | AVAILABLE BANDWIDTH | WAITING TIME $\mu$ IN OUTPUT BUFFER (SEC.) |
|---|---|---|
| ab | 1 | 90 |
| ac | 8 | 20 |
| cb | 5 | 50 |
| ba | 10 | 0 |
| bc | 10 | 0 |
| ca | 10 | 0 |

Fig. 18C

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/OUT-OF-USE FLAG | VCI | OUTPUT LINK | REALY LINK | IN-USE/OUT-OF-USE FLAG |
| NODE B | VC1 | ab | IN-USE | VC5 | ac | cb | IN-USE |
| | VC2 | ab | IN-USE | VC6 | ac | cb | IN-USE |
| | VC3 | ab | IN-USE | — | — | — | — |
| | VC4 | ab | OUT-OF-USE | | | | |
| NODE C | VC7 | ac | OUT-OF-USE | | | | |
| | VC8 | ac | OUT-OF-USE | | | | |
| | VC9 | ac | OUT-OF-USE | | | | |

Fig. 20A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 0 | VC1 | ab | NORMAL |
| | | 3 | VC5 | ac | |
| 2 | 2 | 0 | VC2 | ab | NORMAL |
| | | 2 | VC6 | ac | |
| 3 | 7 | 7 | VC3 | ab | EMERGENT |
| | | — | — | — | |

Fig. 20B

AVAILABLE BANDWIDTH MANAGEMENT TABLE IN NODE A

| LINK NUMBER | AVAILABLE BANDWIDTH | WAITING TIME $\mu$ IN OUTPUT BUFFER (SEC.) |
|---|---|---|
| ab | 3 | 70 |
| ac | 5 | 50 |
| cb | 2 | 80 |
| ba | 10 | 0 |
| bc | 10 | 0 |
| ca | 10 | 0 |

Fig. 20C

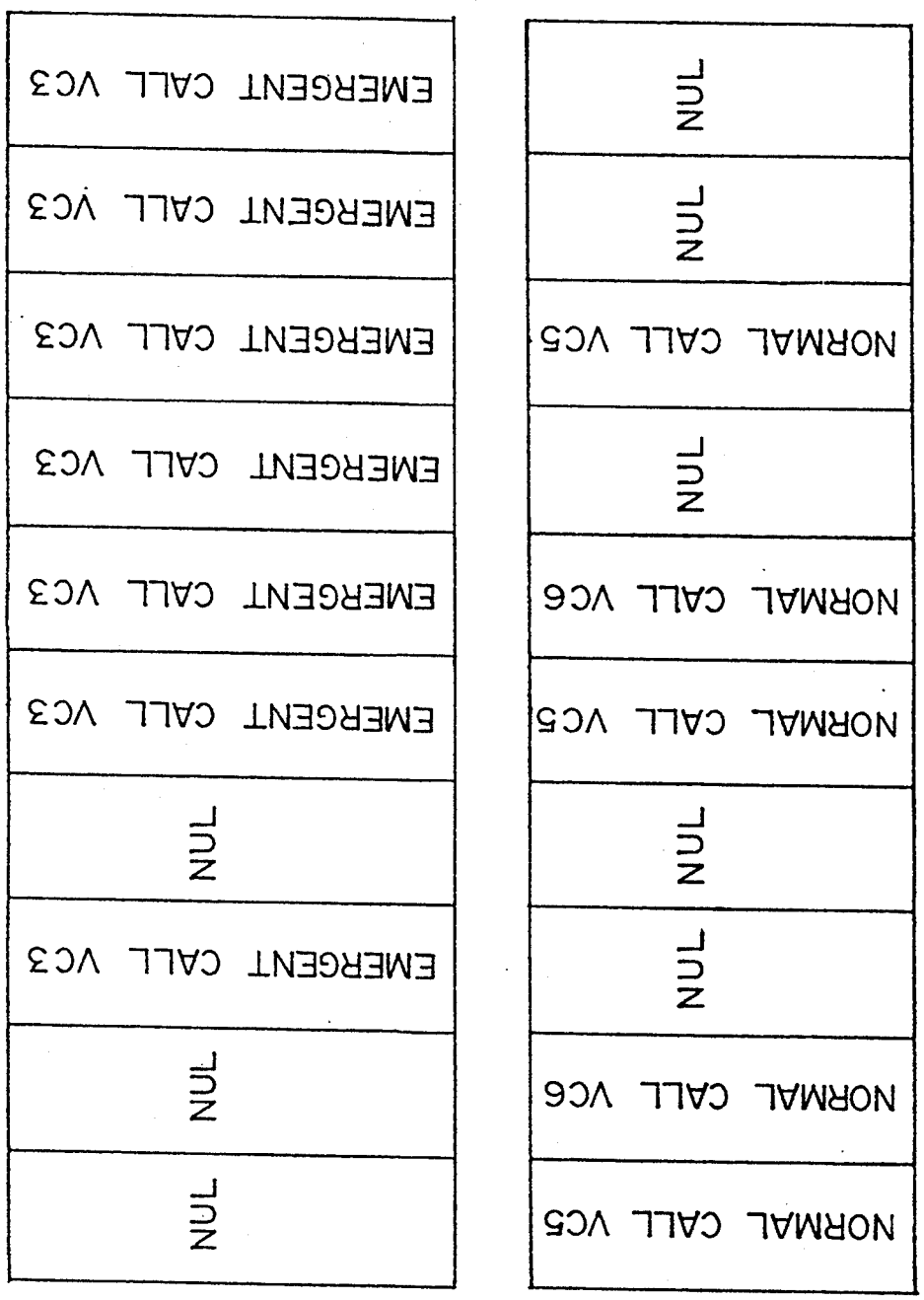

VCI BANDWIDTH CHANGE INFORMATION

THE VALUE IS ALWAYS SET TO 0

VCI BANDWIDTH CHANGE INFORMATION

BANDWIDTH IS CHANGED TO THIS VALUE

DETOUR CIRCUIT IS ASSIGNED THIS VCI

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/OUT-OF-USE FLAG | VCI | OUTPUT LINK | REALY LINK | IN-USE/OUT-OF-USE FLAG |
| NODE B | VC1 | ab | IN-USE | VC1-1 | ac | cb | IN-USE |
| | | | | VC1-2 | ad | de, eb | IN-USE |
| | VC2 | ab | OUT-OF-USE | VC2-1 | ac | cb | OUT-OF-USE |
| | | | | VC2-2 | ad | de, eb | OUT-OF-USE |
| | VC3 | ab | OUT-OF-USE | | | | |
| NODE C | VC4 | ac | OUT-OF-USE | | | | |
| NODE D | VC5 | ad | OUT-OF-USE | | | | |

Fig. 32A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 3 | VC1 | ab | NORMAL |
| | | 0 | VC1-1 | ac | |
| | | 0 | VC1-2 | ad | |

Fig. 32B

LINK AVAILABLE BANDWIDTH MANAGEMENT TABLE IN NODE A

| LINK NUMBER | AVAILABLE BANDWIDTH | LINK NUMBER | AVAILABLE BANDWIDTH |
|---|---|---|---|
| ab | 7 | ca | 10 |
| ac | 10 | cb | 4 |
| ad | 10 | da | 0 |
| ba | 10 | de | 5 |
| bc | 10 | eb | 6 |
| be | 10 | ed | 10 |

Fig. 32C

PATH-TO CIRCUIT CORRESPONDENCE TABLE IN NODE A

| DIRECT CIRCUIT VCI | DETOUR PATH VPI | DETOUR CIRCUIT VCI | SELECTION FLAG |
|---|---|---|---|
| VC1 | VP1 | VC1-1 | NOT SELECTED |
| VC1 | VP2 | VC1-2 | NOT SELECTED |
| VC2 | VP1 | VC2-1 | NOT SELECTED |
| VC2 | VP2 | VC2-2 | NOT SELECTED |
| . | . | . | . |
| . | . | . | . |

Fig. 32D

DETOUR PATH AVAILABLE BANDWIDTH MANAGEMENT TABLE IN NODE A

| DESTINATION NODE | DETOUR PATH | AVAILABLE BANDWIDTH | PRIORITY ORDER |
|---|---|---|---|
| NODE B | VP1 | 4 | 1 |
| NODE B | VP2 | 5 | 2 |
| . | . | . | . |
| . | . | . | . |

Fig. 32E

| Fig. 33A OUTPUT LINK ab | Fig. 33B OUTPUT LINK ac | Fig. 33C OUTPUT LINK ad |
|---|---|---|
| NUL | NUL | NUL |
| NUL | NUL | NUL |
| NUL | NUL | NUL |
| NORMAL CALL VC1 | NUL | NUL |
| NUL | NUL | NUL |
| NUL | NUL | NUL |
| NORMAL CALL VC1 | NUL | NUL |
| NUL | NUL | NUL |
| NUL | NUL | NUL |
| NORMAL CALL VC1 | NUL | NUL |

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/OUT-OF-USE FLAG | VCI | OUTPUT LINK | REALY LINK | IN-USE/OUT-OF-USE FLAG |
| NODE B | VC1 | ab | IN-USE | VC1-1 | ac | cb | IN-USE |
| | | | | VC1-2 | ad | de, eb | IN-USE |
| | VC2 | ab | IN-USE | VC2-1 | ac | cb | IN-USE |
| | | | | VC2-2 | ad | de, eb | IN-USE |
| | VC3 | ab | OUT-OF-USE | | | | |
| NODE C | VC4 | ac | OUT-OF-USE | | | | |
| NODE D | VC5 | ad | OUT-OF-USE | | | | |

Fig. 34A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 3 | VC1 | ab | NORMAL |
| | | 0 | VC1-1 | ac | |
| | | 0 | VC1-2 | ad | |
| 2 | 2 | 2 | VC2 | ab | NORMAL |
| | | 0 | VC2-1 | ac | |
| | | 0 | VC2-2 | ad | |

Fig. 34B

LINK AVAILABLE BANDWIDTH MANAGEMENT TABLE IN NODE A

| LINK NUMBER | AVAILABLE BANDWIDTH | LINK NUMBER | AVAILABLE BANDWIDTH |
|---|---|---|---|
| ab | 5 | ca | 10 |
| ac | 10 | cb | 4 |
| ad | 10 | da | 0 |
| ba | 10 | de | 5 |
| bc | 10 | eb | 6 |
| be | 10 | ed | 10 |

Fig. 34C

PATH-TO-CIRCUIT CORRESPONDENCE TABLE IN NODE A

| DIRECT CIRCUIT VCI | DETOUR PATH VPI | DETOUR CIRCUIT VCI | SELECTION FLAG |
|---|---|---|---|
| VC1 | VP1 | VC1-1 | NOT SELECTED |
|  | VP2 | VC1-2 | NOT SELECTED |
| VC2 | VP1 | VC2-1 | NOT SELECTED |
|  | VP2 | VC2-2 | NOT SELECTED |
| . | . | . | . |
| . | . | . | . |

Fig. 34D

DETOUR PATH AVAILABLE BANDWIDTH MANAGEMENT TABLE IN NODE A

| DESTINATION NODE | DETOUR PATH | AVAILABLE BANDWIDTH | PRIORITY ORDER |
|---|---|---|---|
| NODE B | VP1 | 4 | 1 |
|  | VP2 | 5 | 2 |
| . | . | . | . |
| . | . | . | . |

Fig. 34E

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/OUT-OF-USE FLAG | VCI | OUTPUT LINK | RELAY LINK | IN-USE/OUT-OF-USE FLAG |
| NODE B | VC1 | ab | IN-USE | VC1-1 | ac | cb | IN-USE |
| | | | | VC1-2 | ad | de, eb | IN-USE |
| | VC2 | ab | IN-USE | VC2-1 | ac | cb | IN-USE |
| | | | | VC2-2 | ad | de, eb | IN-USE |
| | VC3 | ab | IN-USE | | | | |
| NODE C | VC4 | ac | OUT-OF-USE | | | | |
| NODE D | VC5 | ad | OUT-OF-USE | | | | |

Fig. 36A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 2 | VC1 | ab | NORMAL |
| | | 0 | VC1-1 | ac | |
| | | 0 | VC1-2 | ad | |
| 2 | 2 | 1 | VC2 | ab | NORMAL |
| | | 0 | VC2-1 | ac | |
| | | 0 | VC2-2 | ad | |
| 3 | 7 | 7 | VC3 | ab | EMERGENT |

Fig. 36B

LINK AVAILABLE BANDWIDTH MANAGEMENT TABLE IN NODE A

| LINK NUMBER | AVAILABLE BANDWIDTH | LINK NUMBER | AVAILABLE BANDWIDTH |
|---|---|---|---|
| ab | 0 | ca | 10 |
| ac | 10 | cb | 4 |
| ad | 10 | da | 0 |
| ba | 10 | de | 5 |
| bc | 10 | eb | 6 |
| be | 10 | ed | 10 |

Fig. 36C

PATH-TO-CIRCUIT CORRESPONDENCE TABLE IN NODE A

| DIRECT CIRCUIT VCI | DETOUR PATH VPI | DETOUR CIRCUIT VCI | SELECTION FLAG |
|---|---|---|---|
| VC1 | VP1 | VC1-1 | NOT SELECTED |
| VC1 | VP2 | VC1-2 | NOT SELECTED |
| VC2 | VP1 | VC2-1 | NOT SELECTED |
| VC2 | VP2 | VC2-2 | NOT SELECTED |
| . | . | . | . |
| . | . | . | . |

Fig. 36D

DETOUR PATH AVAILABLE BANDWIDTH MANAGEMENT TABLE IN NODE A

| DESTINATION NODE | DETOUR PATH | AVAILABLE BANDWIDTH | PRIORITY ORDER |
|---|---|---|---|
| NODE B | VP1 | 4 | 1 |
| NODE B | VP2 | 5 | 2 |
| . | . | . | . |
| . | . | . | . |

Fig. 36E

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/OUT-OF-USE FLAG | VCI | OUTPUT LINK | REALY LINK | IN-USE/OUT-OF-USE FLAG |
| NODE B | VC1 | ab | IN-USE | VC1-1 | ac | cb | IN-USE |
| | | | | VC1-2 | ad | de, eb | IN-USE |
| | VC2 | ab | IN-USE | VC2-1 | ac | cb | IN-USE |
| | | | | VC2-2 | ad | de, eb | IN-USE |
| | VC3 | ab | IN-USE | | | | |
| NODE C | VC4 | ac | OUT-OF-USE | | | | |
| NODE D | VC5 | ad | OUT-OF-USE | | | | |

Fig. 38A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 2 | VC1 | ab | NORMAL |
| | | 0 | VC1-1 | ac | |
| | | 0 | VC1-2 | ad | |
| 2 | 2 | 0 | VC2 | ab | NORMAL |
| | | 2 | VC2-1 | ac | |
| | | 0 | VC2-2 | ad | |
| 3 | 7 | 7 | VC3 | ab | EMERGENT |

Fig. 38B

LINK AVAILABLE BANDWIDTH MANAGEMENT TABLE IN NODE A

| LINK NUMBER | AVAILABLE BANDWIDTH | LINK NUMBER | AVAILABLE BANDWIDTH |
|---|---|---|---|
| ab | 1 | ca | 10 |
| ac | 8 | cb | 2 |
| ad | 10 | da | 0 |
| ba | 10 | de | 5 |
| bc | 10 | eb | 6 |
| be | 10 | ed | 10 |

Fig. 38C

PATH-TO-CIRCUIT CORRESPONDENCE TABLE IN NODE A

| DIRECT CIRCUIT VCI | DETOUR PATH VPI | DETOUR CIRCUIT VCI | SELECTION FLAG |
|---|---|---|---|
| VC1 | VP1 | VC1-1 | NOT SELECTED |
| | VP2 | VC1-2 | NOT SELECTED |
| VC2 | VP1 | VC2-1 | SELECTED |
| | VP2 | VC2-2 | NOT SELECTED |
| . | . | . | . |
| . | . | . | . |

Fig. 38D

DETOUR PATH AVAILABLE BANDWIDTH MANAGEMENT TABLE IN NODE A

| DESTINATION NODE | DETOUR PATH | AVAILABLE BANDWIDTH | PRIORITY ORDER |
|---|---|---|---|
| NODE B | VP1 | 2 | 1 |
| | VP2 | 5 | 2 |
| . | . | . | . |
| . | . | . | . |

Fig. 38E

VC MANAGEMENT TABLE IN NODE A

| DESTINATION NODE | DIRECT CIRCUIT | | | DETOUR CIRCUIT | | | |
|---|---|---|---|---|---|---|---|
| | VCI | OUTPUT LINK | IN-USE/OUT-OF-USE FLAG | VCI | OUTPUT LINK | REALY LINK | IN-USE/OUT-OF-USE FLAG |
| NODE B | VC1 | ab | IN-USE | VC1-1 | ac | cb | IN-USE |
| | | | | VC1-2 | ad | de, eb | IN-USE |
| | VC2 | ab | IN-USE | VC2-1 | ac | cb | IN-USE |
| | | | | VC2-2 | ad | de, eb | IN-USE |
| | VC3 | ab | IN-USE | | | | |
| NODE C | VC4 | ac | OUT-OF-USE | | | | |
| NODE D | VC5 | ad | OUT-OF-USE | | | | |

Fig. 40A

CONNECTED CALL MANAGEMENT TABLE IN NODE A

| TERMINAL NUMBER | REQUIRED BANDWIDTH | SERVICE BANDWIDTH | VCI | OUTPUT LINK | EMERGENT/NORMAL FLAG |
|---|---|---|---|---|---|
| 1 | 3 | 0 | VC1 | ab | NORMAL |
| | | 0 | VC1-1 | ac | |
| | | 3 | VC1-2 | ad | |
| 2 | 2 | 0 | VC2 | ab | NORMAL |
| | | 2 | VC2-1 | ac | |
| | | 0 | VC2-2 | ad | |
| 3 | 7 | 7 | VC3 | ab | EMERGENT |

Fig. 40B

LINK AVAILABLE BANDWIDTH MANAGEMENT TABLE IN NODE A

| LINK NUMBER | AVAILABLE BANDWIDTH | LINK NUMBER | AVAILABLE BANDWIDTH |
|---|---|---|---|
| ab | 3 | ca | 10 |
| ac | 8 | cb | 2 |
| ad | 7 | da | 0 |
| ba | 10 | de | 2 |
| bc | 10 | eb | 3 |
| be | 10 | ed | 10 |

Fig. 40C

PATH-TO-CIRCUIT CORRESPONDENCE TABLE IN NODE A

| DIRECT CIRCUIT VCI | DETOUR PATH VPI | DETOUR CIRCUIT VCI | SELECTION FLAG |
|---|---|---|---|
| VC1 | VP1 | VC1-1 | NOT SELECTED |
|  | VP2 | VC1-2 | SELECTED |
| VC2 | VP1 | VC2-1 | SELECTED |
|  | VP2 | VC2-2 | NOT SELECTED |
| . | . | . | . |
| . | . | . | . |

Fig. 40D

DETOUR PATH AVAILABLE BANDWIDTH MANAGEMENT TABLE IN NODE A

| DESTINATION NODE | DETOUR PATH | AVAILABLE BANDWIDTH | PRIORITY ORDER |
|---|---|---|---|
| NODE B | VP1 | 2 | 1 |
|  | VP2 | 2 | 2 |
| . | . | . | . |
| . | . | . | . |

Fig. 40E

| DIRECT CIRCUIT VCI | DETOUR PATH VPI | DETOUR CIRCUIT VCI | SELECTION FLAG | COUNTER INITIAL VALUE | PRESENT COUNTER VALUE | IN-USE FLAG |
|---|---|---|---|---|---|---|
| VC1 | VP1 | VC1-1 | SELECTED | 2 | 1 | IN-USE |
|  | VP2 | VC1-2 | SELECTED | 3 | 0 | SUSPENDED |
|  | VP3 | VC1-3 | SELECTED | 2 | 0 | SUSPENDED |
| VC2 | VP1 | VC2-1 | NOT SELECTED |  |  |  |
|  | VP2 | VC2-2 | NOT SELECTED |  |  |  |
|  | VP3 | VC2-3 | NOT SELECTED |  |  |  |
| ... | ... | ... | ... | ... | ... | ... |

Fig. 44

CALL ACCOMMODATION SYSTEM CONTAINING EMERGENT CALLS AND NORMAL CALLS

BACKGROUND OF THE INVENTION

1. Field of the Invention

The present invention relates to a call accommodation system for accommodating calls in the order from the highest priority level.

2. Description of the Related Art

Generally, in a local area network in which video, control data, voice, etc. are collectively processed in a factory, etc., communications are established using such media as a narrow bandwidth voice, control data. etc. However, if an accident arises in a factory, etc., for example, it may be required that an emergent call should be immediately issued using a voice or a video.

FIG. 1 shows a conventional call accommodation system for accommodating calls generated as described above.

In FIG. 1, A, B, C, and D are nodes, and a fine arrow between the nodes indicates a capacity of the transmission line, for example, 10, connecting the nodes. A bold line with an arrow on one end indicates a bandwidth of an existing call to be transmitted from one node to another.

Assuming that communications are established from node A to node B, a communications line from node A to node B can be a direct circuit A→B, or a detour circuit A→C→B or A→D→B. Assume that an emergent call designated bandwidth 7 has been issued from node A to node B, a destination.

First, in this case, direct circuit A→B is checked for available bandwidths. If, for example, existing calls 2 and 3 are detected as being designated bandwidths 2 and 3, respectively, in direct circuit A→B, then an emergent call designated bandwidth 7 cannot be accommodated in direct circuit A→B.

Then, detour circuits A→C→B and A→D→B are checked for available bandwidths. In detour circuit A→C→B, if existing calls designated bandwidths 3 and 4 are separately detected in circuit A→C, and an existing call designated bandwidth 3 is detected in circuit C→B, then an emergent call designated bandwidth 7 cannot be accommodated in detour circuit A→C→B. On the other hand, if an existing call designated band 3 is detected in circuit A→D and an existing call designated bandwidth 2 is detected in circuit D→B in detour circuit A→D→B, then an emergent call designated bandwidth 7 can be accommodated in detour circuit A→D→B.

Thus, the emergent call designated bandwidth 7 is finally accommodated in detour circuit A→D→B.

At this time, if the existing call designated is equal to or larger than bandwidth 1 is detected in addition to the existing call designated bandwidth 3 in circuit A→D, then the emergent call designated 7 cannot be accommodated in detour circuit A→D→B, either. Accordingly, the emergent call designated bandwidth 7 cannot be accommodated in any circuit from node A to node B, and the call is rejected.

To prevent an emergent call from being rejected in the above described conventional method, available bandwidths must be necessarily reserved for an emergent call either in a direct circuit or a detour circuit. In the example shown in FIG. 1, ten or more trunk capacity should be reserved in either a direct circuit or a detour circuit between nodes A and B.

However, all reserved bandwidths are not occupied in the above described conventional call accommodation system, thus the reservation results in an inefficient utilization and there is an increase in cost of a circuit.

However, limiting the reservation of the bandwidth to the smallest possible extent often causes an emergent call to be rejected undesirably.

SUMMARY OF THE INVENTION

The present invention has been developed based on the above described background to prevent the utilization of a circuit from being lowered and guarantee the accommodation of all emergent communications.

In an embodiment of the present invention, when a normal call communication deteriorating unit sets an emergent call, it deteriorates the communication quality of a normal call connected to its node by referring to or controlling a connected call managing unit so that a required bandwidth of the emergent call can be successfully reserved. A normal call circuit detouring unit reserves in a detour circuit a required bandwidth of a normal call which has been deteriorated by the normal call communication deteriorating unit by referring to or controlling the connected call managing unit, a circuit managing unit, and a bandwidth managing unit. If the unit has successfully reserved a detour circuit, it assigns the normal call to the detour circuit.

With the configuration, a required bandwidth of an emergent call can be safely reserved when the emergent call is set by deteriorating and delaying the communications of normal calls already connected in a network. Then, the normal call communications deteriorating unit enables a normal call deteriorated in communication quality to be assigned a detour circuit and improved communication.

In another embodiment of the present invention, a detour circuit managing unit manages more than one detour circuit for each normal call connected to a node. When an emergent call is set and a normal call must be assigned a detour circuit, the normal call detouring unit detours the normal call by determining one or more detour circuits sufficient for a required bandwidth of the normal call among one or more detour circuits managed by the detour circuit managing unit. If a configuration contains one or more detour circuits, a call distributing outputting unit outputs a normal call to the detour circuits after distributing it at a rate appropriate to the bandwidth available in each of the detour circuits.

Thus, the possibility of successfully assigning a normal call to a detour circuit can be raised by managing one or more detour circuits for each normal call. Furthermore, a plurality of detour circuits guarantee the communication quality of a normal call although a single detour circuit does not meet the requirement of the required bandwidth of the normal call in detouring the normal call.

As described above, the present invention realizes a desirable call accommodation system with the efficient utilization of transmission lines in a local area network, etc., thereby successfully reducing the cost of exclusive lines.

BRIEF DESCRIPTION OF THE DRAWINGS

Other objects and features of the present invention can be easily recognized by referring to the attached drawings and the description of the preferred embodiments.

FIGS. 12A, 12B, and 12C show the state of each table before a first terminal unit issues a request to connect a normal call to a node according to the first embodiment;

FIGS. 14A, 14B, and 14C show the state of each table after a normal call from the first terminal unit to the node has been successfully set, according to the first embodiment;

FIGS. 16A, 16B, and 16C show the state of each table after a normal call from the second terminal unit, to the above node, has been successfully set according to the first embodiment;

FIGS. 18A, 18B, and 18C show the state of each table after a normal call from the second terminal unit, to the node has been successfully set, and after a normal call from the first terminal unit 2 has been detoured according to the first embodiment;

FIGS. 20A, 20B, and 20C show the state of each table after a normal call from the second terminal unit to the node has been successfully set, and after a normal call from a third terminal unit has been detoured according to the first embodiment;

FIGS. 21A and 21B show the state of a buffer read control unit after a normal call from the second terminal unit to the node has been successfully set, and after a normal call from the second terminal unit has been detoured according to the first embodiment;

FIGS. 32A, 32B, 32C, 32D, and 32E show the state of each table before a request to connect a normal call from the first terminal unit to the node is issued, in the second embodiment of the present invention;

FIGS. 33A, 33B, and 33C show the state of a buffer read control unit before a request to connect a normal call from the first terminal unit to the node is issued, in the second embodiment of the present invention;

FIGS. 34A, 34B, 34C, 34D, and 34E show the state of each table after a normal call from terminal unit to the node has been set in the second embodiment of the present invention;

FIGS. 36A, 36B, 36C, 36D, and 36E show the state of each table after an emergent call from the second terminal unit to the node has been successfully set according to the second embodiment of the present invention;

FIGS. 38A, 38B, 38C, 38D, and 38E show the state of each table after a normal call from the second terminal unit to the node has been successfully set, and after a normal call from the first terminal unit has been detoured, according to the second embodiment of the present invention;

FIGS. 40A, 40B, 40C, 40D, and 40E show the state of each table after a normal call from the second terminal unit to the node has been successfully set, and after a normal call from the third terminal unit has been detoured, according to the second embodiment of the present invention;

FIG. 44 shows the path-to-circuit correspondence table for use in detouring a normal call requesting to be simultaneously detoured to a plurality of detour circuits, according to the second embodiment of the present invention;

DESCRIPTION OF THE PREFERRED EMBODIMENTS

Explanation of the Principles

Figure 2:
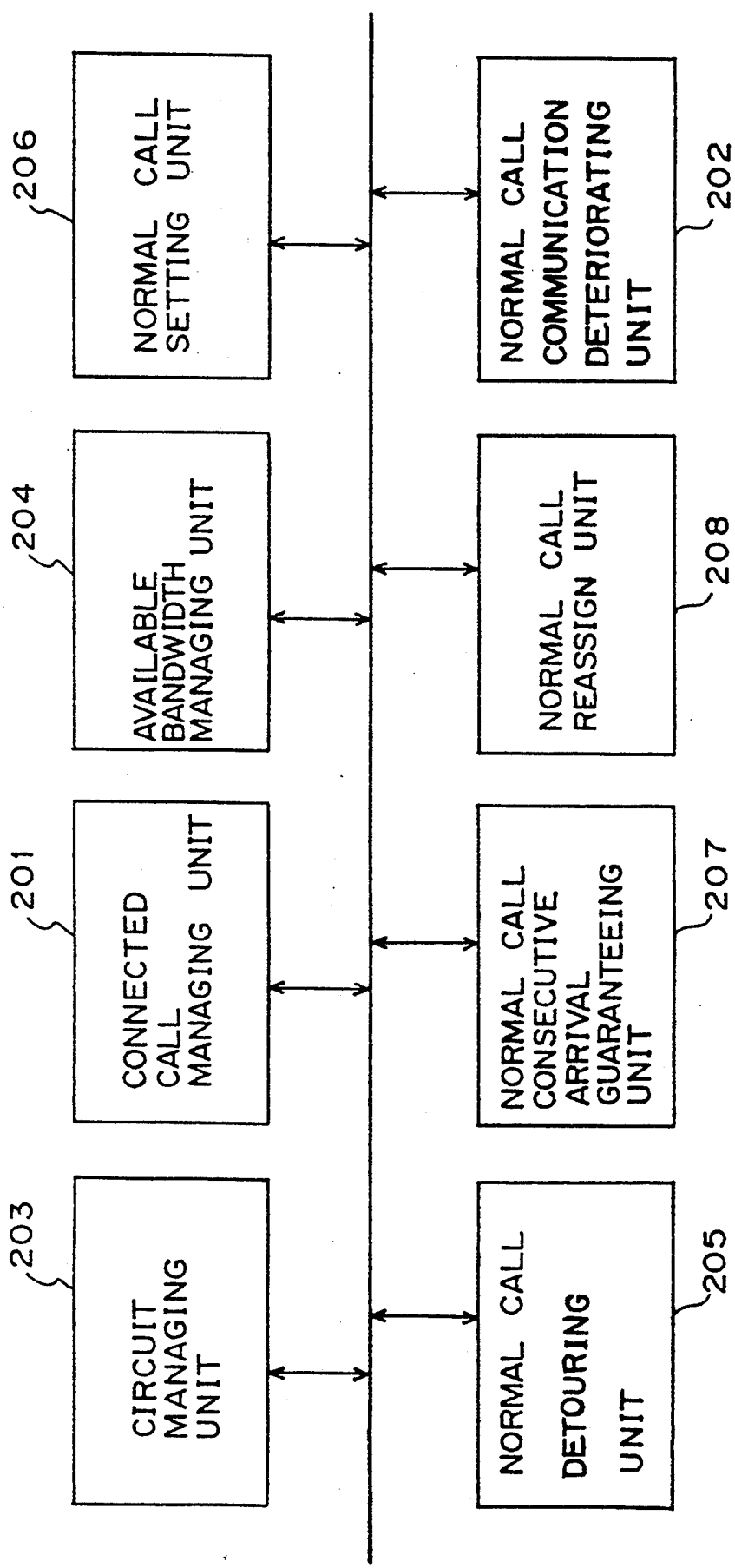
FIG. 2 is the block diagram (1) showing the present invention.

FIG. 2 is the block diagram associated with the 1st through the 8th aspects of the present invention. The configuration corresponds to that of the 1st embodiment of the present invention. The explanation of the 1st through the 8th aspects of the present invention refers to FIG. 2 unless otherwise specified.

The present invention relates to a call accommodation system for accommodating emergent calls and normal calls in a mixed state. Urgent calls are assigned a higher priority level, connected without fail when a connection request is issued for them, and are guaranteed with regard to their communication quality. Normal calls can be temporarily rejected and/or their communication quality cannot always be guaranteed.

The first aspect of the present invention is designed as follows.

First, a connected call managing unit 201 provided for each individual communication node manages the bandwidth of each call accommodated in its node.

When an emergent call is set, a normal call communication deteriorating unit 202 deteriorates the communication quality of a normal call connected to its node by referring to or controlling the connected call managing unit 201, so that a required bandwidth of the emergent call can be successfully reserved. The unit reduces a service bandwidth for normal calls connected to its node by, for example, referring to or controlling the connected call managing unit.

With the configuration according to the first aspect of the present invention, a required bandwidth of an emergent call can be reserved by deteriorating the communication quality of a normal call already connected when the emergent call is set and by delaying the normal call in a network.

In addition to the above described configuration according to the first aspect of the present invention, the following configuration is designed as the second aspect.

First, a circuit managing unit 203 manages each path in a network. The unit manages the use of the paths. That is, it determines whether or not a specific circuit including a VCI and an output link to each destination node, is occupied.

An available bandwidth managing unit 204 manages an available bandwidth in each link in a network.

A normal call detouring unit 205 provided for each communication node obtains a detour circuit to be reserved for a normal call deteriorated in communication quality by the normal call communication deteriorating unit 202 by referring to or controlling the connected call managing unit 201, the circuit managing unit 203, and the available bandwidth managing unit 204. On detecting an appropriate detour circuit, it assigns the normal call to the detour circuit.

With the configuration according to the second aspect of the present invention, a normal call deteriorated in communication quality by the normal call communication deteriorating unit 202 is detoured, if possible, to a detour circuit. Thus, the communication quality of the normal call can be successfully improved.

In addition to the configurations according to the above described first and second aspects, the following configuration is designed as the third aspect of the present invention.

That is, when a normal call is set, a normal call setting unit 206 sets in the connected call managing unit 201, a direct circuit having a service bandwidth high enough to meet the requirement of the normal call, and predetermines a detour circuit having a service bandwidth of 0.

Then, the normal call detouring unit 205 refers to the detour circuit predetermined in the connected call managing unit 201 when the normal call should be detoured.

With the configuration according to the third aspect of the present invention, when a normal call is set, a direct circuit having a service bandwidth enough to meet the requirement of the normal call is assigned to the normal call, and a detour circuit having a service bandwidth of 0 is predetermined. Then, the detour circuit predetermined in the connected call managing unit 201 is referred to when the normal call is detoured. As a result, the detour circuit can be assigned at a high speed.

In addition to the configuration according to the first, second or third aspect of the present invention, the following configuration is designed as the 4th aspect of the present invention.

That is, the normal call detouring unit 205 sends detour instruction data to the direct circuit initially assigned to a normal call. On receiving the detour instruction data, the normal call detouring unit 205 of each node connected to the initially assigned circuit sets to 0 the service bandwidth of the direct circuit managed by the connected call managing unit 201. Then, the normal call detouring unit 205 sends detour setting data to a detour circuit of the normal call. On receiving the detour setting data, the normal call detouring unit 205 of each node connected to the detour circuit sets the service bandwidth of the detour circuit managed by the connected call managing unit 201 to the value of the required bandwidth of the normal call.

With the 4th aspect of the present invention, normal call detour information can be efficiently transmitted among nodes using two types of data, that is, the detour instruction data and the detour setting data.

In addition to the first, second, third, and 4th aspect of the present invention, the following configuration is designed as the 5th aspect.

That is, when a normal call is detoured, a normal call sequential arrival guaranteeing unit 207 provided for each communication node obtains the delay of the time taken in the transmission from the source node of a normal call to its destination node, and delays by the obtained value, the timing at which the communication data on the normal call are transmitted to a detour circuit.

With the configuration according to the 5th aspect of the present invention, when a normal call is detoured, the communication data of the normal call are transmitted to a detour circuit at a timing delayed by the value obtained as the delay in the transmission of the normal call from the source node to the destination node through its initially assigned circuit. Thus, the sequential arrival of the communication data of the normal calls to be detoured can be exactly guaranteed.

In addition to the configuration according to the first, second, third, fourth, and 5th aspect, the following configuration is designed as the 6th aspect of the present invention.

That is, when a new emergent call is set in a direct circuit after a normal call was detoured to a detour circuit whose output link is shared with the above described direct circuit, the normal call communication deteriorating unit 202 deteriorates the communication quality of the normal call which had been detoured to the detour circuit when another normal call was assigned the direct circuit.

With the configuration according to the 6th aspect of the present invention, a normal call earlier assigned to a circuit can be guaranteed its communication quality to the utmost.

In addition to the configuration according to the first, second, third, fourth, fifth, and 6th aspect of the present invention, the following configuration is designed as the 7th aspect.

That is, a normal call reassigning unit 208 tries to reserve a required bandwidth of a normal call in its initially assigned direct circuit, by reassigning the normal call to the circuit after it has been detoured.

With the configuration according to the 7th aspect of the present invention, a trial is made to reserve a required bandwidth of a normal call in its initially assigned direct circuit, by reassigning the normal call to the circuit after it has been detoured.

In addition to the configuration according to the first, second, third, fourth, fifth, and 6th aspect of the present invention, the following configuration is designed as the 8th aspect as being practically realized from the 7th aspect of the present invention.

That is, the normal call reassigning unit 208 provided for each communication node compares the service bandwidth of a detoured normal call to the available bandwidth in its initially assigned direct circuit, after the communication quality of the detoured normal call is deteriorated in its detour circuit by the normal call communication deteriorating unit 202. If the available bandwidth is larger, the normal call reassigning unit 208 reassigns the normal call to its initially assigned direct circuit such that the service bandwidth of the normal call is smaller than the available bandwidth in its initially assigned direct circuit by referring to or controlling the connected call managing unit 201, the circuit managing unit 203, and the available bandwidth managing unit 204.

With the configuration according to the 8th aspect of the present invention, a trial is made to reassign a normal call to its initially assigned direct circuit according to the 7th aspect of the present invention, after the communication quality of the detoured normal call has been deteriorated in its detour circuit according to the 6th aspect of the present invention. At this time, the service bandwidth in the detour circuit of the normal call is compared with the available bandwidth in its initially assigned direct circuit. If the available bandwidth is larger, the detoured normal call is reassigned to its initially assigned direct circuit such that the service bandwidth of the normal call is smaller than the available bandwidth in its initially assigned direct circuit. As a result, the communication quality of the normal call can be appropriately improved to the utmost.

FIG. 3 is the block diagram indicating the 9th through 12th aspects of the present invention. The configuration corresponds to that according to the second embodiment of the present invention. In FIG. 3A, a block of solid lines indicates the configuration according to the 9th and 10th aspects of the present invention, while a block of broken lines indicates the additional configuration according to the 10th aspect of the present invention.

The following configuration can be designed according to the 9th aspect of the present invention.

Figure 3A:
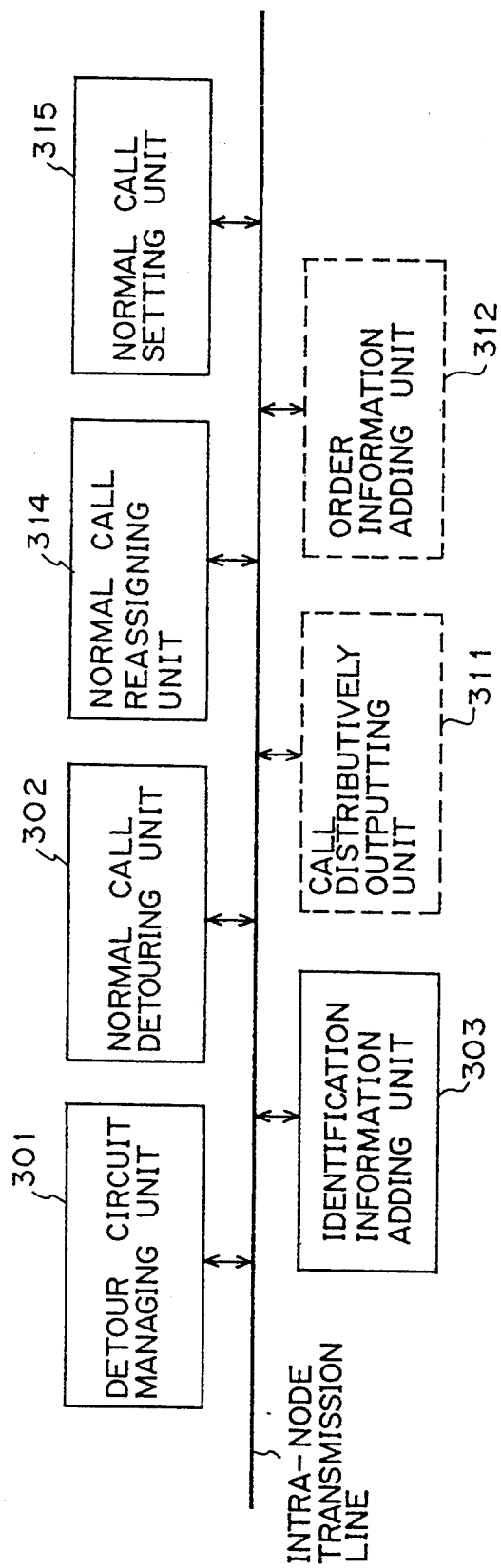
FIG. 3A, 3B, 3C, and 3D are block diagrams (2) showing the present invention.

First, a detour circuit managing unit 301 provided in a communication node as shown in FIG. 3A manages one or more detour circuits for each normal call connected to the communication node.

When an emergent call is set and a normal call should be detoured, a normal call detouring unit 302 provided in a node as shown in FIG. 3A determines a detour circuit required to reserve a required bandwidth of the normal call from among one or more detour circuits managed by the detour circuit managing unit 301, and detours the normal call to the detour circuit.

According to the 9th aspect of the present invention, if a normal call must be detoured when an emergent call is set and the service bandwidth of the normal call is reduced, the normal call detouring unit 302 detours the normal call from its direct circuit to a detour circuit to the extent that the requirement of the normal call is met. As a result, the communication quality of the normal call can be improved. At this time, the detour circuit managing unit 301 can raise the possibility of successfully assigning a normal call to a detour circuit by managing one or more detour circuits for each normal call.

According to the 9th aspect of the present invention, the following configuration is designed to guarantee the sequential arrival of normal calls.

First, when a normal call is detoured to a detour circuit or reassigned to its initially assigned direct circuit explained later, an identification information adding unit 303 provided for each node as shown in FIG. 3A adds, to the last normal call to be sent via the circuit assigned before it is detoured to its detour circuit or reassigned to its initially assigned direct circuit, the identification information indicating that the normal call is the last data in the circuit before the detour or the reassignment.

Figure 3B:
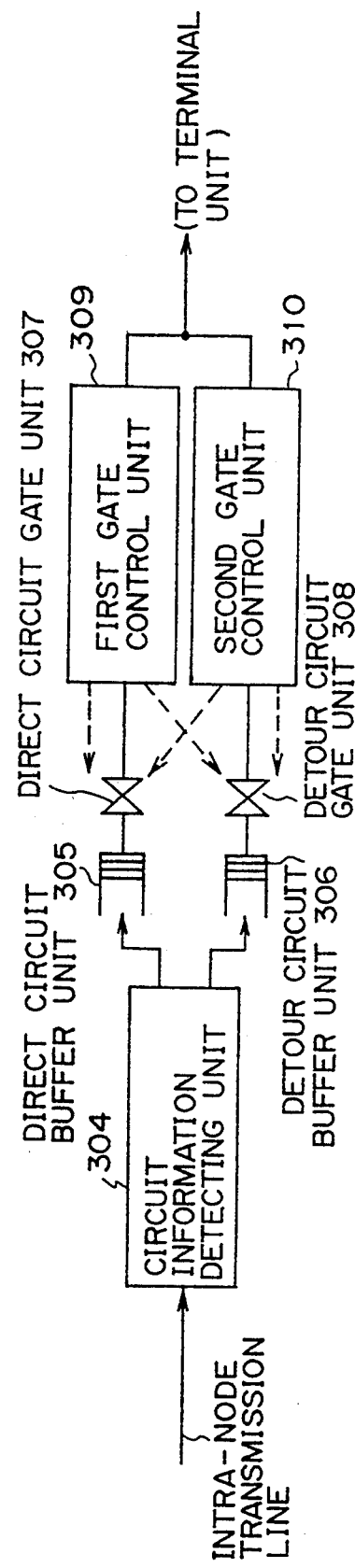

Next, the configuration shown in FIG. 3B is designed for the input portion of a terminal unit accommodated in each node.

That is, a circuit information detecting unit 304 detects circuit information such as a VCI in a received normal call.

Next, a direct circuit buffer unit 305 is provided for each source node identified by circuit information. When the circuit information detecting unit 304 receives a normal call assigned to a direct circuit associated with the source node, the direct circuit buffer unit 305 sequentially stores the normal call.

Then, a detour line buffer unit 306 is provided for each source node identified by circuit information. When the circuit information detecting unit 304 receives a normal call assigned to a detour circuit associated with the source node, the detour line buffer unit 306 sequentially stores the normal call.

A direct circuit gate unit 307 is provided at the output portion of the direct circuit buffer unit 305, and receives a normal call from the direct circuit buffer unit 305 to a terminal unit.

Likewise, a detour circuit gate unit 308 is provided at the output portion of the detour circuit buffer unit 306, and receives a normal call from the detour circuit gate buffer unit 306 to a terminal unit.

Furthermore, a first gate control unit 309 is provided at the output portion of the direct circuit gate unit 307. When the direct circuit gate unit 307 is open, the first gate control unit 309 closes the direct circuit gate unit 307 and opens the detour circuit gate unit 308 if, identification information is added to a normal call to be received by a terminal from the direct circuit buffer unit 305 through the direct circuit gate unit 307.

Then, a second gate control unit 310 is provided at the output portion of the detour circuit gate unit 308. When the detour circuit gate unit 308 is open, the second gate control unit 310 closes the detour circuit gate unit 308 and opens the direct circuit gate unit 307 if, identification information is added to a normal call to be received by a terminal from the detour circuit buffer unit 306 through the detour circuit gate unit 308.

With the above described configuration, when a normal call is detoured to a detour circuit or reassigned to its initially assigned direct circuit, the data transmitted via the circuit assigned before the detour or the reassignment and the data transmitted via the circuit assigned after the detour or the reassignment can be sequentially received by a destination terminal without fail.

Next, the 10th aspect of the present invention is designed as follows.

First, the detour circuit managing unit 301 provided in a node is similar to that according to the 9th aspect of the present invention as shown in FIG. 3A.

When an emergent call is set and a normal call should be detoured, a normal call detouring unit 302 provided in a node as shown in FIG. 3A determines one or more detour circuits required to reserve a required bandwidth of the normal call in total from among one or more detour circuits managed by the detour circuit managing unit 301, and detours the normal call to the detour circuit.

A call distributively outputting unit 311 provided in a node and shown in FIG. 3A outputs a normal call to one or more detour circuits determined by the normal call detouring unit 302 after distributing it at a rate appropriate to the bandwidth available in each detour circuit.

According to the 10th aspect of the present invention, the normal call detouring unit 302 detours a normal call from its direct circuit to one or more detour circuits to the extent that the requirement of the bandwidth of the normal call is met in total. Then, the call distributively outputting unit 311 outputs a call to one or more detour circuits after distributing the normal call at a rate appropriate to the bandwidth available in each of the detour circuits. As a result, the normal call communication quality can be guaranteed by a plurality of detour circuits even if a single detour circuit is not enough to meet the requirement of the bandwidth.

According to the 10th aspect of the present invention, the following configuration is designed to guarantee the order of normal calls.

First, an order information adding unit 312 adds order information such as a sequence number, etc. to a normal call outputted by the call distributively outputting unit 311.

Figure 3C:
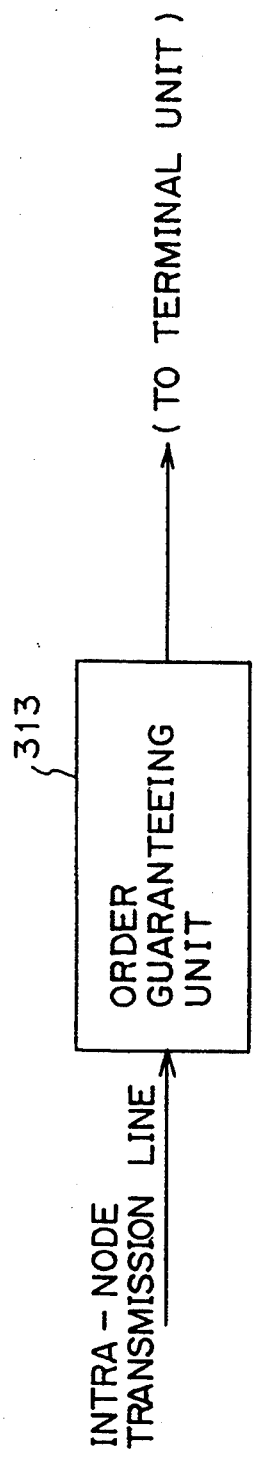

Next, an order guaranteeing unit 313 provided at the input portion of a terminal unit accommodated in each node and shown in FIG. 3C receives a normal call and has the terminal unit receive it in due order according to the order information added to the normal call.

With the above described configuration, data transmitted via a direct circuit assigned before a detour and data transmitted via one or more detour circuits assigned for the detour are guaranteed their arrival orders at a destination terminal unit even if the normal call is detoured from its direct circuit to one or more detour circuits.

In the 9th or 10th aspect of the present invention, the first practical configuration can be designed as follows.

That is, the detour circuit managing unit 301 manages one or more detour circuits for each normal call together with a priority level assigned to each normal call in the order from the smallest number of nodes included in each detour circuit.

The normal call detouring unit 302 determines according to priority levels one or more detour circuits from among one or more detour circuits managed by the detour circuit managing unit 301 for the normal call.

With the first practical configuration, the quality of a normal call can be prevented to the utmost from being affected by the detour of another normal call, by determining a detour circuit according to priority levels assigned in the order of the smallest number of nodes included in each detour circuit, when the normal call is detoured from its direct circuit to the detour circuit.

With the 9th or 10th aspect of the present invention, the second practical configuration can be designed as follows.

That is, after a normal call has been detoured, a normal call reassigning unit 314 provided for each node and shown in FIG. 3A, tries to reassign the normal call to its initially assigned direct circuit and satisfy the requirement of the required bandwidth of the normal call in the direct circuit.

With the second practical configuration, after a normal call has been detoured, the normal call reassigning unit 314 tries to reassign the normal call to its initially assigned direct circuit and reserve the required bandwidth of the normal call in the direct circuit. As a result, the communication quality of the normal call can be satisfactorily improved.

With the 9th or 10th aspect of the present invention, the third practical configuration can be designed as follows.

That is, when a normal call is set, a normal call setting unit 315 provided for each node and shown in FIG. 3A, sets as a circuit of the normal call, a direct circuit having a service bandwidth enough to meet the requirement of the required bandwidth of the normal call. It simultaneously assigns to the normal call a detour circuit having a service bandwidth of 0.

Then, the normal call detouring unit 302 shown in FIG. 3A or the normal call reassigning unit 314 detours a normal call by setting to 0 the service bandwidth of the circuit assigned to the normal call before the detour by the normal call setting unit 315, and sets a predetermined bandwidth to the value of the service bandwidth of the detour circuit of the detoured normal call.

With the third practical configuration, a normal call can be rapidly detoured in a simple process by predetermining a detour circuit having a service bandwidth of 0 by the normal call setting unit 315.

With the third practical configuration, the fourth practical configuration can be designed as follows.

That is, when a normal call is received from an external node, the normal call detouring unit 302 or the normal call reassigning unit 314 detours the normal call to a detour circuit or reassigns its initially assigned direct circuit to the normal call, by setting a predetermined bandwidth to the value of its service bandwidth if the service bandwidth of the circuit of the received normal call managed by the normal call setting unit 315 is "0".

According to the 4th practical configuration, in a relay node, etc. which has received a normal call from another node, the normal call detouring unit 302 or the normal call reassigning unit 314 detours the normal call to a detour circuit or reassigns its initially assigned direct circuit to the normal call by setting its service bandwidth to a predetermined bandwidth, if the service bandwidth of the circuit of the received normal call managed by the normal call setting unit 315 is "0". As a result, it is not required to transmit control data for a detour between a source node and a relay node, etc., thereby simplifying the procedure of a detour or reassignment process.

With the 3rd or 4th practical configuration, the 5th practical configuration can be designed as follows.

That is, when a normal call is detoured, the identification information adding unit 303 provided for each node and shown in FIG. 3A, adds to the last normal call to be sent via the circuit assigned before it is detoured, the identification information indicating that the normal call is the last data in the circuit assigned before the detour.

Then, on receiving from an external node a normal call provided with identification information, the normal call detouring unit 302 or the normal call reassigning unit 314 detours the normal call to a detour circuit or reassigns the normal call to its initially assigned direct circuit by setting to 0 the service bandwidth of the circuit, of the received normal call managed by the normal call setting unit 315.

According to the 5th practical configuration, in a relay node, etc. which has received a normal call from another node, the normal call detouring unit 302 or the normal call reassigning unit 314 detours, when the normal call provided with identification information is received, the normal call, calls to a detour circuit or reassigns the normal call to its initially assigned direct circuit by setting to 0 the service bandwidth of the circuit of the received normal call managed by the normal call setting unit 315. As a result, as in the fourth practical configuration, it is not required to transmit control data for a detour between a source node and a relay node, etc., thereby simplifying the procedure for a detour or reassignment process.

Then, the following configuration can be designed as the 11th aspect of the present invention.

First, a normal call is assigned one of two priority levels, that is, a higher level or a lower level.

Figure 3D:
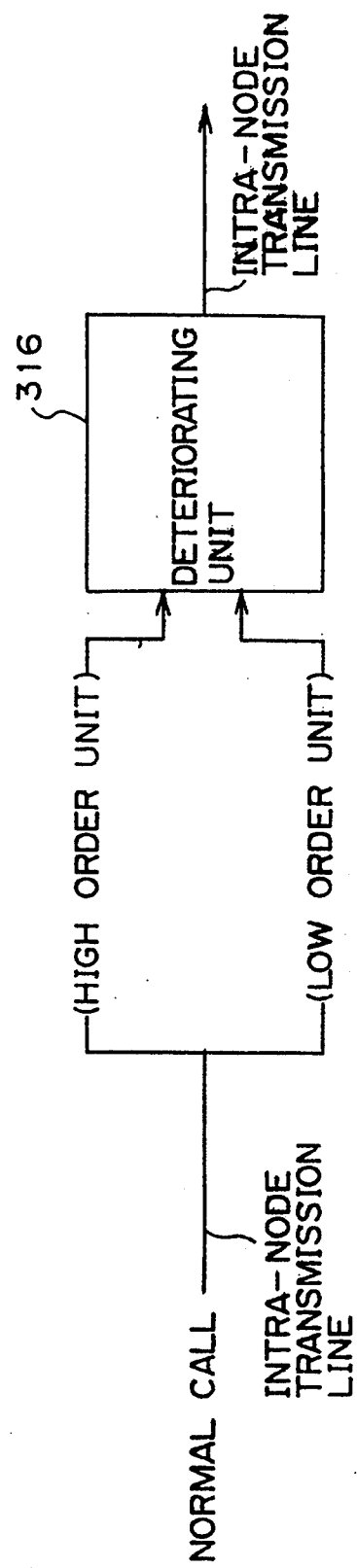

When an emergent call is set, a deteriorating unit 316 provided for each node and shown in FIG. 3D deteriorates the quality of a normal call having a lower level first, when any normal call should be deteriorated in communication quality.

With the 11th aspect of the present invention, the deteriorating unit 316 changes a deterioration level according to the type of normal call, by deteriorating the quality of a normal call assigned a lower priority level among normal calls.

Finally, the following configuration is designed as the 12th aspect of the present invention.

That is, first, a normal call is assigned one of two priority levels, that is, a higher priority level or a lower priority level.

Then, with the 9th aspect of the present invention, when an emergent call is set and a normal call should be detoured, the normal call detouring unit 302 shown in FIG. 3A detours a normal call having a higher priority level first after determining a detour circuit to meet the requirement of the required bandwidth of the normal call from among one or more detour circuits managed by the detour circuit managing unit 301 for the normal call.

With the 12th aspect of the present invention, the improvement level in communication quality can be changed according to the type of normal call by first detouring a normal call assigned a higher priority level during the operation according to the 9th aspect of the present invention.

Explanation of 1st Embodiment

Configuration of the System according to the 1st Embodiment

Figure 4:
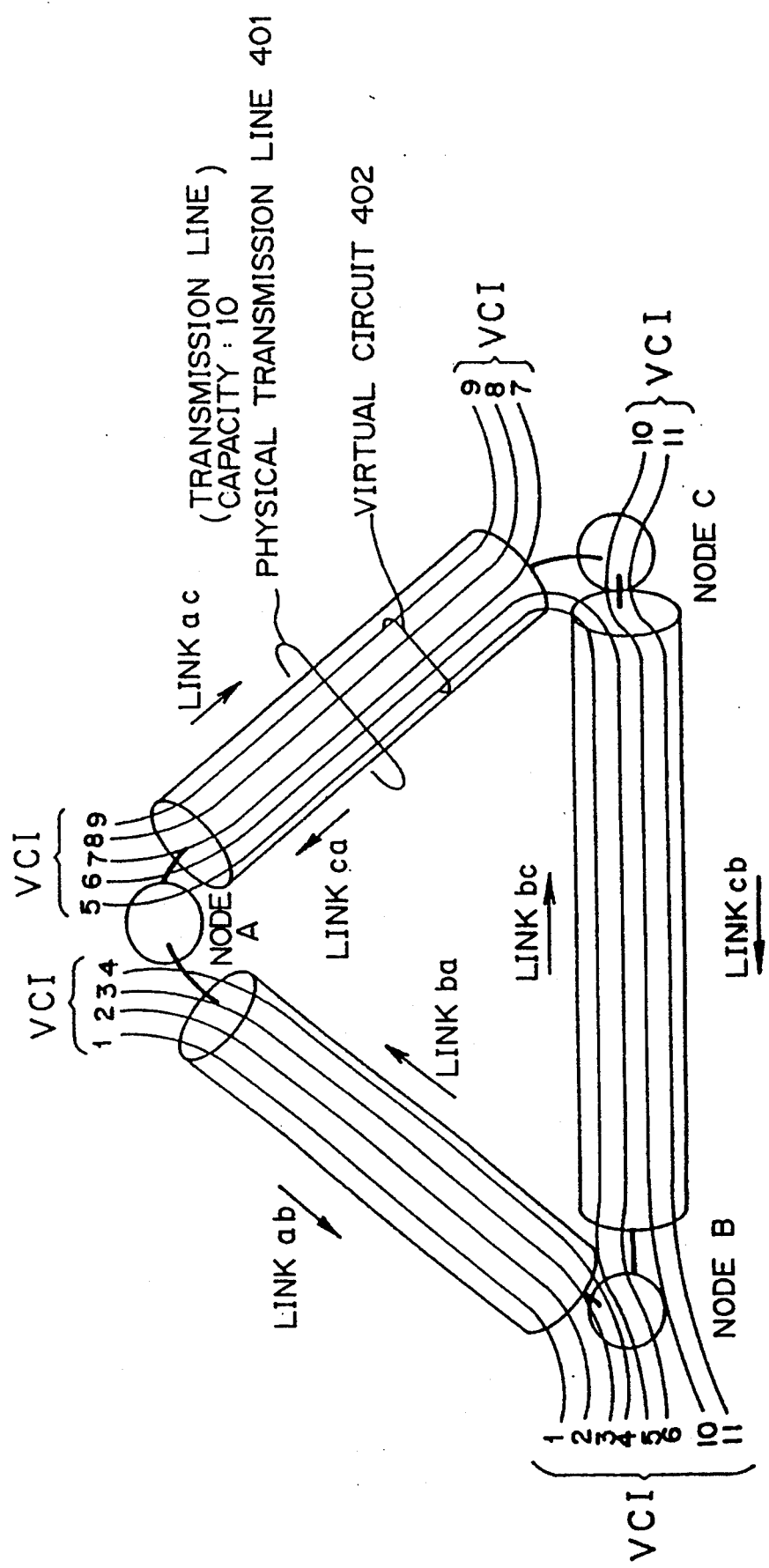
FIG. 4 shows an example of a network model used in the first embodiment of the present invention.

FIG. 4 shows an example of a network model used in the first embodiment of the present invention. In the example, the model contains the three nodes A, B, and C which are interconnected by physical transmission lines 401, referred to as links ab, ba, ac, ca, bc, and cb for comprehensibility. The transmission capacity of each link is, for example, 10 megabytes/second.

In the above described network, virtual circuits (VC) 402 are set. The circuits are physical circuits identified by virtual circuit identifiers (VCI) 1-11, etc. Communication between nodes is established through one of the VCs each being identified by one of the VCIs.

For example, VCIs 1-4 are direct circuits between nodes A and B connected by links ab or ba, VCIs 7-9 are direct circuits between nodes A and C connected by links ac or ca, and VCIs 10 and 11 are direct circuits between nodes B and C connected by links bc or cb. VCIs 5 and 6 are detour circuits between nodes A and B connected by links ac-ba or bc-ca.

Figure 5:
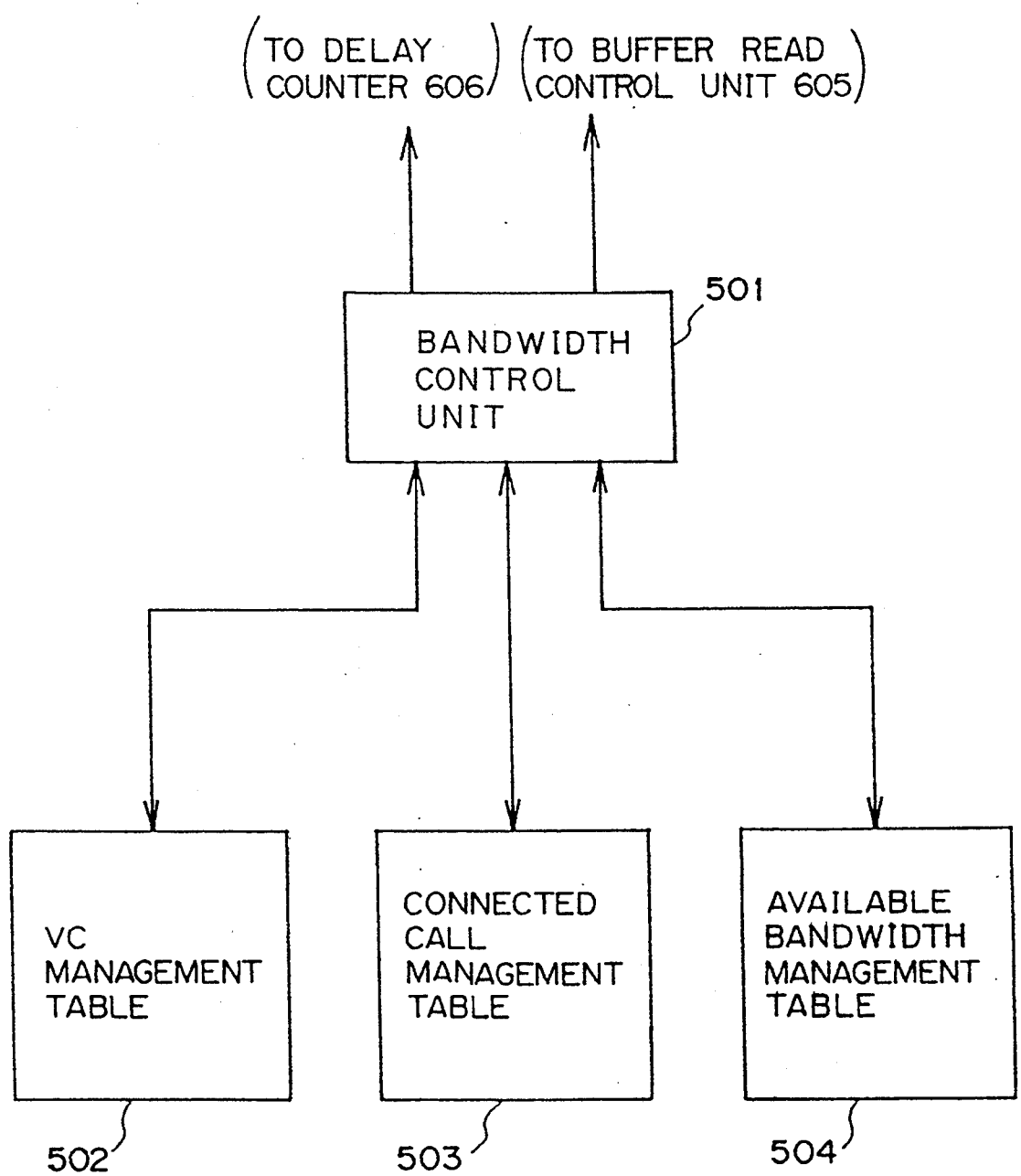
FIG. 5 shows the configuration of the important portion of the first embodiment of the present invention.

FIG. 5 shows the configuration of the important portion of the first embodiment provided in each node according to the present invention.

A bandwidth control unit 501 performs four processes explained later, that is, a call setting process (including a normal call deteriorating process), a normal call detouring process, a normal call quality improving process, and a communication data sequential arrival guaranteeing process, and by referring to a VC management table 502, a connected call management table 503, and a link available bandwidth management table 504.

At this time, the bandwidth control unit 501 controls a buffer read control unit 605 and a delay counter 606 in an output link corresponding unit shown in FIG. 6 will be explained later.

Figure 6:
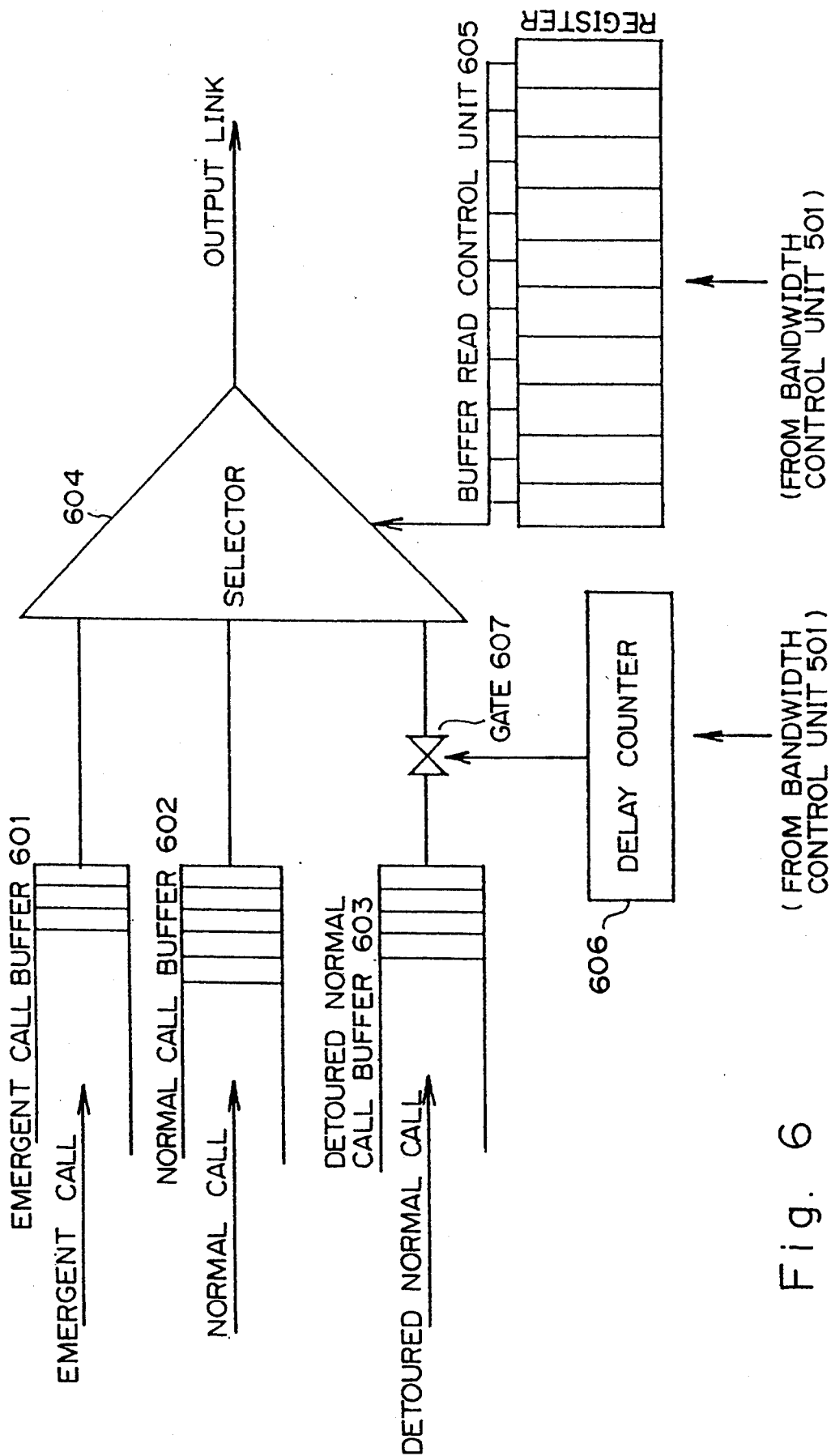
FIG. 6 shows the configuration of the output link corresponding unit according to the first embodiment of the present invention.

FIG. 6 shows the configuration of the output link corresponding unit provided in each node according to the first embodiment of the present invention. The corresponding unit is provided for each output link connected to its node. For example, in node A shown in FIG. 4, the corresponding unit is provided for each of the output links ab and ac.

In FIG. 6, an emergent call buffer 601 and a normal call buffer 602 temporarily store communication data on emergent calls and normal calls respectively. The communication data can be represented in a packet, frame, or cell format depending on the communication method of a network.

A detoured normal call buffer 603 temporarily stores the communication data of a normal call involved in a normal call detouring process described later.

An operation for selectively storing in any of the above described three buffers the communication data to be outputted from a node can be performed by a distributing circuit (not shown in FIG. 4) by determining a VCI added to each piece of the communication data.

A gate 607 is a circuit for stopping the output of the detoured normal call buffer 603 until the delay counter 606 has finished counting a count value predetermined by the bandwidth control unit 501 shown in FIG. 5.

The selector 604 has the communication data outputted by any of the emergent call buffer 601, the normal call buffer, and the detoured normal call buffer 603 selectively outputted to an output link. At this time, the selector 604 sequentially refers to the contents of 10 registers in the buffer read control unit 605 cyclically at each output timing, and selects the output of buffers 601 and 602 (including the buffer 603).

The contents of the 10 registers in the buffer read control unit 605 are set by the bandwidth control unit 501 shown in FIG. 5. The number of the registers corresponds to the value (10) of the transmission capacity of each link according to the 1st embodiment.

Configuration of the Management Table of the System according to the 1st Embodiment Next, examples of the configurations of the VC management table 502, the connected call management table 503, and the link available bandwidth management table 504 are explained below.

First, FIG. 12A shows an example of the configuration of the VC management table 502. In the table, an in-use/out-of-use flag is set. The flag indicates whether or not a VCI, an output link, or a circuit of the direct circuit and the detour circuit of each destination node is in use.

FIG. 12B shows an example of the configuration of the connected call management table 503 provided in node A. In the table, several items are set for each terminal unit in its node. They are a terminal number, a required bandwidth requested by a terminal unit when a call is set, an actually assigned service bandwidth when a call is set, a VCI assigned to a terminal, an output link, and an emergent/normal flag indicating whether the call is an emergent or normal call. If a terminal unit requests for a normal call and a detour circuit is available, then a service bandwidth, a VCI, and an output link are assigned to both a direct circuit and a detour circuit.

FIG. 12C shows an example of the configuration of the link available bandwidth management table 504 provided in node A. In the table, several items are set for all links in a network. They are a link number (an identification code), an available bandwidth, and average waiting time assigned to each link in the normal call buffer 602 shown in FIG. 6. The value of an available bandwidth is updated by the bandwidth control unit 501, and the value of waiting time is outputted as the result of a monitoring process performed by a buffer monitoring circuit (not shown in FIG. 12C) on the state of the normal call buffer 602.

Explanation of Urgent Call and Normal Call in the System according to the 1st Embodiment With the above described configuration of the first embodiment of the present invention, a call in a network is assigned one of two priority levels. An emergent call is accommodated in a network as a higher order broadband call to be necessarily connected when a connection request is issued and to be guaranteed its communication quality. On the other hand, a normal call is accommodated in a network as a low order call which temporarily can be a rejected call depending on the state of a network and its communication quality may not be guaranteed (its available bandwidth may be forcibly reduced).

When a request to connect an emergent call is issued, the network is controlled such that the rate of a successful connection completion of the requisite emergent call can be raised by deteriorating the communication quality of an already accommodated normal call, that is, by delaying the normal call after reducing the service bandwidth assigned to the normal call.

Next, in the above described control, if there is an available bandwidth in a detour circuit to guarantee the deteriorated normal call its initial communication quality, then the normal call is detoured to the normal circuit. As a result, the normal call temporarily deteriorated in its communication quality can initially guarantee its quality.

In the detour circuit, if the normal call is further deteriorated in communication quality by another emergent call, then a quality improving process is performed to reassign the normal call to its initially assigned circuit.

If a detouring process or a quality improving process is performed on the above described normal call, then a sequence guaranteeing process is also performed so that the sequence of communications data on the normal call is guaranteed when they arrive at its destination node.

The practical operation of the first embodiment of the present invention is explained below.

Initial State of the Management Table in the System according to 1st Embodiment

Assume that a terminal unit connected to, for example, node A communicates with another terminal unit connected to node B according to a normal call.

FIGS. 12A and 12B show the states of the VC management table 502, the connected call management table 503, and the link available bandwidth management table 504 shown in FIG. 5 and provided in node A in the above described case.

First, in the VC management table 502 shown in FIG. 12A, virtual circuit 402 is set as having VCIs VC1 trough VC4 in output link ab as a direct circuit to node B as shown in FIG. 4, and virtual circuit 402 is set as having VCIs=VC5 and VC6 in output link ac and relay link cb as a detour circuit to node B.

A direct circuit having VCI=VC1 and a detour circuit having VCI=VC5 are used by a terminal unit connected to node A, each in-use/out-of-use flag is set to "in use".

Next, in the connected call management table 503 shown in FIG. 12B, several items are set. They are: that the terminal number of a terminal connected to node A currently in communication is "1", the required bandwidth requested by the terminal unit when a call is set is "3", the service bandwidth actually set in the direct circuit having the VCI=VC1 when a call is set is also "3", that the output link of the direct circuit is link ab, and that an emergent/normal flag indicates "normal", that is, a call requested by the terminal unit is a normal call.

As a feature related to the present invention, a detour circuit having the VCI VC5 and a service bandwidth of "0" is also assigned to a normal call requested by the above described terminal unit. It will be described later.

Furthermore, in the link available bandwidth management table 504 shown in FIG. 12C, several items are set for all links in a network. They are a link number, an available bandwidth, and average waiting time assigned to each link in the normal call buffer 602 (shown in FIG. 6). As described above, the transmission capacity of each link is 10. Since a call requesting a service bandwidth of 3 is assigned to output link ab as described above, the available bandwidth in the link is 7. The available bandwidths in other links are informed by other nodes. For example, no call exists in links ac, ba, bc, ca, etc. where all bandwidths are available.

Figure 13A:
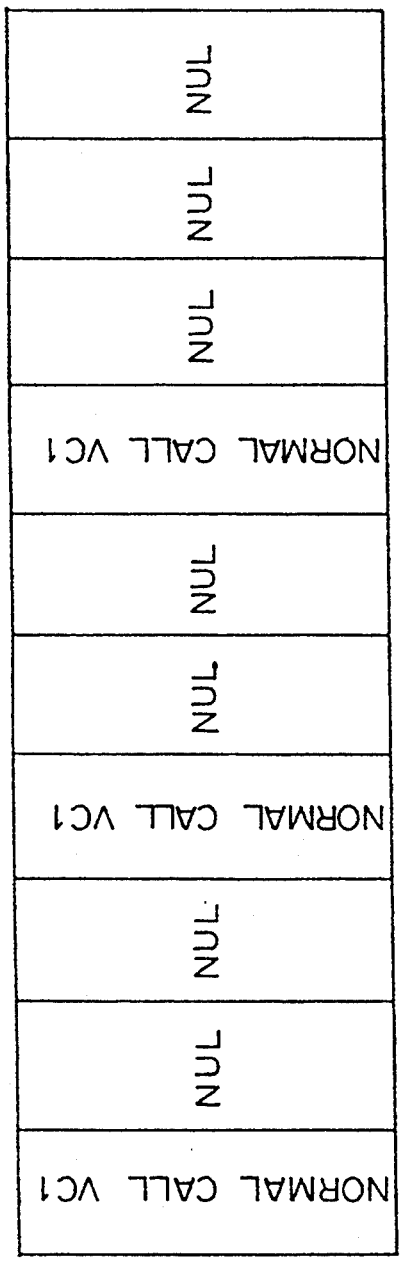
FIGS. 13A and 13B show the state of a buffer read control unit before the first terminal unit issues a request to connect a normal call to the node, according to the first embodiment.
Figure 13B:
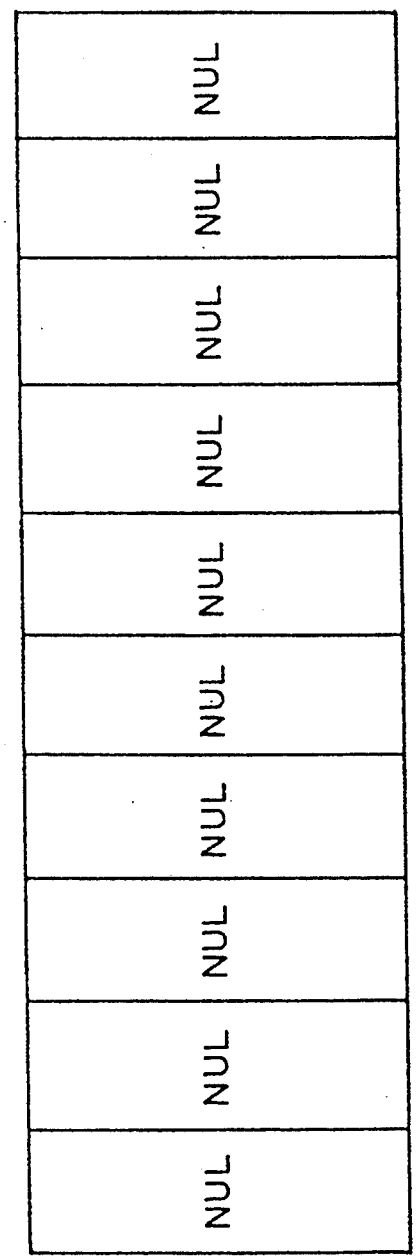

FIGS. 13A and 13B show the state of data set in a register of the buffer read control unit 605 shown in FIG. 6 of each output link in node A when a terminal unit connected to node A communicates with another terminal unit is connected to node B according to a normal call.

First, FIG. 13A shows the state of the register of the buffer read control unit 605 in the output link corresponding unit to output link ab.

The number 10 of the registers corresponds to the transmission capacity 10 of the output link, and the selector 604 shown in FIG. 6 sequentially refers to the contents of the 10 registers cyclically at each output timing to the output link, and outputs the output of either the buffer 601 or the buffer 602 (including the buffer 603) depending on the contents of the cited register.

Therefore, if the service bandwidth of the normal call having the VCI VC1 set in the connected call management table 503 shown in FIG. 12B is "3", then identification data indicating a normal call are set in any three of ten registers. As a result, the selector 604 shown in FIG. 6 in the output link corresponding unit to output link ab outputs to output link ab the communication data on a normal call received by the normal call buffer 602 at the rate of 3 timings in 10 timings. On the other hand, at the timing for which a register set to NUL (invalid data) is referred to, the selector 604 does not select an output of any buffer. The number of registers which are set to NUL depend on the available bandwidth set in the link available bandwidth management table 504 shown in FIG. 12C.

FIG. 13B shows the state of the register of the buffer read control unit 605 in the output link corresponding unit to the output link ac. As shown in the link available bandwidth management table 504, no calls are set in output link ac, and the available bandwidth is 10. Accordingly, as shown in FIG. 13B, all of ten registers are set to NUL. As a result, the selector 604 does not select an output of any buffer.

Normal Call Setting Process in the System according to 1st Embodiment

In the above described initial state, a process to be performed when a connection request of a normal call having a required bandwidth of 2 from terminal unit 2 in node A to destination node B is explained below.

Figure 7:
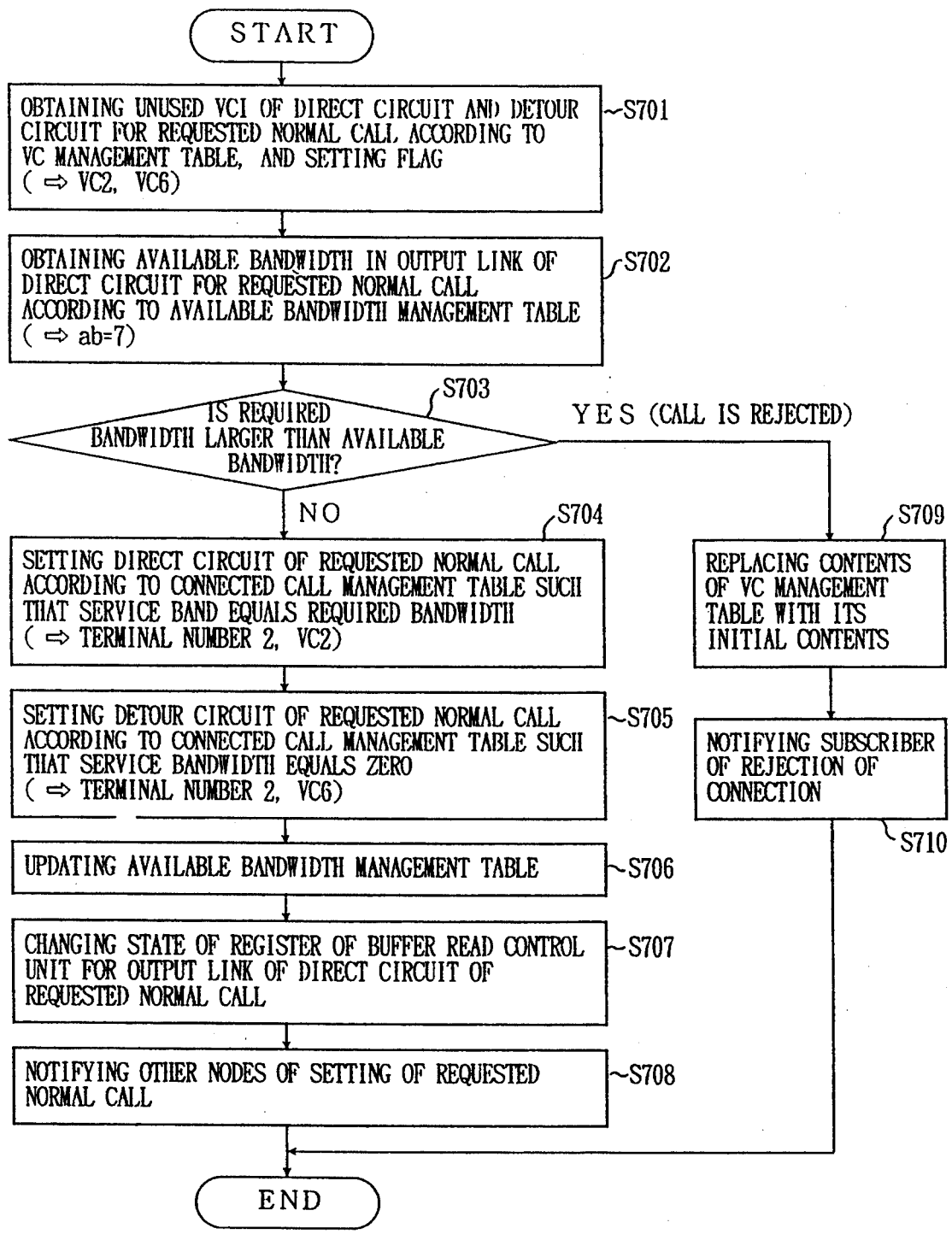
FIG. 7 is the flowchart indicating the operation of setting a normal call according to the first embodiment.

FIG. 7 is the operational flowchart indicating the normal call setting process performed as a program process or a firmware process by the bandwidth control unit 501 shown in FIG. 5. It is explained by referring to FIG. 7.

First, in step S701, each of the unused VCIs is retrieved in a direct circuit and a detour circuit for a requested normal call in the VC management table 502. An unused VCI can be retrieved as a VCI whose in-use/out-of-use flag indicates "out of use". Then, the in-use/out-of-use flag for each of the retrieved VCIs is changed to indicate "in use". For example, in the initial state shown in FIGS. 12A, 12B, 13A, and 13B, a direct circuit having the VCI VC2 and a detour circuit having the VCI VC6 are retrieved, and the state of the VC management table 502 is changed from the state shown in FIG. 12A to the state shown in FIG. 14A.

In step S702, the available bandwidth in the output link of the direct circuit of a requested normal call is read from the link available bandwidth management table 504. The output link of the direct link is read from the VC management table 502. For example, in the initial state shown in FIG. 12C, an available bandwidth of 7 in the output link of the direct circuit of the requested normal call is read. If the direct circuit includes a plurality of nodes and there are a plurality of links forming the direct circuit, then the available bandwidths of all links are retrieved.

Next, in step S703, it is determined whether or not the required bandwidth of a requested normal call is equal to or larger than the above described available bandwidth (total available bandwidth). In the above described example, since the required bandwidth of the requested normal call is "2" and the available bandwidth is "7", the determination indicates "No".

When the determination in step S703 indicates "No", the process in step S704 is performed.

In step S704, a direct circuit is set for a requested normal call with the service bandwidth being equal in size to the required bandwidth in the connected call management table 503. In the above described example, as shown in FIG. 14B, each of the following values is entered to the connected call management table 503. They are the terminal number 2, required bandwidth 2, service bandwidth 2, VCI VC2, output link ab, and emergent/normal flag indicating "normal".

In the next step S705, a detour circuit of a requested normal Gall is set with the service bandwidth being equal to 0 in the connected call management table 503. In the above described example, the following values are entered to the connected call management table 503. They are the service bandwidth 0, VCI VC6, and output link ac as shown in FIG. 14B. Thus, the feature of the 1st embodiment of the present invention resides in that a detour circuit in addition to a direct circuit is reserved with the service bandwidth being equal to 0 when a normal call is set. As a result, a detouring process described later can be performed at a high speed.

In the next step S706, the value of the available bandwidth in the output link of the direct circuit of a requested normal call is updated in the available bandwidth management table 504. In the above described example, since the requested normal call is assigned a service bandwidth 2, the available bandwidth of output link ab is updated from the value 7 shown in FIG. 12C to the value 5 shown in FIG. 14C.

In the next step S707, the state of the register of the buffer read control unit 605 for the output link of the direct circuit of a requested normal call can be updated. In the above described example, since a normal call having the VCI VC2 has been newly set in output link ab, the state of the register of the buffer read control unit 605 for the link is updated from the state shown in FIG. 13A to the state shown in FIG. 15. The state of the register of the buffer read control unit 605 for output link ac as shown in FIG. 13B, is not changed.

Finally, in step S708, the information indicating that a requested normal call has been set in node A is transmitted to other nodes, as call setting information through the direct circuit and the detour circuit of a normal call. Thus, the bandwidth control unit 501 in each of the other nodes updates the contents of the VC management table 502, the connected call management table 503, and the link available bandwidth management table 504, and the state of the register of the buffer read control unit 605 in the output link corresponding unit to each output link. As a result, the contents of each table in each node and the state of the register of the buffer read control unit 605 are synchronously updated.

In the above described step S703, if it is determined that the required bandwidth of a requested call is equal to or larger than the present available bandwidth, then the process in step S709 is performed.

In step S709, the state of the in-use/out-of-use flag set in the above described step S709 is returned to the original state.

Furthermore, in the next step S710, the rejection of the connection of the requested normal call is notified to the subscriber (terminal unit).

Urgent Call Setting Process including Deteriorating Normal Call in the System according to 1st Embodiment Next, explained below is a process to be performed when a request is issued in node A to connect a new emergent call from terminal unit 3 to node B having a required bandwidth of 7.

Figure 8:
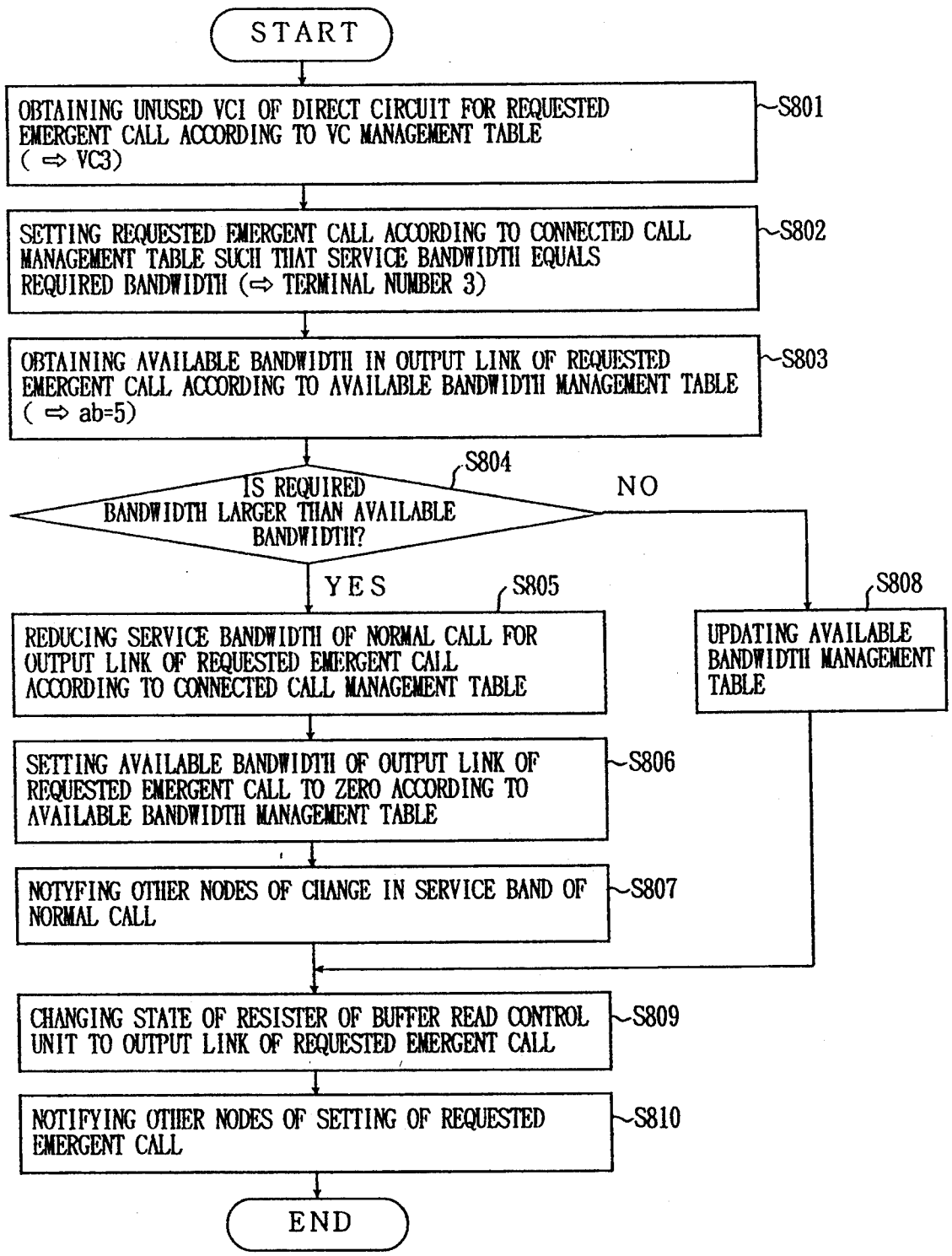
FIG. 8 is the flowchart indicating the operation of setting an emergent call including a deteriorating process performed on a normal call according to the first embodiment.

FIG. 8 is the flowchart indicating the operation of setting an emergent call indicating the deteriorating process of a normal call performed as a program process or a firmware process carried out by the bandwidth control unit 501 shown in FIG. 5. The operation is explained by referring to FIG. 8.

First, in step S801, an unused VCI in the direct circuit for a requested emergent call is retrieved in the VC management table 502. No retrieval is performed for a detouring circuit. Then, the in-use/out-of-use flag for the retrieved VCI is changed to "in use". For example, in the states shown in FIG. 14A, 14B, and 14C, a direct circuit having the VCI=VC3 is retrieved, and the state of the VC management table 502 is changed from the state shown in FIG. 14A to the state shown in FIG. 16A.

Next, in step S802, a direct circuit of a requested emergent call is set with the service bandwidth being equal in size to the required bandwidth in the connected call management table 503. In the above described example, each of the following data are entered into the connected call management table 503 as shown in FIG. 16B. They are the terminal number 3, required bandwidth 7, service bandwidth 7, VCI VC3, output link ab, and emergent/normal flag indicating "emergent". At this state, each information on terminal unit 1 and 2 has not been changed as shown in FIG. 16B, but remains as shown in FIG. 14B.

Next, in step S803, the available bandwidth in the output link of the direct circuit of a requested emergent call is read from the link available bandwidth management table 504. The output link of the direct circuit is read from the VC management table 502. For example, in the state shown in FIG. 14, the available bandwidth of 5 in output link ab of the direct circuit of the requested emergent call is read. If the direct circuit includes a plurality of nodes and a plurality of links forming the direct circuit exist, then the available bandwidths of all links are retrieved.

Next, in step S804, it is determined whether or not the required bandwidth of the requested emergent call is equal to or larger than the above described available bandwidth (all available bandwidth). In the above described example, since the required bandwidth of the requested emergent call is 7 and the available bandwidth is 5, the determination indicates "Yes".

If the determination in step S804 indicates "Yes", then the process in step S805 is performed.

In step S805, the value of the service bandwidth of each normal call set for the output link of the direct circuit of a requested emergent call is forcibly made smaller depending on the rate of a required bandwidth of each normal call. In the above described example, the service bandwidth of each normal call in output link ab for terminal units 1 and 2 is reduced from the values 3 and 2 shown in FIG. 14B to the value of 2 and 1 shown in FIG. 16B respectively.

In the next step S806, the available bandwidth for the output link of the direct circuit of the requested emergent call is updated to 0 in the link available management table 504.

In the above described example, the available bandwidth of output link ab is updated from the value 5 shown in FIG. 14C to the value 0 shown in FIG. 16C.

In the next step 807, the update of the service bandwidth of a normal call is notified to another node through the direct line of the normal call. Thus, the bandwidth control unit 501 in another node updates the contents of the connected call management table 503 and the link available bandwidth management table 504 and the state of the register of the buffer read control unit 605 in the output link a corresponding unit to an output link.

In the next step S809, the state of the register of the buffer read control unit 605 for the output link of the direct circuit of a requested emergent call is changed. In the above described example, since a new emergent call having the VCI VC3 is set in output link ab and the service bandwidth of each of the normal calls having the VCIs VC1 and VC2 has been changed, the state of the register of the buffer read control unit 605 for the link is changed from the state shown in FIG. 15 to the state shown in FIG. 17. The state of the register of the buffer read control unit 605 for output link ac shown in FIG. 13B is not changed.

Figure 15:
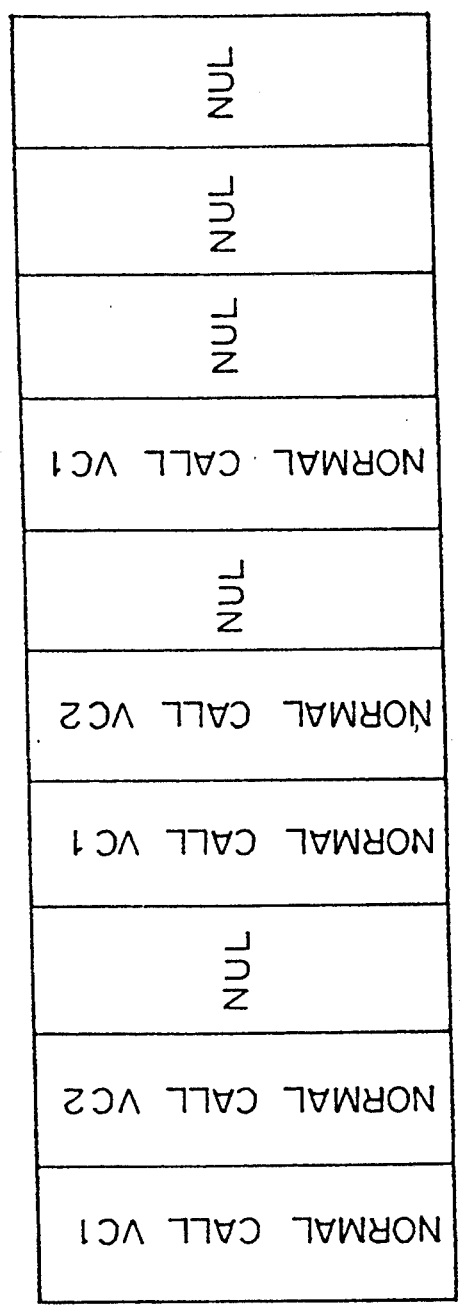
FIG. 15 shows the state of a buffer read control unit after a normal call from the first terminal unit, to the node, has been successfully,set according to the first embodiment.
Figure 17:
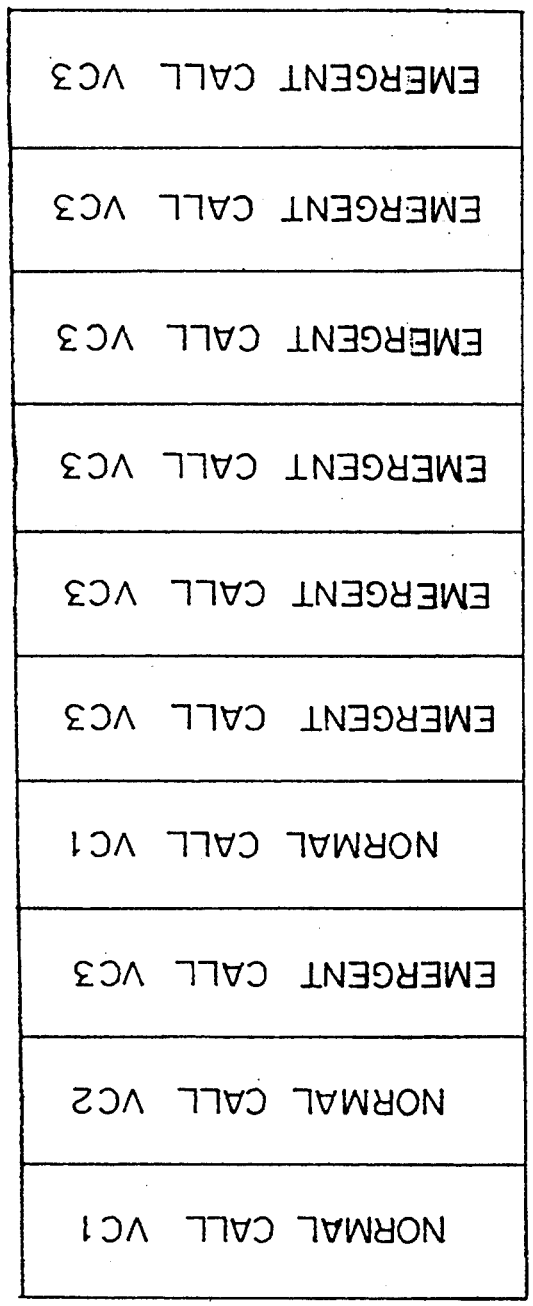
FIG. 17 shows the state of a buffer read control unit after a normal call from the second terminal unit, to the node, has been successfully set according to the first embodiment.

The comparison between FIGS. 15 and 17 indicates that the rate at which the output of the normal call buffer 602 is selected by the selector 604 is lowered. As a result, the delay in the normal call buffer 601 is increased and the quality of a normal call is lowered. On the other hand, the output of the emergent buffer 601 is selected by the selector 604 at the rate of the present required bandwidth.

In the next step S810, the information that the requested emergent call has been set in node A is given to other nodes as call setting information through the direct circuit of the emergent call. Thus, the bandwidth control unit 501 of each of the other nodes updates the contents of the VC management table 502 and the state of the buffer read control unit 605 in the output link the corresponding unit to an output link.

In the above described step S804, if it is determined that the required bandwidth of a requested emergent call is smaller than the available bandwidth, then there is enough available bandwidth in the output link and it is not necessary to change the service bandwidth of a normal call in the connected call management table 503. Therefore, in step S808 where the process in the previous step S706 is performed, only the process of updating the link available bandwidth management table 504 is performed. Afterwards, the above described steps S809 and S810 are performed.

Thus, an emergent call can be assigned a service bandwidth equal in size to its required bandwidth with higher priority while the quality of a normal call is deteriorated if necessary.

Detouring Process of Normal Call in the System according to the 1st Embodiment

Next, described below is a process of detouring a normal call whose service bandwidth has been reduced according to the above described emergent call setting process.

Figure 9:
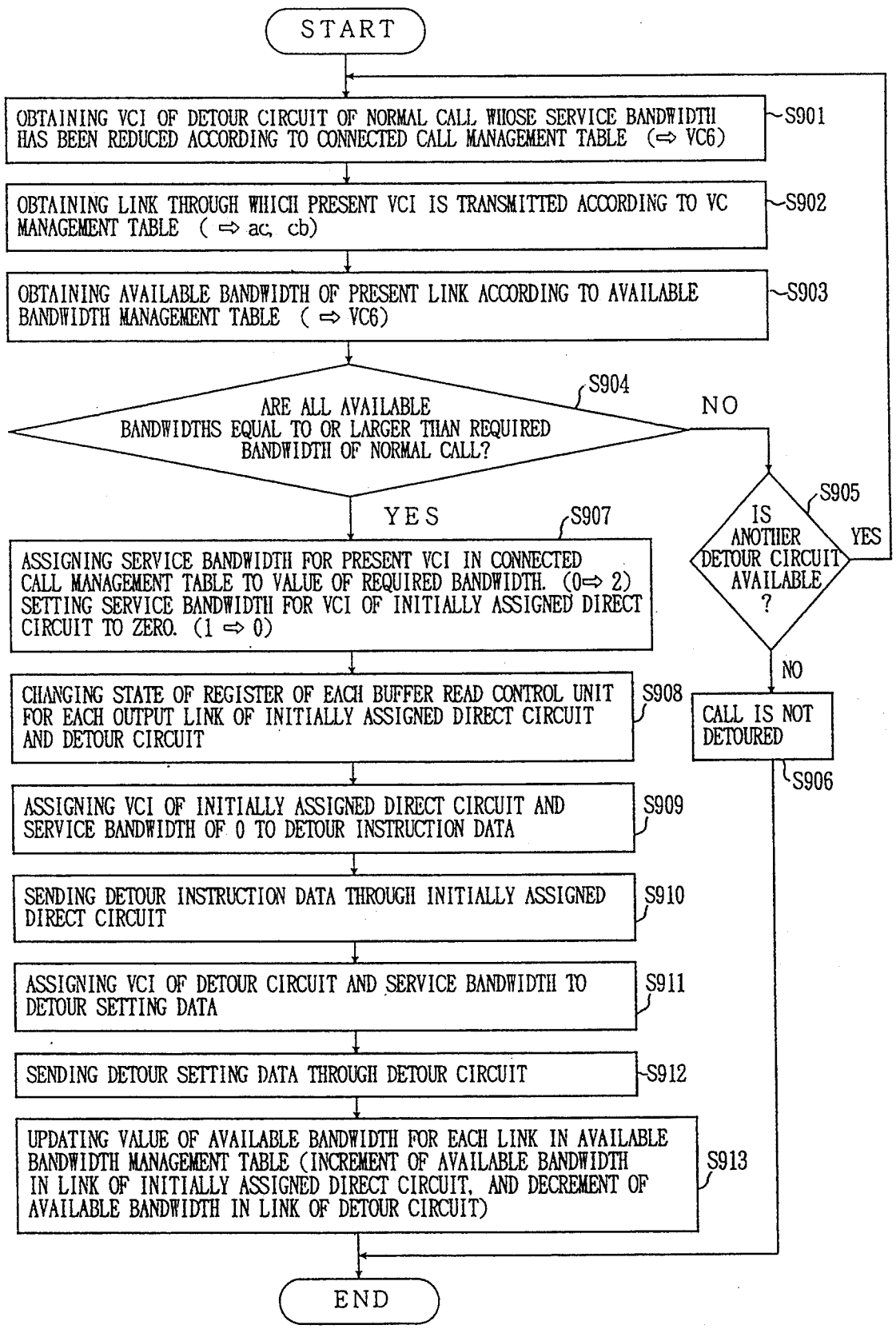
FIG. 9 is the flowchart indicating the operation of detouring a normal call according to the first embodiment.

FIG. 9 is the flowchart indicating the operation of detouring a normal call as a program process or a firmware process performed by the bandwidth control unit 501 shown in FIG. 5. The operation is explained by referring to FIG. 9.

First, in step S901, the VCI of the detour circuit of a normal call whose service bandwidth has been reduced is detected according to the connected call management table 503. If there is a plurality of normal calls whose service bandwidth has been reduced, they are sequentially selected in the order of the smallest required bandwidth. At the state shown in FIG. 16B, VC6 is first detected as the VCI of the detour circuit of a normal call from terminal unit 2. Although a similar process is performed as described later for a normal call from terminal unit 1, the normal call from terminal unit 2 is described first.

Next, in step S902, the output link and the relay link set for the VCI of the above described detour circuit are retrieved in the VC management table 502. In the examples above, output link ac and relay link cb having the VCI VC6 are detected in the VC management table 502.

Then, in step S903, each of the available bandwidths in the output link and the relay link detected in step S902, are read from the link available bandwidth management table 504. In the example above, the available bandwidth of 10 for output link ac and the available bandwidth of 7 for relay link cb are read from the link available bandwidth management table 504 shown in FIG. 16C.

Next, in step S904, it is determined whether or not all available bandwidths read as described above are equal to or larger than the required bandwidth of a normal call to be detoured. The required bandwidth of a normal call is read by the connected call management table 503.

If the determination in step S904 indicates "No", it is determined whether or not another detour circuit is set for a normal call to be detoured in the connected call management table 503 in step S905. If the determination indicates "Yes", each of the processes from S901 through S904 is repeated. If the determination in step S905 indicates "No", the call is not detoured (step S906).

If the determination in step S904 is "Yes", it indicates that the normal call can be detoured to the detour circuit.

In this case, in step S907, the required bandwidth of a normal call to be detoured is assigned a service bandwidth for the VCI of the above described detour circuit in the connected call management table 503. The service bandwidth of the initially assigned direct circuit is set to 0. In the example, the service bandwidth of the detour circuit having the VCI VC6 of the normal call from the terminal unit 2 is set to 2, and the service bandwidth of the initially assigned direct circuit having the VCI VC2 is set to 0. As a result, the state of the connected call management table 503 is changed from the state shown in FIG. 16B to the state shown in FIG. 18B.

In the next step S908, the state of the register of each buffer read control unit 605 (FIG. 6) for each output link of the initially assigned direct circuit and a new detour circuit is changed. In the above described example, the information on a normal call having the VCI VC2 in output link ab of the direct circuit is replaced with null, and two pieces of the information on a normal call having the VCI VC6 in output link ac of the detour circuit are added (corresponding to the value of 2 for the service bandwidth). As a result, the states of the registers are changed from the state shown in FIG. 17

Figure 19A:
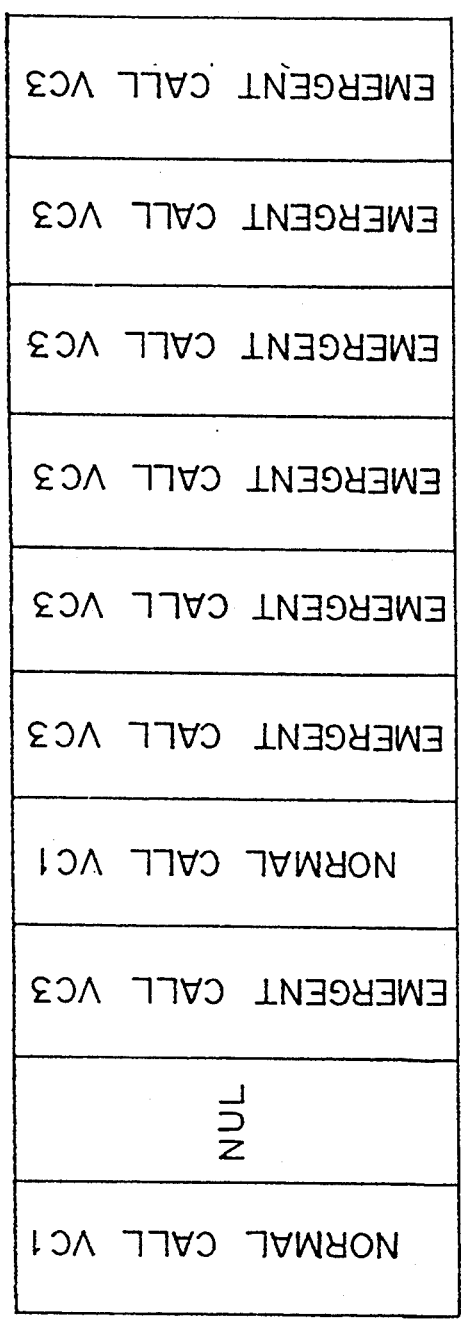
FIGS. 19A and 19B show the state of a buffer read control unit after a normal call from the second terminal unit to the node has been successfully set, and after a normal call from the first terminal unit has been detoured according to the first embodiment.
Figure 19B:
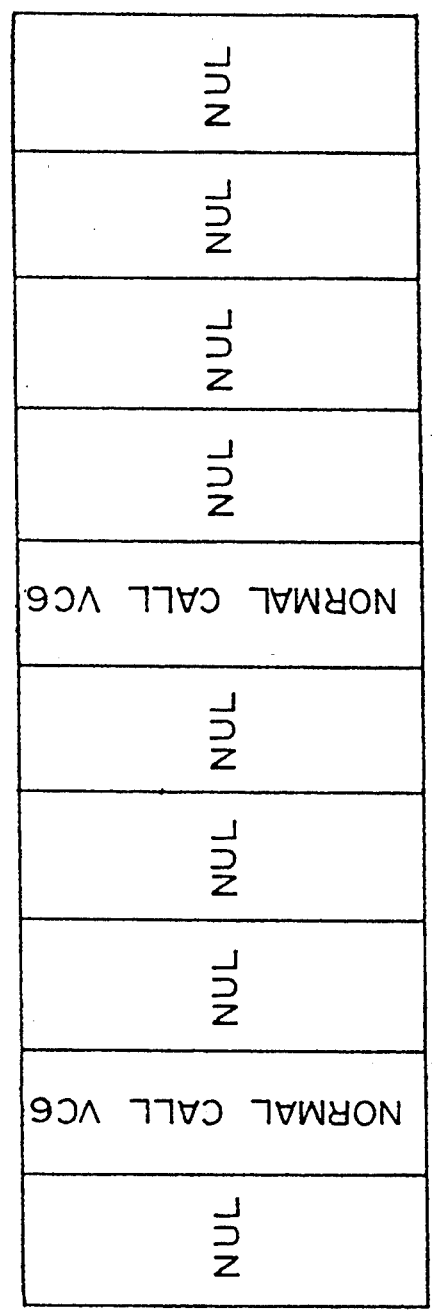

(output link ab) and the state shown in FIG. 13B (output link ac) to the state shown in FIGS. 19A and 19B respectively. Each output link of the initially assigned direct circuit and a new detour circuit is read from the connected call management table 503.

Figure 22:
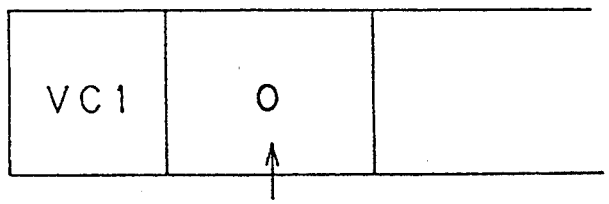
FIG. 22 shows the format of detour instruction data according to the first embodiment.

Next, in step S909, the VCI of an initially assigned direct circuit and the value of the service bandwidth of 0 is entered into the detour instruction data. In step S910, the detour instruction data is provided for other nodes through the initially assigned direct circuit. Thus, the bandwidth control units 501 of other nodes update the contents of the connected call management table 503 and the link available bandwidth management, table 504, and the state of the register of the buffer read control unit 605 in the output link corresponding the unit to an output link. FIG. 22 shows the format of the detour instruction data. In the above described example, the detour instruction data are sent with the VCI set to VC2 and the service bandwidth set to 0.

Figure 23:
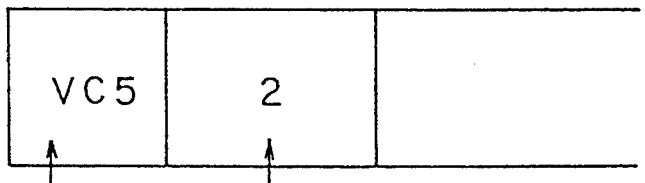
FIG. 23 shows the format of detour setting data according to the first embodiment.

Furthermore, in step S911, the VCI of a detour circuit and the value of a service bandwidth are entered to the detour instruction data. Then, in step S912, the detour instruction data are provided for other nodes through a detour circuit. Thus, the bandwidth control units 501 in other nodes update the contents of the connected call management table 503 and the link available bandwidth management table 504, and the state of the register of the buffer read control unit 605 in the output link corresponding the unit to an output link. FIG. 23 shows the format of the detour setting data. In the above described example, the detour setting data are sent with the VCI set to VC6 and the service bandwidth is set to 2.

Finally, in step S913, the value of an available bandwidth for the output link of the initially assigned direct circuit and the value of an available bandwidth for the output link of a new detour circuit are updated in the link available bandwidth management table 504. In the above described example, the available bandwidth in output link ab of the direct circuit is increased by the service bandwidth of 1, that is, the amount reduced by the detour, and each available bandwidth in output link ac and relay link cb of the detour circuit is reduced by the service bandwidth of 2, that is the amount increased by the detour. As a result, the state of the link available bandwidth management table 504 is changed from the state shown in FIG. 16C to the state shown in FIG. 18C. Each output link of the initially assigned direct circuit and a new detour circuit is read from the connected call management table 503.

According to the above described operation, a normal call from terminal unit 2 is detoured from the initially assigned direct circuit having the VCI VC2 to the detour circuit having the VCI VC6.

Furthermore, the similar operation is tried on the normal call from terminal unit 1. As a result, the normal call is detoured from the initially assigned direct circuit having the VCI VC1 to the detour circuit having the VCI VCS.

In this case, each of the states of the VC management table 502, the connected call management table 503, and the link available, bandwidth management table 504 is changed from each of the states shown in FIGS. 18A, 18B, and 18C to each of the states shown in FIGS. 20A, 20B, and 20C. The state of the register of each buffer read control unit 605 for output link ab of the initially assigned direct circuit and output link ac of the detour circuit is changed from each state shown in FIG. 19A and 19B to each state shown in FIGS. 21A and 21B.

Quality Improving Process on Normal Call in the System according to the 1st Embodiment Finally, when a normal call is detoured in a normal call detouring process and when a request to connect another emergent call has been issued to a direct circuit sharing its output link with the detour circuit, the service bandwidth of the normal call can be reduced again by the emergent call setting process shown in FIG. 8.

In this case, after a detoured normal call has been deteriorated in communication quality, another normal call initially assigned to the above described direct circuit is deteriorated in communication quality if necessary. Thus, the quality of a normal call initially assigned to the above described direct circuit can be guaranteed to the utmost.

When a normal call already detoured is furthermore deteriorated in communication quality, then a communication quality improving process is performed to determine whether or not the normal call can be reassigned to its initially assigned direct circuit.

Figure 10:
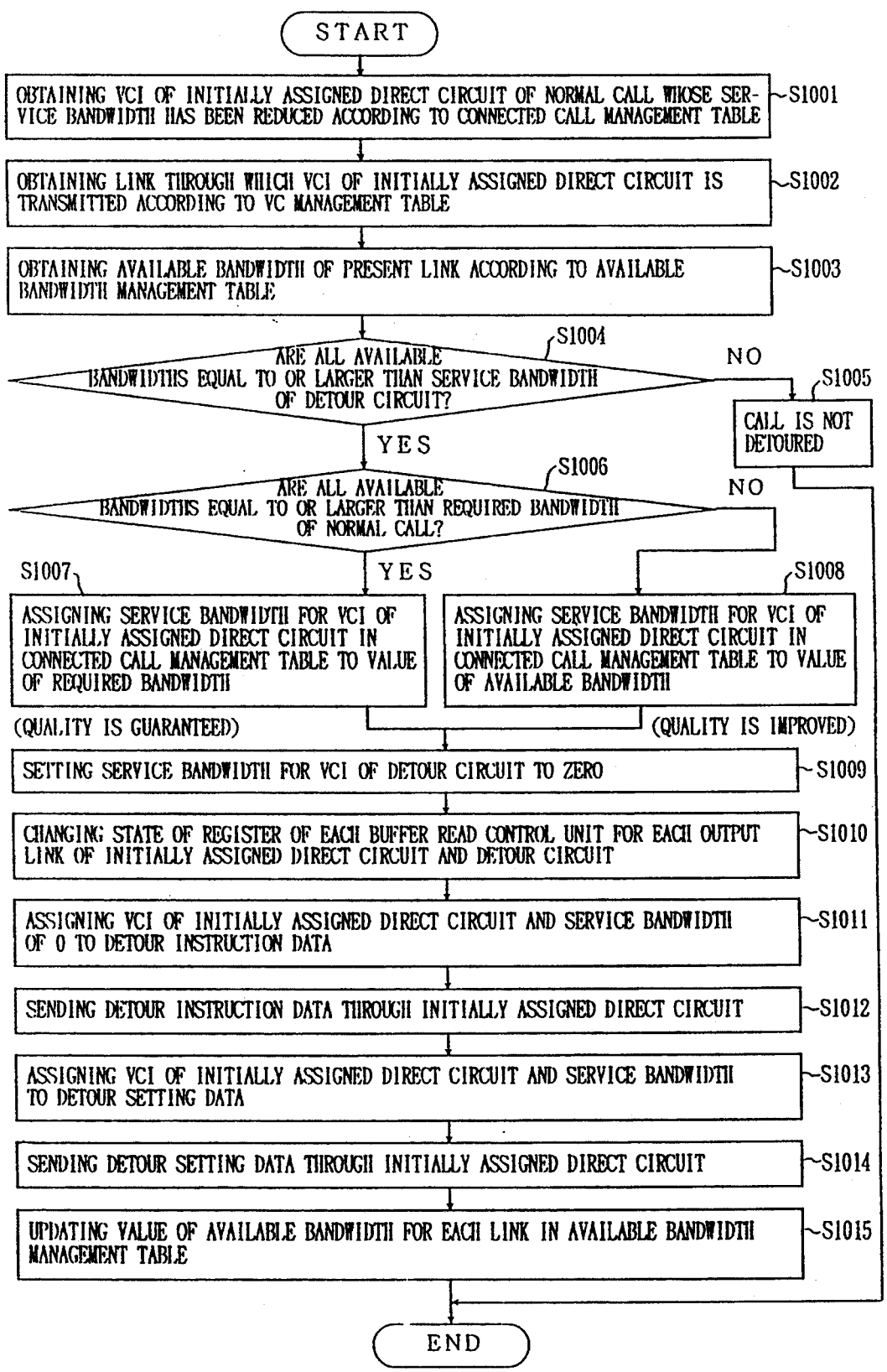
FIG. 10 is the flowchart indicating the operation of improving the communication quality of a normal call according to the first embodiment.

FIG. 10 is the flowchart indicating the operation of the quality improving process performed on a normal call as a program process or a firmware process carried out by the bandwidth control unit 501. The operation is explained by referring to FIG. 10.

First, in step S1001, the VCI of the initially assigned direct circuit of a normal call whose service bandwidth has been already reduced in its detoured circuit is detected in the connected call management table 503. If a plurality of such normal calls exist, each of them is sequentially selected in the order of the smallest required bandwidth.

Next, in step S1002, an output link for the VCI of the initially assigned direct circuit is detected in the VC management table 502. If the direct circuit has a plurality of nodes involved, and if there are a plurality of links forming the direct circuit, all links are retrieved.

In step S1003, the available bandwidth of the output link detected in step S1002 is read from the link available bandwidth management table 504.

Next, in step S1004, it is determined whether or not all the available bandwidths read as described above are equal to or larger than the service bandwidth in the detour circuit of a normal call to be detoured. The service bandwidth of the normal call is read from the connected call management table 503.

If the determination in step S1004 is "No", the normal call cannot be reassigned to its initially assigned direct circuit (step S1005).

If the determination in step S1004 is "Yes", the normal call can be reassigned to its initially assigned direct circuit.

In this case, in step S1006, it is determined whether or not all available bandwidths read as described above are equal to or larger than the required bandwidth of the normal call to be reassigned to its initially assigned direct circuit. The required bandwidth of the normal call is read from the connected call management table 503.

If the determination in step S1006 indicates "Yes", then the service bandwidth corresponding to the VCI of the initially assigned direct circuit in the connected call management table 503 is set to the value of the required bandwidth of the normal call to be reassigned to its initially assigned direct circuit in step S1007.

If the determination in step 1006 indicates "No", then the service bandwidth corresponding to the VCI of the initially assigned direct circuit in the connected call management table 503 is set to the value of the available bandwidth obtained in step S1003 in step S1007.

Next, in step S1009, the service bandwidth of the detour circuit is set to 0 in the connected call management table 503.

In the next step S1010, the state of the register of each buffer read control unit 605 (shown in FIG. 6) to each output link of an initially assigned direct circuit and a detour circuit, is changed.

Next, in step S1011, the VCI of the detour circuit and the service bandwidth of 0 are entered into the detour instruction data. In step S1012, the detour instruction data are provided for other nodes through the detour circuit. Thus, the contents of the connected call management table 503 and the link available bandwidth management table 504 and the state of the register of the buffer read control unit 605 in the output link corresponding the unit to an output link are updated by the bandwidth control unit 501. The format of the detour instruction data is the same as that shown in FIG. 22.

Furthermore, in step S1013, the VCI of the initially assigned direct circuit and the value of the service bandwidth are entered into the detour setting data. Then, in step S1014, the detour setting data are provided to other nodes through the initially assigned direct circuit. Thus, the bandwidth control units 501 of other nodes update the contents of the connected call management table 503 and the link available bandwidth management table 504, and the state of the register of the buffer read control unit 605 in the output link corresponding unit to an output link. The format of the detour setting data is the same as that shown in FIG. 23.

Finally, in step S1015, the value of the available bandwidth for the output link of the initially assigned direct circuit and the value of the available bandwidth for the output link of the detour circuit are updated in the link available bandwidth management table 504.

Communication Data Sequential Arrival Guaranteeing Process in the System according to the 1st Embodiment If a normal call is detoured from a direct circuit to a detour circuit by a normal call detouring process or a normal call quality improving process, or if a normal call is reassigned to its initially assigned direct circuit, then the following problem can arise.

That is, if the buffer waiting time in the normal call buffer 602 shown in FIG. 6 connected to the output link of a circuit used before a detouring process or a reassigning process is longer than the buffer waiting time in the normal call buffer 602 connected to the output link of the circuit used after the detouring process or the reassigning process, then the communication data to be handled in the detouring process or the reassigning process and remaining in the normal call buffer 602 connected to the output link of the circuit used before the detouring process or the reassigning process may arrive at a destination node later than the communication data to be handled in the detouring process or the reassigning process and transmitted through a new circuit immediately after the detouring process or the reassigning process when the communication data to be handled in the detouring process or the reassigning process and remaining in the normal buffer 602 connected to the output link of the circuit used immediately before the detouring process or the reassigning process are transmitted to the destination node through the circuit.

That is, the first-sent communication data can arrive at a destination node later than the later-sent communication data, and the sequence of the communication data may not be maintained.

For example, as indicated by the change shown in FIGS. 16A, 16B, and 16C and in FIGS. 18A, 18B, and 18C, if the service bandwidths of the normal calls of terminal units 1 and 2 are reduced by setting the emergent call of terminal unit 3, and the normal call of terminal 2 is detoured to a detour circuit, then the waiting time in the normal call buffer 602 for output link ab for the initially assigned direct circuit is 90 μsec. By contrast, the waiting time in the normal call buffer 602 connected to the output link ac of the detour circuit is 20 μsec, as shown in FIG. 18C. In this case, the above described problem can arise in the communication data of the normal call from terminal unit 2.

To prevent such a problem, the sequential arrival of communication data can be guaranteed by controlling the detoured normal call buffer 603 and the delay counter 606 according to the 1st embodiment of the present invention.

First, the bandwidth control unit 501 turns off the gate 607 shown in FIG. 6 for the output link of the circuit used before a detouring process and a reassigned process, so that the output of the detoured normal call buffer 603 may not be provided for the selector 604.

Next, a distributing circuit not shown in FIG. 6 has the detoured normal call buffer 603 shown in FIG. 6 store the communication data after determining the VCI provided for the outputted communication data, if it is the VCI of a new circuit.

Figure 11:
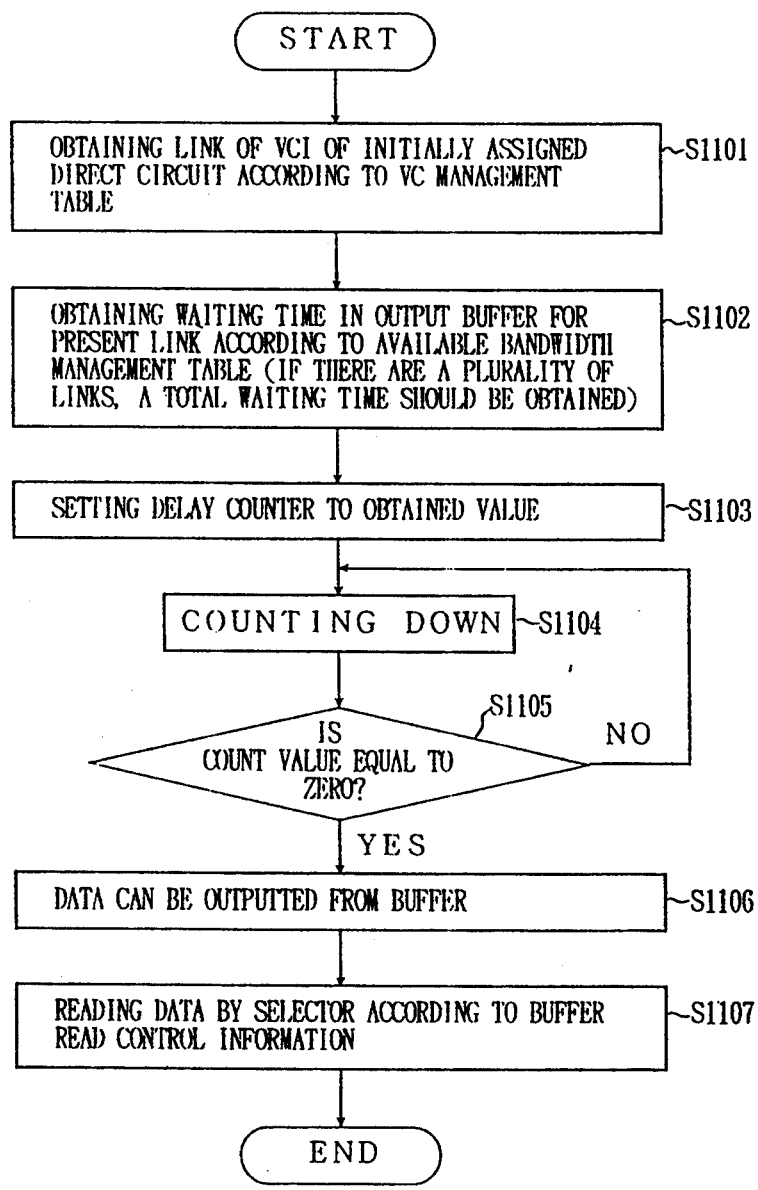
FIG. 11 is the flowchart indicating the operation of guaranteeing the sequential arrival of communications data according to the first embodiment.

Afterwards, the bandwidth control unit 501 shown in FIG. 5, performs a program process or a firmware process shown by the operational flowchart shown in FIG. 11. The explanation is given by referring to FIG. 11.

In step S1101, an output link assigned according to the VCI of an initially assigned circuit for a normal call handled in a detouring process or a reassigning process is retrieved from the VC management table 502. For example, in an example of a change shown in FIGS. 16A, 16B, and 16C and FIGS. 18A, 18B, and 18C, output link ab for the VCI VC2 is detected in the VC management table 502 shown in FIG. 16A.

Next, in step S1102, the waiting time in the normal call buffer 602 for each of the detected links can be retrieved from the link available bandwidth management table 504. When an initially assigned circuit includes a plurality of nodes and a plurality of links form the circuit, a total of the waiting time for each link in the normal call buffer 602 is calculated. For example, in an example of a change shown in FIGS. 16A, 16B, and 16C and FIGS. 18A, 18B, and 18C, the waiting time of 100 μsec or for output link ab is read from the link available bandwidth management table 504 shown in FIG. 16C.

Then, in step S1103, the value of the above described waiting time is assigned in the delay counter 606 shown in FIG. 6 for the output link of a new circuit. For example in an example of a change shown in FIGS. 16A, 16B, and 16C and FIGS. 18A, 18B, and 18C, the waiting time of 100 sec is assigned in the delay counter for the output link ac of a new circuit.

Afterwards, the process in step S1104 of counting down the counter value of the delay counter 606 is performed until it is determined that the counter value indicates 0 in step S1105.

If it is determined that the counter value indicates 0 in step S1105, the gate 607 is turned on in step S1106. As a result, communication data can be read from the detoured normal call buffer 603.

Afterwards, the output of the detoured normal buffer 603 is provided for the output link according to the contents of the buffer read control unit 605 in step S1106. The selector 604 selects the output of the gate 607 when the register of the buffer read control unit 605 currently referred to is set to the VCI of a new circuit. For example, the gate 607 in FIG. 19B is selected at the timing at which the register is set to VCI VC6 is referred to.

As described above, when a normal call is handled in a detouring process or a reassigning process, the sequential arrival of communication data on a normal call to be handled in the detouring process or the reassigning process can be guaranteed by forcibly delaying the start of outputting the communication data on the normal call to be handled in the detouring process or the reassigning process in the output link corresponding unit to the output link of a new circuit.

Configuration of the System according to a 2nd Embodiment

Figure 24:
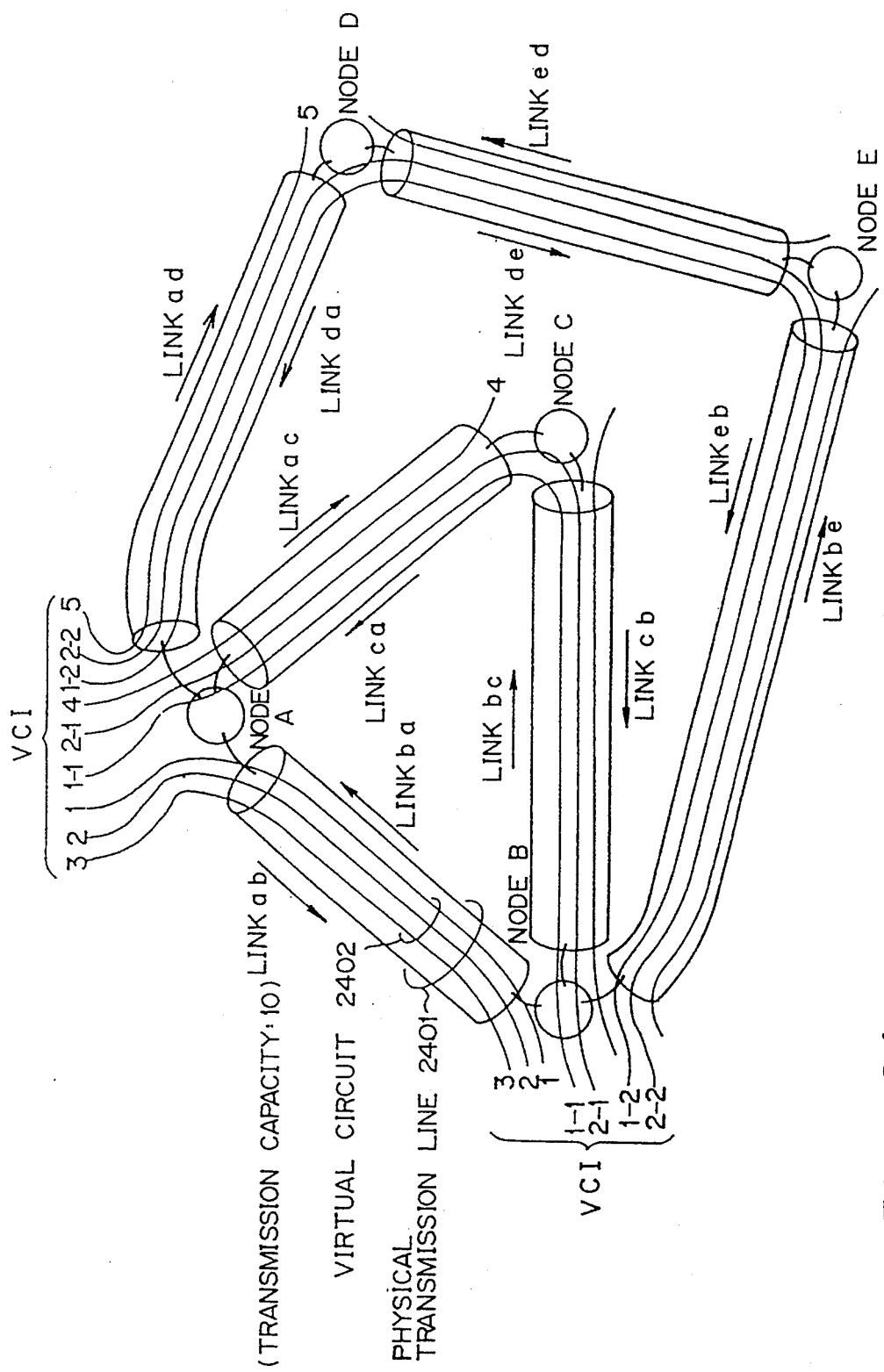
FIG. 24 shows an example of a network model used in the second embodiment of the present invention.

FIG. 24 shows an example of a network model used in the 2nd embodiment of the present invention. In the example, the model is designed such that five nodes A, B, C, D, and E are interconnected through the physical transmission lines 2401 identified by ab, ba, etc. for comprehensibility. The transmission capacity of each link is, for example, 10 (megabits/sec.).

In the above described network, the virtual circuit (VC) 202 is provided. It is a logical circuit identified by a virtual circuit identifier (VCI), and a node communicates with another node through a VC identified by a VCI.

For example, in the network, VCIs 1–3 refer to direct circuits between nodes A and B set in link ab, VCI 4 refers to a direct circuit between nodes A and C in link ac, and VC 15 refers to a direct circuit between nodes A–D set in link ad. VCIs 1-1 and 1-2 refer to detour circuits set in links ac and cb respectively for each of the VCI 1 and VCI 2 between nodes A–B. Similarly, VCIs 1-1 and 2-1 refer to detour circuits between nodes A and B in links ad, de, and eb for each of the direct circuits VCI 1 and VCI 2 respectively.

Figure 25:
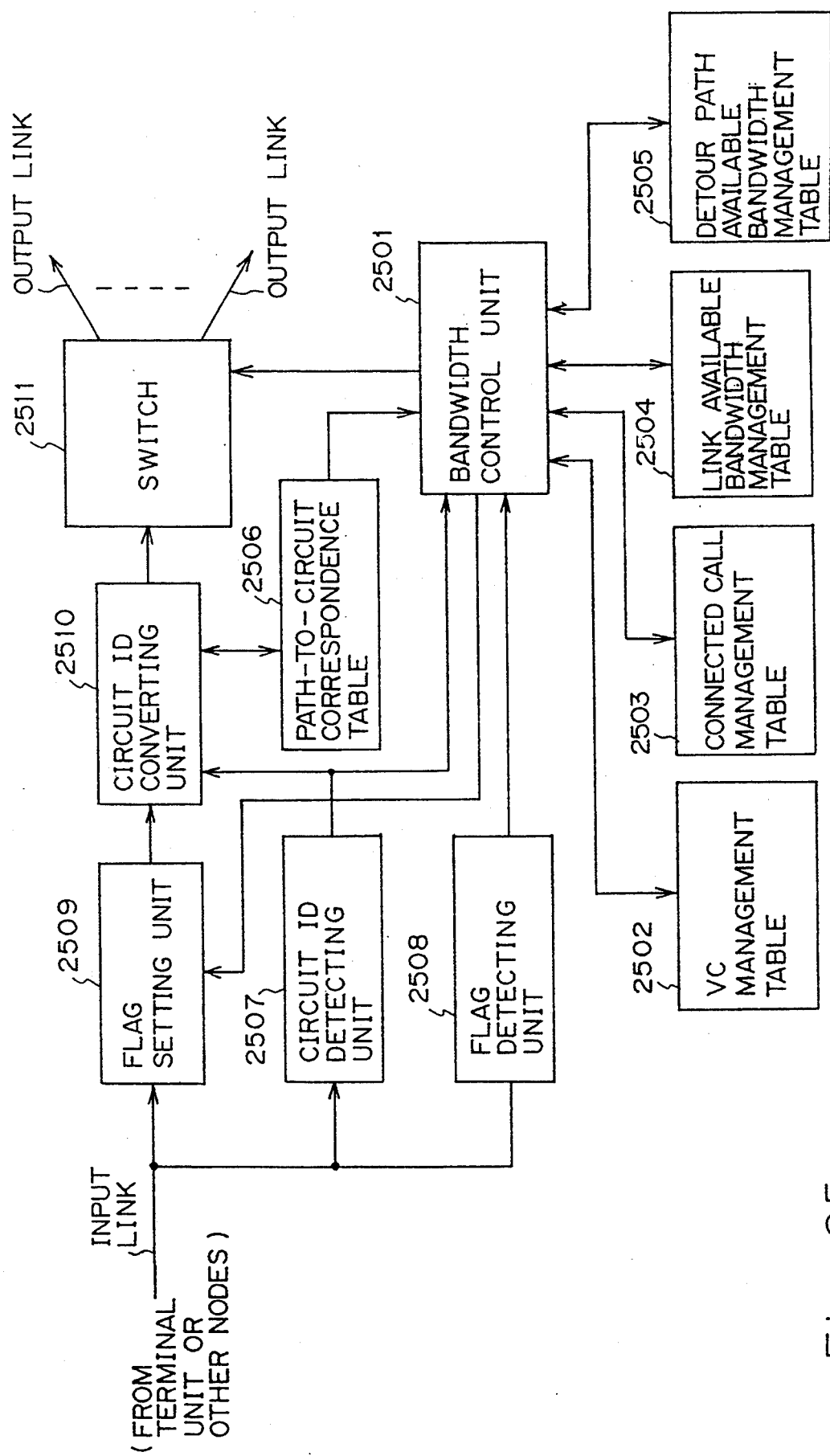
FIG. 25 shows the configuration of the important portion according to the second embodiment of the present invention.

FIG. 25 shows the configuration of an important portion provided in each node shown in FIG. 24 according to the 2nd embodiment of the present invention.

A bandwidth control unit 2501 performs a call setting process (including a normal call deteriorating process), a normal call detouring process, a normal call improving process, and a call receiving process for controlling the detour of a normal call by controlling the contents of a VC management table 2502, a connected call management table 2503, a link available bandwidth management table 2504, a detour path available bandwidth management table 2505, and a path-to-circuit correspondence table 2506. In this case, the bandwidth control unit 2501 refers to a circuit ID detecting unit 2507 connected to an input link and a flag detecting unit 2508.

The bandwidth control unit 2501 controls the buffer read control unit 2604 of an output link corresponding unit shown in FIG. 26 in a switch 2511 shown in FIG. 26, which will be explained later.

A flag setting unit 2509 sets a flag indicating that the present data are the last data in the circuit on the communication data on the last received normal call in the circuit when a normal call having one VCI is detoured to a detour circuit or reassigned its initially assigned circuit. The function of the flag is described later.

The circuit ID converting unit 2510 determines whether or not a detour circuit for a direct circuit corresponding to the VCI is selected in the path-to-circuit correspondence table 2506, each time the circuit ID detecting unit 2507 detects a VCI in the communication data on a normal call entered through an input link. If the answer is yes, the circuit ID converting unit 2510 replaces the VCI of a direct circuit with the VCI of the detour circuit selected in the communication data on a normal call entered through an input link, and provides the communication data on the normal call from the switch 2511.

Based on the VCI added to the inputted communication data, the switch 2511 switches the communication data and provides for them the output link corresponding unit connected to any output link explained later.

Figure 26:
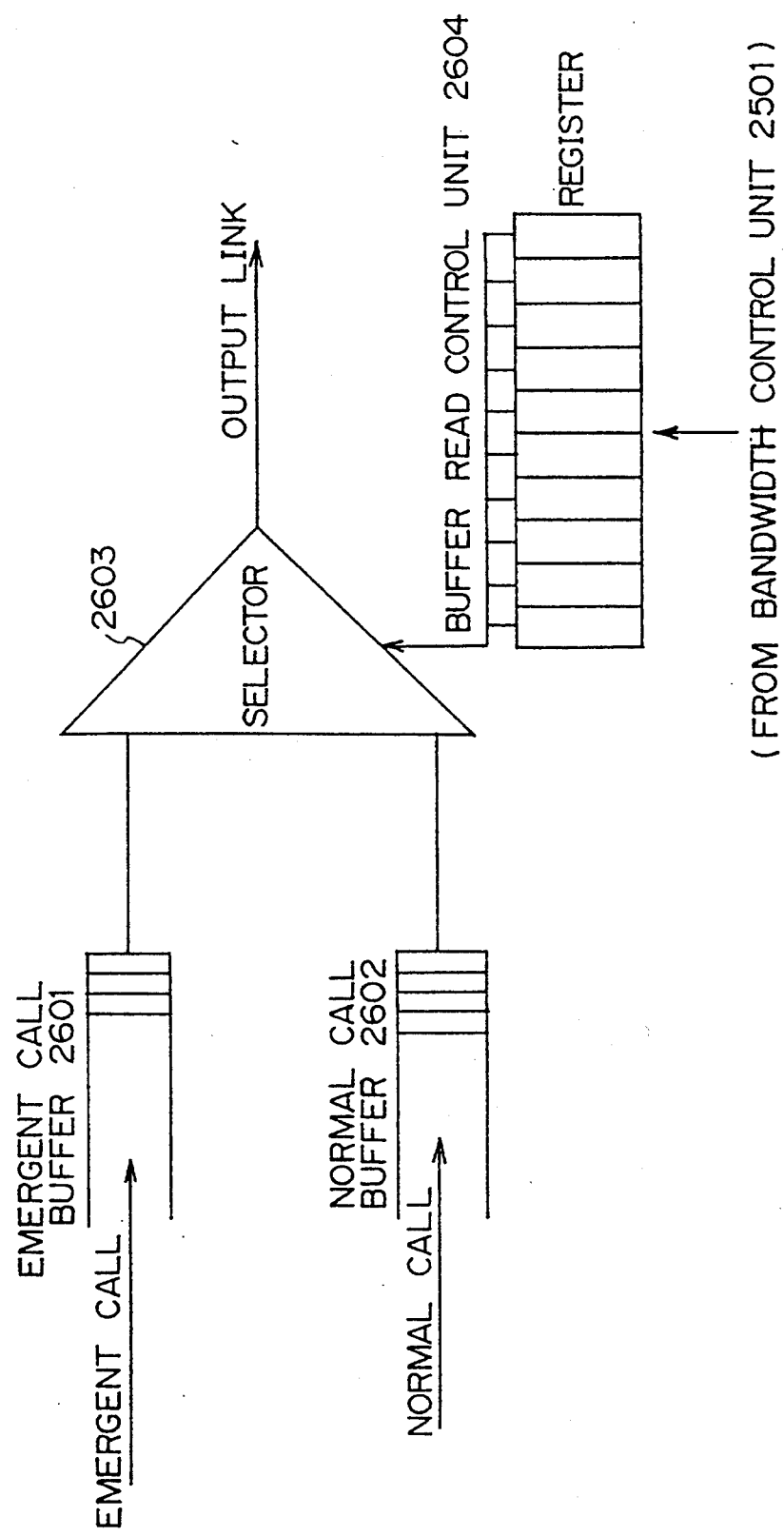
FIG. 26 shows the configuration of the output link corresponding unit according to the second embodiment of the present invention.

In FIG. 26, an emergent call buffer 2601 and a normal call buffer 2602 temporarily store communication data on an emergent call and a normal call respectively. Communication data depend on a communication method in a network, and can be represented in a packet, frame, or cell format.

The communication data outputted from a node can be selectively stored in either of the above described buffers by determining the VCI added to each piece of communication data by a distributing circuit (not shown in FIG. 25) in the switch 2511, shown in FIG. 25.

At this time, the selector 2603 sequentially refers to the contents of ten registers in a buffer read control unit 2604 cyclically at each timing of outputting data to an output link, and selects an output of either the buffer 2601 or the buffer 2602 depending on whether the recited contents of the register indicates an emergent call or a normal call.

The contents of the ten registers of the buffer read control unit 2604 are set by the bandwidth control unit 2501. The number of the registers corresponds to the transmission capacity 10 of each link according to the 2nd embodiment.

Configuration of the Management Table in the System according to the 2nd Embodiment Next, examples of the configurations of the VC management table 2502, the connected call management table 2503, the link available bandwidth management table 2504, the detour path available bandwidth management table 2505, and the path-to-circuit correspondence table 2506 shown in FIG. 25 are explained below.

First, FIG. 32A shows an example of a configuration of the VC management table 2502 in node A. In this table, a VCI, an output link, a relay link, and an in-use/-out-of-use flag indicating whether or not the circuit is in use, are set for each direct circuit and detour circuit for each destination node.

FIG. 32B shows an example of a configuration of the connected call management table 2503 provided in node A. In this table, a terminal unit number, a required bandwidth requested by the terminal unit when it sets a call, a service bandwidth actually set by setting a call, a VCI assigned to the terminal unit, an output link, and an emergent/normal flag indicating whether the call is an emergent call or a normal call are set for each terminal unit accommodated in a node containing the table. If the terminal unit requests a normal call and if one or more detour circuits can be set, then a service bandwidth, VCI, and an output link can be set for a direct circuit and all detour circuits.

FIG. 32 shows an example of a configuration of the link available bandwidth management table 2504 as provided in node A. In the table, a link number (identification code) and an available bandwidth are set for each of all links in a network. The value of an available bandwidth is updated by the bandwidth control unit 2501.

FIG. 32D shows an example of a configuration of the pass-to-circuit correspondence table 2506 provided in node A. For example, in FIG. 24, each of the detour circuits having the VCIs VC1-1 and VC2-1 have a detour path through links ac and cb. The detour path is identified by a virtual path identifier (VPI). In the example shown in FIG. 24, the VPI of the detour path for each of the detour circuits having VC1-1 and VC2-1 is VP1. The path-to-circuit correspondence table 2506 stores the correspondence between the VPI of each detour path and the VCI of the detour circuit for the VPI for each direct circuit defined in the VC management table 2502. For each VPI-to-VCI correspondence of each direct circuit, a selection flag indicating whether or not the detour circuit has been selected is set. The setting of the selection flag is updated by the bandwidth control unit 2501.

FIG. 32E shows an example of a configuration of the detour path available bandwidth management table 2505 provided in node A. For each destination node, the correspondence between the VPI of a detour path from node A to the destination node and the available bandwidth of the detour path is stored. Based on the contents of the link available bandwidth management table 2504, the bandwidth control unit 2501 calculates the available bandwidth of a detour path as the minimum available bandwidth in the available bandwidths of links contained in the detour path, and stores the result in the detour path available bandwidth management table 2505. In this case, the bandwidth control unit 2501 calculates a detour circuit for the currently used detour path according to the path-to-circuit correspondence table 2506, and calculates the output link and relay link contained in the detour circuit according to the VC table 2502 shown in FIG. 32A. Thus, the bandwidth control unit 2501 calculates the link contained in the detour path. The detour path for each destination node contained in the detour path available bandwidth management table 2505 is assigned a priority number in the order from the smallest number of relay nodes in the detour path (called the number of hops). For the detour paths having the same number of relay nodes, the bandwidth control unit 2501 assigns a higher priority number to a path having a larger available bandwidth.

Explanation of Urgent Call and Normal Call in the System according to the 2nd Embodiment In the 2nd embodiment of the present invention having the above described configuration, a network accommodates two priority levels, that is, an emergent call and a normal call as in the 1st embodiment.

Especially when a request to connect an emergent call is issued, control is performed such that the rate of the completion of connecting an emergent call can be raised by deteriorating the communication quality of an accommodated normal call, that is, by delaying the normal call in a network after reducing the service bandwidth assigned to the normal call.

Next, in the above described control, if an available bandwidth enough to guarantee the original communication quality exists in any of one or more detour circuits for a normal call deteriorated in communication quality, then the normal call is detoured. As a result, the quality of a normal call temporarily deteriorated in its communication quality can be guaranteed again. In this case, among one or more detour circuits to meet the above described conditions, a detour circuit for the detour path having the highest order priority in the detour path available bandwidth management table 2505 is selected.

As in the 1st embodiment, if the communication quality of a normal call is further deteriorated by another emergent call in a detour circuit, then a quality improving process of trying to reassign the normal call to its initially assigned circuit is performed.

Explained below is the practical operation of the second embodiment of the present invention having the above described function.

Initial State of the Management Table of the System of the Second Embodiment

Assume that, in the initial state, a terminal unit connected to node A communicates with another terminal unit connected to node B according to a normal call.

FIGS. 32A–32E show the states of the VC management table 2502, the connected call management table 2503, the link available bandwidth management table 2504, the path-to-circuit correspondence table 2506, and the detour path available bandwidth management table 2505, each being shown in FIG. 25 and provided for by node A.

First, in the VC management table 2502 shown in FIG. 32A, virtual circuits 2402 having the VCIs VC1–VC3 are set in output link ab as a direct circuit to node B as shown in FIG. 24. As a detour circuit for the direct circuit to node B having the VCI VC1, virtual circuit 2402 having the VCI VC1-1 is provided in output link ac and relay link cb and the virtual circuit 2402 having the VCI VC1 and VC2 are provided in output link ad and relay links de and eb. Likewise, as a detour circuit for the direct circuit to node B having the VCI=VC2, the virtual circuit 2402 having the VCI VC2-1 is provided in output link ac and relay link cb, and the virtual circuit 2402 having the VCI VC2-2 are provided in output link ad and relay links de and eb. Furthermore, each of the virtual circuits 2402 having the VCIs VC 4 and 5 is set as a direct circuit to node C and node D in output links ac and ad. No detour circuits are not set for each of the direct circuits having VC3, VC4, and VC5.

The direct circuit having the VCI VC1 and the detour circuits having the VCIs VC1-1 and VC1-2 are used by a terminal unit connected to node A, and each of the in-use/out-of-use flag is set to "in-use".

Next, the connected call management table 2503 shown in FIG. 32B contains the following states. That is, the terminal unit number of one terminal unit connected to currently communicating node A is 1; the terminal unit has requested the required bandwidth of 3 when a call is set; the service bandwidth actually set for the direct circuit having the VCI=VC1 as the result of setting a call is also 3; the output link of the direct circuit is link ab; and the emergent/normal flag indicates "normal", that is, the call requested by the terminal unit is a normal call.

As the feature of the present invention, one or more detour circuits each have a service bandwidth of 0 and the VCI VC1-1 or VC1-2 are simultaneously assigned to a normal call requested by the above described terminal. This is explained later.

In the link available bandwidth management table 2504, a link number and an available bandwidth are assigned to each of the links in a network. As described above, the transmission capacity for each link is 10. Since a call having the service bandwidth of 3 is set in output link ab, a bandwidth of 3 is available. A value notified by another node is set as the available bandwidth of another link. For example, no call is set in links; ac, ad, ba, bc, be, ca, ed, etc. in each of which the entire bandwidth is available.

Furthermore, in the path-to-circuit table 2506 shown in FIG. 32D, the following states are set. That is, for each detour path having the VPI VP1 or VP2 corresponding to the direct circuit having the VCI VC1, the VCI of each detour circuit is VC1-1 or VC1-2, and for each detour path having the VPI VP1 or VP2 corresponding to the direct circuit having the VCI VC2, the VCI of each detour circuit is VC2-1 or VC2-2. In the initial state, the selection flags of all detour circuits are set to a value indicating that they are not selected.

In addition, the detour path available bandwidth management table 2505 shown in FIG. 32E stores the following states. That is, in a detour circuit from node A to destination node B, a detour path having the VPI VC1 has the available bandwidth of 4 and is assigned a priority order of 1, and a detour path having the VPI VP2 has the available bandwidth of 5 and is assigned a priority order of 2. The bandwidth control unit 2501 recognizes that a detour circuit for the detour path having the VPI VP1 has the VC1-1 by referring to the path-to-circuit correspondence table 2506 shown in FIG. 32D. Next, the bandwidth control unit 2501 recognizes that the output link and the relay link in the detour circuit are links ac and cd by referring to the VC management table 2502 shown in FIG. 32A. Furthermore, the bandwidth control unit 2501 recognizes that the available bandwidths of links ac and cd are 10 and 4 respectively, by referring to the link available bandwidth management table 2504. As a result, the bandwidth control unit 2501 sets in the detour path available bandwidth management table 2505 the available bandwidth of the detour path having the VPI VP1 to the smaller value of 4 in the available bandwidths of links ac and cd. The bandwidth control unit 2501 calculates similarly for the available bandwidth in the detour path having the VPI VP2, and sets the result in the detour path available bandwidth management table 2505. Since the number of relay nodes of the detour circuit having the VPI VP1 is smaller than the number of relay nodes of the detour path having the VPI VP2, the detour path having the VCI VC1 is assigned a higher priority order (assigned a smaller value in priority).

FIGS. 33A, 33B, and 33C show the state of data set in the register of the buffer read control unit 2604 (shown in FIG. 26) of each output link corresponding unit in node A, when a terminal unit connected to node A as described above communicates with another terminal unit connected to node B according to a normal call.

First, FIG. 33A shows the state of the register of the buffer read control unit 2604 of the output link corresponding unit to output link ab.

The above described number of registers 10 corresponds to the transmission capacity of 10. The selector 2603 shown in FIG. 26 sequentially refers to the contents of the ten registers cyclically at each output timing to an output link, and selects an output of either of the buffer 2601 or the buffer 2602 according to the contents of the recited register.

Accordingly, if the service bandwidth of the normal call having the VCI VC1 set in the connected call management table 2503 shown in FIG. 32B is 3, then an identification data indicating a normal call is assigned to any three of ten registers as shown in FIG. 33A. As a result, the selector 2603 (shown in FIG. 26) of the output link corresponding unit to output link ab outputs the communication data on a normal call applied to the normal call buffer 2602 to output link ab at the rate of 3 timings in 10 timings. At the timing referred to by the register in which NULL (invalid data) is set, the selector 2603 does not select an output of any buffer. Then, the number of NULL-set registers correspond to the available bandwidth set in the link available bandwidth management table 2504 shown in FIG. 32C.

FIGS. 33B and 33C show the state of the register of the buffer read control unit 2604 for each of the output link corresponding units to output links ac and ad. As read from the link available bandwidth management table 2504 shown in FIG. 32C, no calls are set in output links ac and ad, and each of the available bandwidths is 10. Accordingly, as shown in FIG. 33B, NULL is set in all of the ten registers. As a result, the selector 2603 does not select an output of any buffer.

Normal Call Setting Process in the System according to the 2nd Embodiment

Described below, is the process performed when a request is issued in node A to connect a normal call having the required bandwidth of 2 from terminal unit 2 to node B in the above described initial state.

Figure 27:
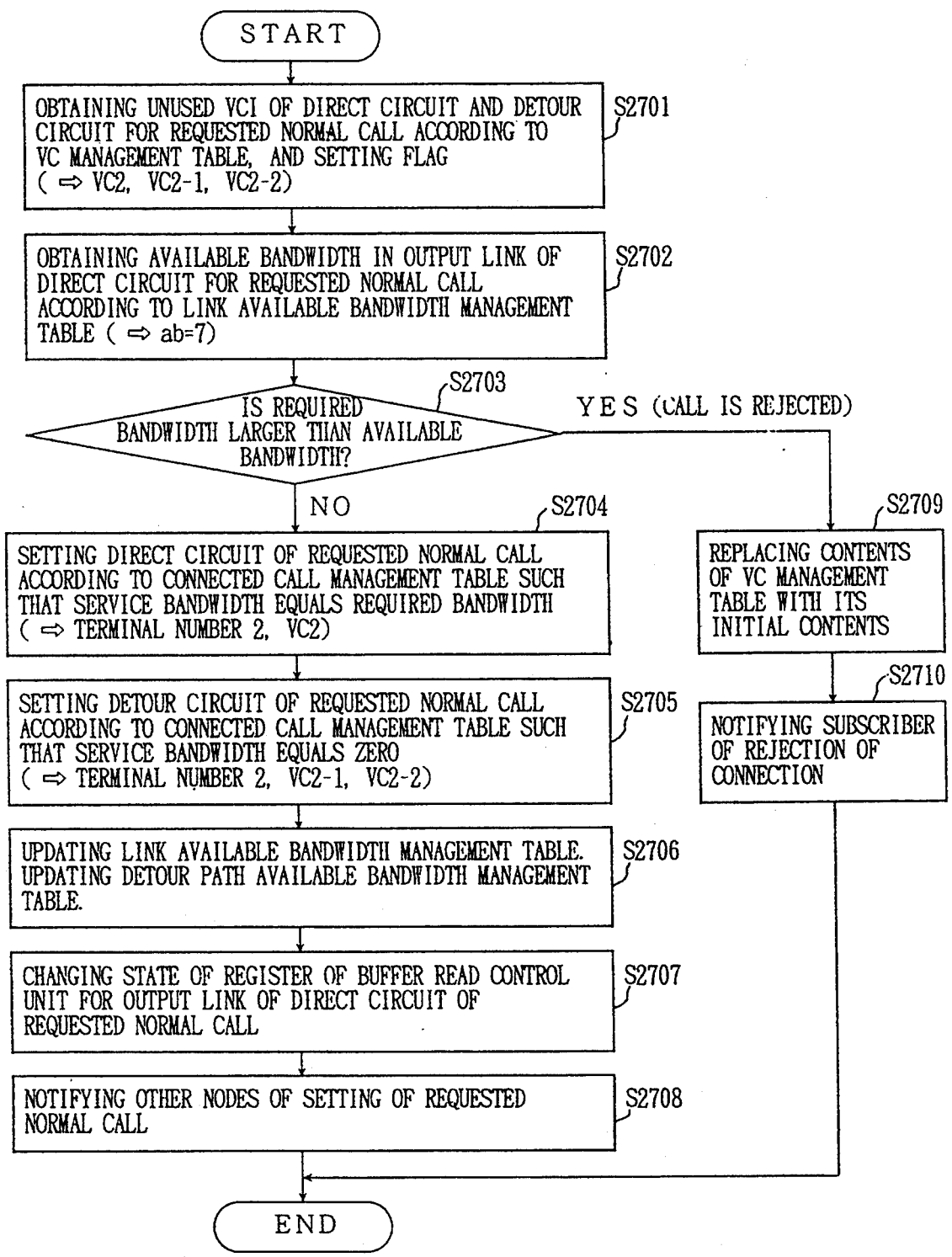
FIG. 27 is the flowchart indicating the operation of setting a normal call according to the second embodiment of the present invention.

FIG. 27, is the flowchart indicating the operation of setting a normal call realized as a program process or a firmware process performed by the bandwidth control unit 2501 shown in FIG. 25. The operation is explained by referring to FIG. 27.

First, in step S2701, each of the unused VCIs in the direct circuit and one or more detour circuits for a requested normal call is retrieved from the VC management table 2502. An unused, VCI can be retrieved as a VCI referred to by an in-use/out-of-use flag indicating "out-of-use". Then, the in-use/out-of-use flag for each of the retrieved VCIs is changed to "in-use". For example, in the initial state shown in FIGS. 32A through 32E and 33A through 33C, the direct circuit having the VCI VC2 and two detour circuits each having the VCIs VC2-1 and VC2-2 are retrieved separately, and the state of the VC management table 2502 is changed from the state shown in FIG. 32A to the state shown in FIG. 34A.

Next, in step S2702, the available bandwidth of an output link of the direct circuit of a requested normal call is read from the link available bandwidth management table 2504. The output link of the direct circuit is read from the VC management table 2502. For example, in the above described initial state shown in FIG. 32C, the available bandwidth of 7 in output link ab of the direct circuit of a requested normal call is read. If the direct circuit includes a plurality of nodes and there are a plurality of links forming the direct circuit, then available bandwidths of all links can be retrieved. In this case, like a field for a detour circuit, a field of a relay link in addition to a field of an output link can be provided as a field for the direct circuit, of the VC management table 2502.

Next, in step S2703, it is determined whether or not the required bandwidth of the requested normal call is equal to or larger than the above described available bandwidth (available bandwidth in total). In the example above, since the required bandwidth of the requested normal call is 2 and the available bandwidth is 7, the determination indicates "No".

If the determination in step S2703 indicates "No", then the process in step S2704 is performed.

In step S2704, the direct circuit of the requested normal call is set with the service bandwidth being equal in size to the requested bandwidth in the connected call management table 2503. In the example above, as shown in FIG. 34B, the connected call management table 2503 stores a terminal number 2, a required bandwidth 2, a service bandwidth 2, a VCI VC2, an output link ab, and an emergent/normal flag indicating "normal".

In the next step S2705, each detour circuit of a requested normal call is set in the connected call management table 2503 with the service bandwidth being equal to 0. In the example above, as shown in FIG. 34B, the connected call management table 2503 stores a service bandwidth 0, a VCI VC2-1, an output link ac, a service bandwidth 0, a VCI VC2-2, and output link ad. Thus, according to the second embodiment of the present invention, one or more detour circuits in addition to a direct circuit are reserved with its service bandwidth set to 0 when a normal call is set. As a result, a detouring process described later can be performed at a high speed.

In the next step S2706, the value of the available bandwidth for the output link of the direct circuit of a requested normal call is updated in the link available bandwidth management table 2504. In the example above, since the requested normal call is assigned the service bandwidth of 2, the available bandwidth of output link ab is updated from 7, shown in FIG. 32C to 5 shown in FIG. 34C.

In step S2706, when the output link of the direct circuit of a requested normal call is contained in the output link or the relay link of any detour circuit set in the VC management table 2502, the contents of the detour path available bandwidth management table 2505 for the detour path are updated after the detour path for the detour circuit has been calculated from the path-to-circuit correspondence table 2506. In the example above, since output link ab of the direct circuit of the requested normal call is not included in the output link or the relay link of any detour circuit set in the VC management table 2502 shown in FIG. 32A, the contents of the detour path available bandwidth management table 2505 are not updated.

In the next step S2707, the state of the register of the buffer read control unit 2604 for the output link of the direct circuit of the requested normal call is updated. In the example above, since a new normal call having the VCI VC2 has been set in output link ab, the state of the register of the buffer read control unit 2604 for the link is changed from the state shown in FIG. 33A to the state shown in FIG. 35. The state of the register of each buffer read control unit 2604 for output links ac and ad shown in FIGS. 33B and 33C is not changed.

Finally, in step S2708, the information indicating that the requested normal call has been set in node A is provided for other nodes as call setting information through each of the direct circuits and the detour circuits of the normal call. Thus, the bandwidth control unit 2501 updates the contents of the VC management table 2502, the connected call management table 2503, the link available bandwidth management table 2504, the path-to-circuit correspondence table 2506, the detour path available bandwidth management table 2505, and the state of the register of the buffer read control unit 2604 in the output link corresponding unit to each output link. As a result, the contents of each table and the state of the register of the buffer read control unit 2604 are synchronously updated.

On the other hand, in step S2703, if it is determined that the required bandwidth of the requested normal call is equal to or larger than the available bandwidth, then the process in step S2709 is performed.

In step S2709, the setting of the in-use/out-of-use flag set in step S2701 is returned to its initial state.

Further, in the next step S2710, the rejection of connecting the requested normal call is notified to a subscriber (terminal unit).

Urgent Call Setting Process including Normal Call Deteriorating Process in the System according to the 2nd Embodiment Next, described below is the process to be performed when a request to connect an emergent call from a new terminal unit 3 to node B having the required bandwidth 7 has been issued in node A in the states shown in FIGS. 34A through 34E and FIG. 35.

Figure 28:
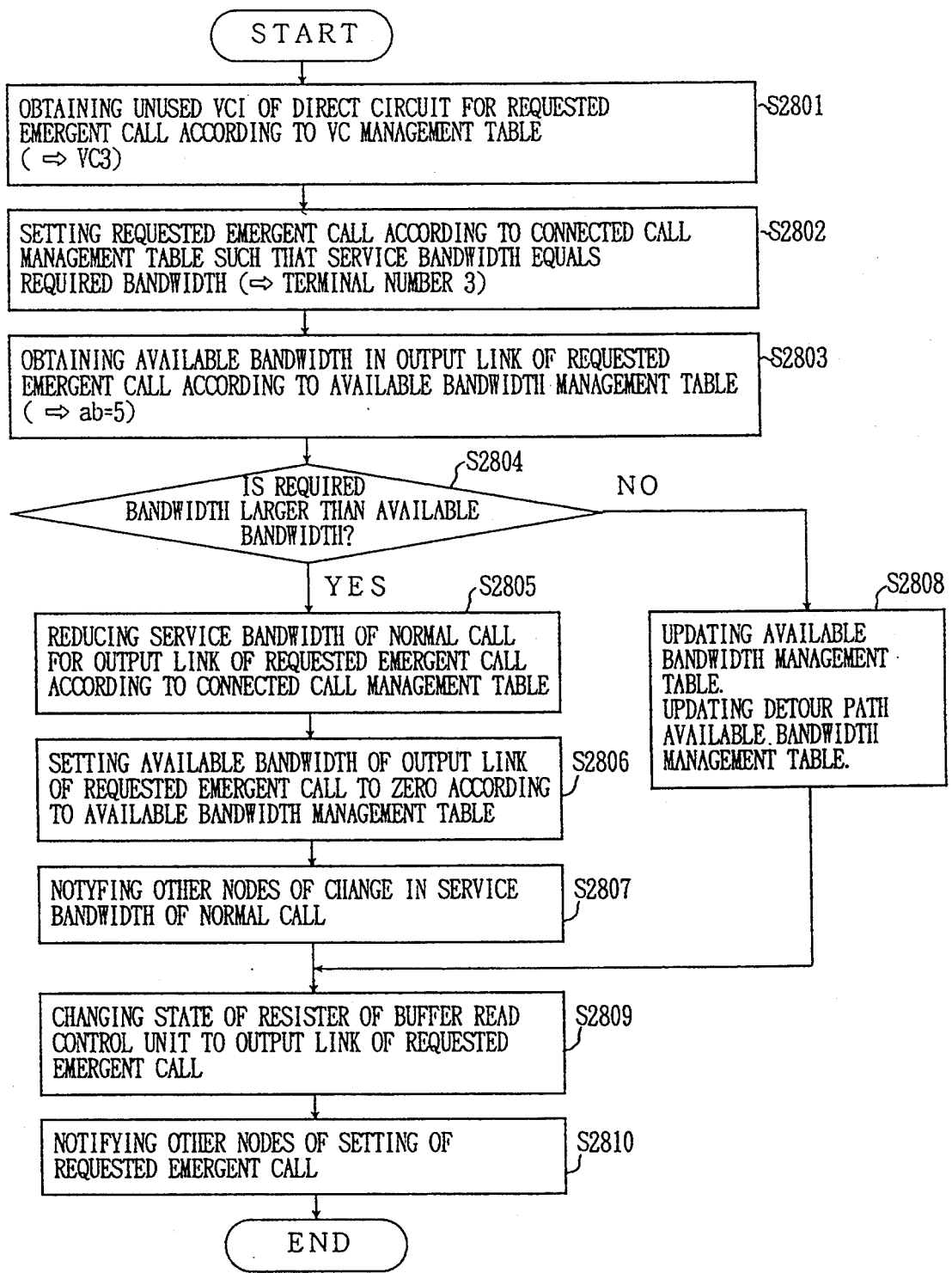
FIG. 28 is the flowchart indicating the operation of setting an emergent call including a communication deteriorating process performed on a normal call according to the second embodiment of the present invention.

FIG. 28 is the flowchart indicating the operation of setting an emergent call including a deteriorating process of a normal call performed as a program process or a firmware process performed by the bandwidth control unit 2501 shown in FIG. 25. The operation is described by referring to FIG. 28.

First, in step S2801, an unused VCI of a direct circuit for a requested emergent call is retrieved from the VC management table 2502. No detour circuits are retrieved. Then, the in-use/out-of-use flag for the retrieved VCI is changed to "in-use". For example, the direct circuit having the VCI VC3 is retrieved and the state of the VC management table 2502 is changed from the state shown in FIG. 34A to the state shown in FIG. 36A in the states shown in FIGS. 34A through 34E.

Next, in step S2802, a direct circuit of a requested emergent call is set in the connected call management table 2503 with the service bandwidth being equal in size to the required bandwidth. In the example above, as shown in FIG. 36B, the connected call management table 2503 stores a terminal number 3, a required bandwidth 7, a service bandwidth 7, a VCI VC3, an output link ab, and an emergent/normal flag indicating "emergent". In this state, the information for terminals 1 and 2 has not been changed as shown in FIG. 36B, but remains as shown in FIG. 34B.

In step S2803, the available bandwidth in the output link of the direct circuit of a requested emergent call is read from the link available bandwidth management table 2504. The output link of the direct circuit is read from the VC management table 2502. For example, in the above described state shown in FIG. 34C, the available bandwidth of 5 in the output link ab of the direct circuit of the requested emergent call is read. If the direct circuit includes a plurality of nodes and there are a plurality of links forming the direct circuit, then the available bandwidths of all links are retrieved.

Next, in step S2804, it is determined whether or not the required bandwidth in a requested emergent call is equal to or larger than the above described available bandwidth (total available bandwidths). In the example above, since the required bandwidth of the requested emergent call is 7 and the available bandwidth is 5, the determination indicates "Yes".

When the determination indicates "Yes" in step S2804, the process in step S2805 is performed.

Figure 1:
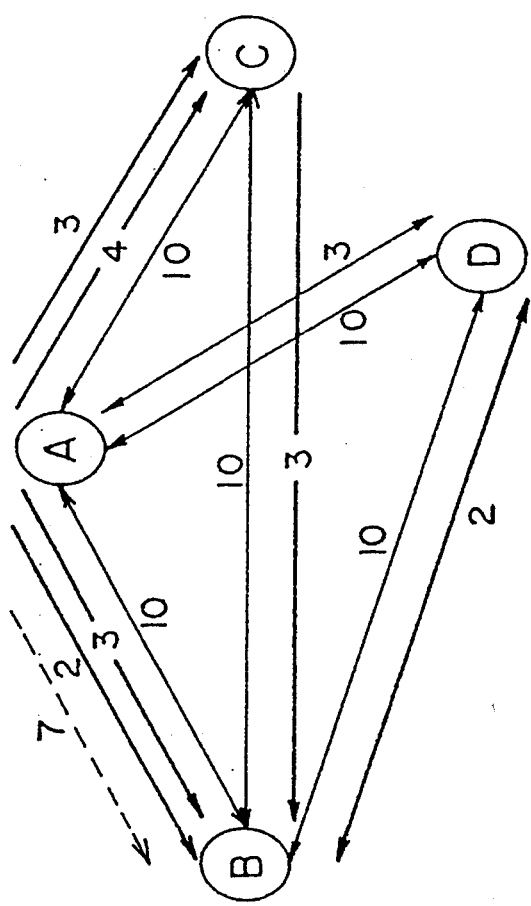
FIG. 1 shows an example of the prior art technology.

In step S2805, the value of the service bandwidth of each normal call set in the, output link of the direct circuit of a requested emergent call, is forcibly reduced such that the available bandwidth in the output link is 0 depending on the rate of the requested bandwidth of each normal call in the connected call management table 2503. In the example above, the service bandwidth of each normal call in output link ab connected to terminal units 1 and 2 is forcibly reduced respectively from 3 and 2 shown in FIG. 34B to 2 and 1 shown in FIG. 36B.

In the next step S2806, the value of the available bandwidth for the output link of the direct circuit of a requested emergent call is updated to 0 in the link available bandwidth management table 2504. In the example above, the available bandwidth of output link ab is updated from the value of 5 shown in FIG. 34C to the value of 0 shown in FIG. 36C.

In step S2806, if the output link of the direct circuit of a requested normal call is included in the output link or the relay link of any detour circuit set in the VC management table 2502, then the value of the available bandwidth for the detour path in the detour path available bandwidth management table 2505 is updated to 0 after the detour path for the detour circuit is calculated according to the path-to-circuit correspondence table 2506. In, the example above, since output link ab of the direct circuit of the requested normal call is not included in any of the output links or the relay links set in the VC management table 2502 shown in FIG. 32A, the contents of the detour path available bandwidth management table 2505 are not updated.

In the next step S2807, the change in the service bandwidth of a normal call is notified to other nodes through the direct circuit of the normal call. Thus, the bandwidth control units 2501 of other nodes update the contents of the connected call management table 2503, the link available bandwidth management table 2504, the detour path available bandwidth management table 2505, and the state of the register of the buffer read control unit 2604 in the output link corresponding unit to the output link.

In the next step S2809, the state of the register of the buffer read control unit 2604 for the output link of the direct circuit of a requested emergent call is changed. In the example above, since a new emergent call having the VCI VC3 is set in output link ab and the service bandwidths of the normal calls each having the VCI VC1 or VC2 individually have been changed, the state of the register of the buffer read control unit 2604 for the link is changed from the state shown in FIG. 35 to the state shown in FIG. 37. At this time, the state of the register of the buffer read control unit 2604 for output links ac and ad shown in FIGS. 33B and 33C is not changed.

Figures 35, 37:
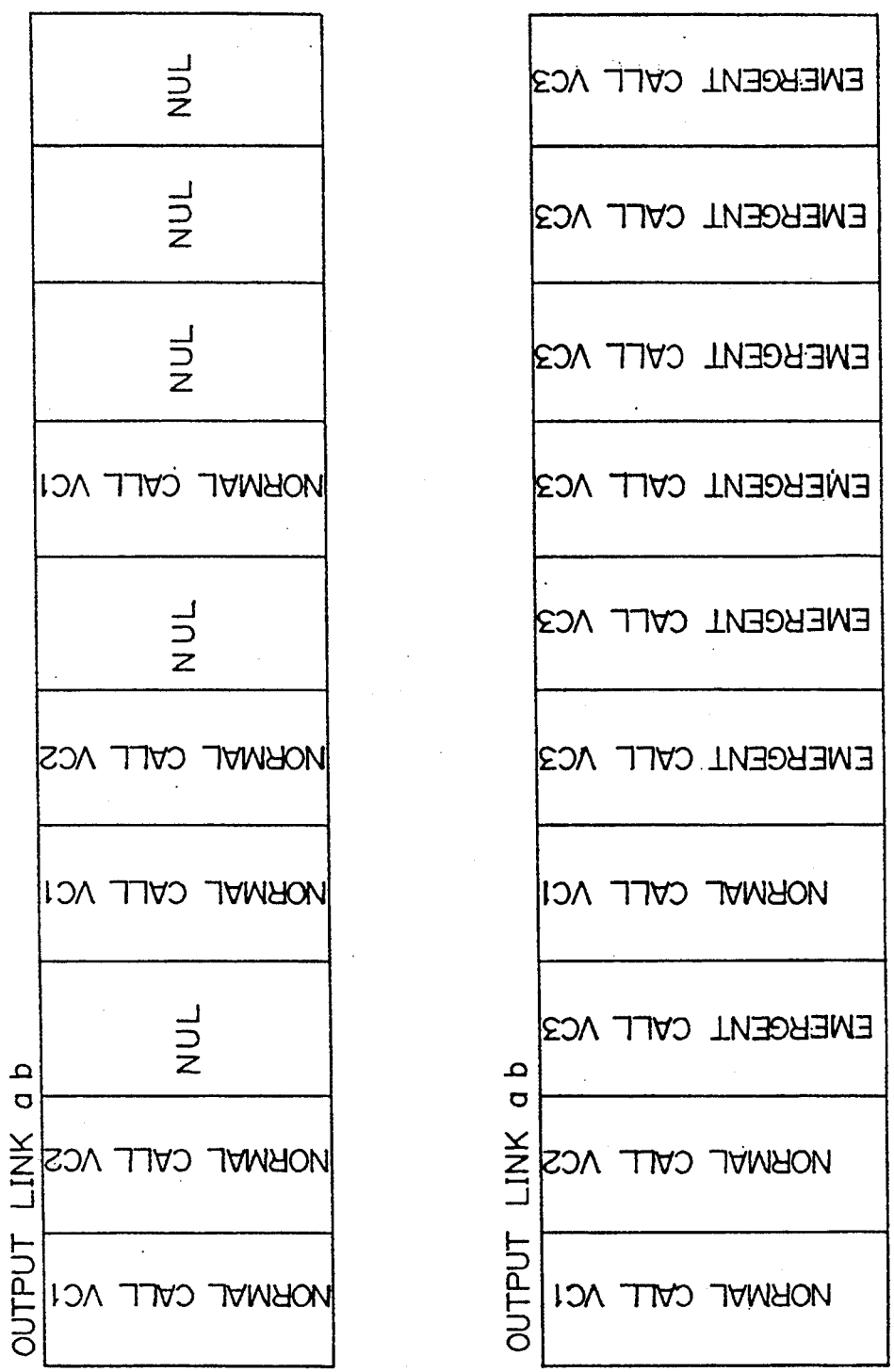
FIG. 35 shows the state of a buffer read control unit after a normal call from the first terminal unit to the node has been successfully ,set according to the second embodiment of the present invention.
FIG. 37 shows the state of a buffer read control unit after an emergent call from terminal unit 3 to node B has been successfully set according to the first embodiment of the present invention.

As indicated by the comparison between FIGS. 35 and 37, the rate of selecting by the selector 2603 an output of the normal call buffer 2602 is lowered if an emergent call is set. As a result, the amount of delay in the normal call buffer 2602 shown in FIG. 26 increases, while the quality in delay of a normal call is lowered. On the other hand, the output of the emergent call buffer is selected by the selector 2603 at the rate based on a required bandwidth.

In the next step S2810, the information indicating that a requested emergent call has been set in node A is provided for other nodes as call setting information through the direct circuit of the emergent call. Thus, the bandwidth control units 2501 of other nodes update the contents of the VC management table 2502, the connected call management table 2503, the link available bandwidth management table 2505, and the state of the register of the buffer read control unit 2604 in the output link corresponding unit to an output link.

In the above described step S2804, if it is determined that the required bandwidth of a requested emergent call is smaller than an available bandwidth, then it indicates that there is still enough space in the available bandwidth of the output link and that the service bandwidth of a normal call need not be changed in the connected call management table 2503. Therefore, in step S2808 where a process similar to that performed in the above described step S2706, the only process to be performed is a process of updating the link available bandwidth management table 2504 and the detour path available bandwidth management table 2505. Then, the processes in the above described steps S2809 and S2810 are performed.

According to the processes above, the quality of a normal call is deteriorated (delayed) if necessary, and an emergent call has priority in being assigned a service bandwidth which is equal in size to the required bandwidth.

Normal Call Detouring Process in the System according to the 2nd Embodiment

Next, a process of detouring a normal call whose service bandwidth has been reduced by the above described emergent call setting process is explained below.

Figure 29:
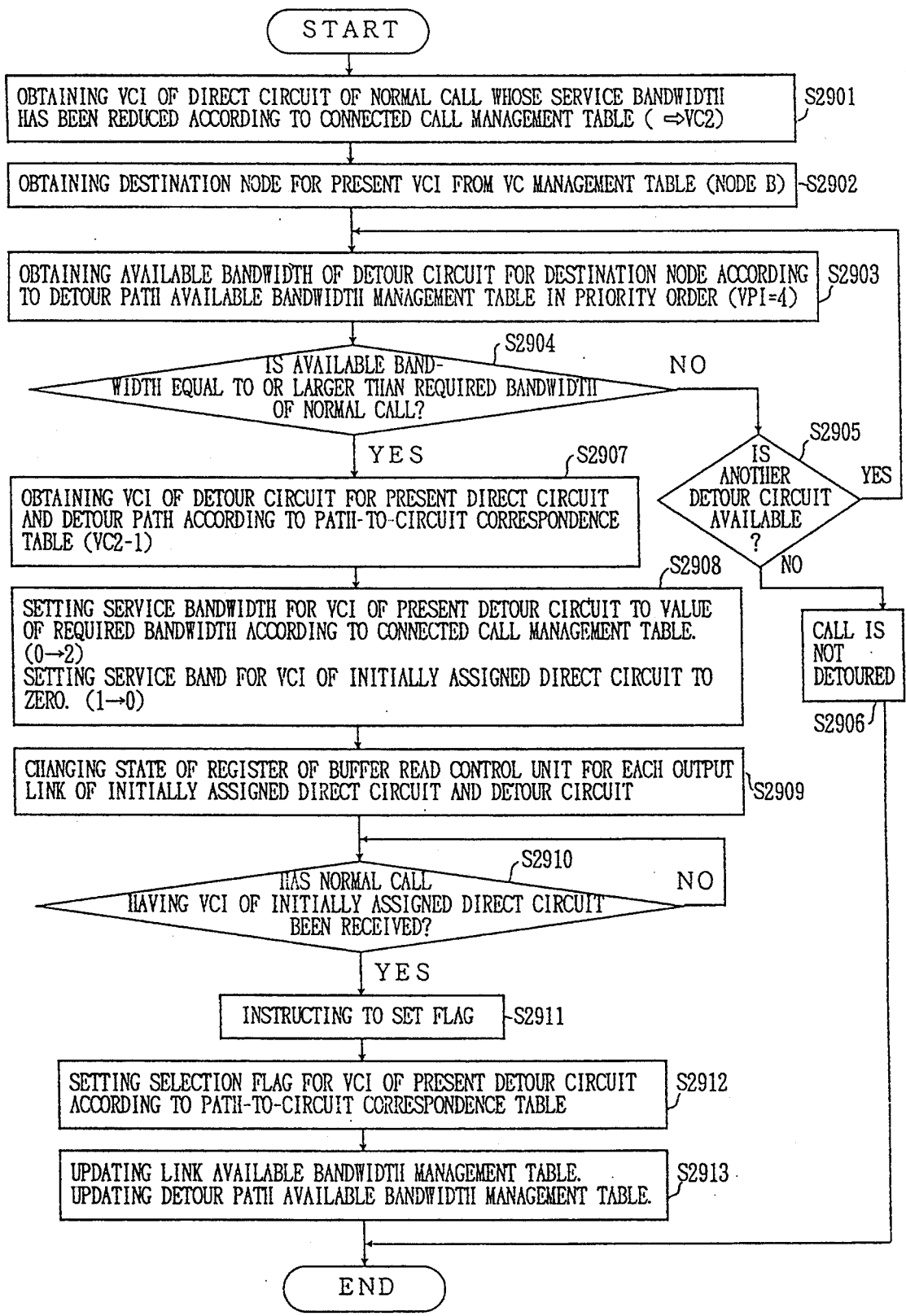
FIG. 29 is the flowchart indicating the operation of detouring a normal call according to the second embodiment of the present invention.

FIG. 29 is the flowchart indicating the operation of detouring a normal call as a program process or a firmware process carried out by the bandwidth control unit 2501 shown in FIG. 25. The operation is explained by referring to FIG. 29.

First, in step S2901, the VCI of the direct circuit of a normal call whose service bandwidth has been reduced is retrieved from the connected call management table 2503. If there are a plurality of normal calls whose service bandwidths have been reduced, they are sequentially selected in the order from the smallest required bandwidth. In the state shown in FIG. 36B, VC2 is detected as the VCI of the direct circuit of a normal call from terminal unit 2. The similar process is performed on a normal call from terminal unit 1 as explained later. A normal call from terminal unit 2 is first explained as follows.

Next, in step S2902, a destination node for the VCI of the direct circuit is retrieved from the VC management table 2502. In the example above, destination node B for the VCI VC2 is retrieved from the VC management table 2502 shown in FIG. 36A.

Next, in step S2903, the available bandwidth in the detour path for the above described destination node is calculated according to the priority order assigned to a detour path in the table. In the example above, an available bandwidth of 4 of the detour path having the VPI VP1 assigned the priority order of 1 with the destination node B is calculated from the detour path available bandwidth management table 2505 shown in FIG. 36E.

Next, in step S2904, it is determined whether or not the above described available bandwidth is equal to or larger than the required bandwidth of the normal call to be detoured. The required bandwidth of the normal call is read from the connected call management table 2503.

If the determination in step S2904 indicates "No", then it is determined in step S2905 whether or not another detour circuit is set in the detour path available bandwidth management table 2505 in the destination node calculated in step S2902. If the determination indicates "Yes", then the processes in steps S2903 and S2904 are repeated. If the determination in step S2905 indicates "No", the normal call is not detoured (step S2906).

If the determination in step S2904 indicates "Yes", the normal call can be detoured to a detour path.

In this case, in step S2907, the VCIs of the direct circuit and the detour circuit for the detour path are calculated. In the example above, the VCI of the detour circuit for the direct circuit having the VCI=VC2 and the detour path having the VPI=VP1 is calculated as VC 2-1.

Next, in step S2908, the required bandwidth of the normal call to be detoured is set as the service bandwidth for the VCI of the above described detour circuit according to the connected call management table 2503. The service bandwidth of the initially assigned direct circuit is set to 0. In the example above, the service bandwidth of the detour circuit having the VCI=VC2-1 of the normal call from terminal unit 2 is set to 2, and the service bandwidth of the initially assigned direct circuit having the VCI=VC2 is set to 0. As a result, the state of the connected call management table 2503 is changed from the state shown in FIG. 36B to the state shown in FIG. 38B.

In the next step S2909, the state of the register of each buffer read control unit 2604 (FIG. 26) for the initially assigned direct circuit and the new direct circuit is changed. In the example above, the information on a normal call having the VCI VC2 in output link ab of the direct circuit is replaced with "NULL", and two pieces (corresponds to the value 2 of the service bandwidth) of the information on the normal call having the VCI=VC2-1 in output link ac of the detour circuit are added. As a result, the state of the register is changed from the state shown in FIG. 37 (output link ab) and the state shown in FIG. 33B (output link ac) to the state shown in FIGS. 39A and 39B. Each output link of the initially assigned direct circuit and a new detour circuit is read from the connected call management table 2503. The state of the register of the buffer read control unit 2604 for output link ad shown in FIG. 33C is not changed.

Next, in step S2910, the bandwidth control unit 2501 shown in FIG. 25 waits until the communication data on the normal call having the VCI of the initially assigned direct circuit are received by the input link by monitoring the output of the output ID detecting unit 2507.

If the communication data on the normal call have been received and the determination in step S2910 indicates "Yes", the bandwidth control unit 2501 shown in FIG. 25 outputs a flag set instruction to the flag setting unit 2509 in step S2911. As a result, the flag setting unit 2509 sets a flag indicating that the present data are the last data in the direct circuit in a predetermined data area of the communication data, on the received normal call having the VCI of the initially assigned direct circuit. The bandwidth control units 2501 of other nodes detour a normal call by determining whether or not the above described flag is set in the communication data received by an input link in the call receiving process explained later.

Next, in step S2912, a selection flag for the VCI of the detour circuit referred to in step S2907 is set according to the path-to-circuit correspondence table 2506. In the example above, a selection flag for the VCI=VC2-1 of a detour circuit is set according to the path-to-circuit correspondence table 2506. As a result, the state of the path-to-circuit correspondence table 2506 is changed from the state shown in FIG. 36D to the state shown in FIG. 38D.

Finally, in step S2913, the value of the available bandwidth for the output link of the initially assigned direct circuit and the value of the available bandwidth for the output link of a new detour circuit are updated in the link available bandwidth management table 2504. In the example above, the available bandwidth in output link ab of the direct circuit is increased by the service bandwidth of 1, that is, the decrement by the detour, and each of the available bandwidths in output link ac of the detour circuit and in relay link cb is reduced by the service bandwidth of 2, that is, the increment by the detour. As a result, the state of the link available bandwidth management table 2504 is changed from the state shown in FIG. 36C to the state shown in FIG. 38C. Each of the output links of the initially assigned direct circuit and a new detour circuit is read from the connected call management table 2503.

In step S2913, if each of the output links of the initially assigned direct circuit and a new detour circuit is included in the output link or the relay link of any detour circuits set in the VC management table 2502, then the contents of the detour path available bandwidth management table 2505 for the detour path are updated after the detour path for the detour circuit has been calculated from the path-to-circuit correspondence table 2506. In the example above, the available bandwidth for the detour path having the VPI=VP1 for a new detour circuit having the VCI=VC2-1 in the detour path available bandwidth management table 2505 is reduced by the service bandwidth of 2, that is, the increment by the detour. As a result, the state of the detour path available bandwidth management table 2505 is changed from the state shown in FIG. 36E to the state shown in FIG. 38E.

After the above described normal call detouring process, the circuit ID converting unit 2510 shown in FIG. 25 determines whether or not a detour circuit for a direct circuit corresponding to the VCI in the path-to-circuit correspondence table 2506 has been selected each time the circuit ID detecting unit 2507 detects a VCI from the communication data on a normal call applied through an input link. If a detour circuit has been selected in step S2912 as described above, then the circuit ID converting unit 2510 replaces, in the communication data on the normal call applied from an input link, the VCI of the direct circuit assigned to the normal call with the VCI of the above described selected detour circuit, and outputs the communication data on the normal call to the switch 2511.

The operation above detours the normal call of terminal unit 2 from the initially assigned direct circuit having the VCI VC2 to the detour circuit having the VCI=VC2-1.

Furthermore, a similar operation is performed on the normal call from terminal unit 1.

In this case, in step S2901, the VC1 is obtained as the VCI of the direct circuit of a normal call from terminal unit 1. Next, in step S2902, node B is obtained as the destination node for the direct circuit having the VCI=VC1 from the VC management table 2502 shown in FIG. 38A.

Then, in step S2903, the available bandwidth of 2 in the detour path having the first priority order for the destination node B and the VPI VP1, is obtained from the detour path available bandwidth management table 2505 shown in FIG. 38E. On the other hand, by referring to the connected call management table 2503 shown in FIG. 38B, it is recognized that the required bandwidth of the normal call from terminal unit 2 is 3. Since it is smaller than the required bandwidth of 3 for the normal call from the terminal unit 2, the determination in step S2904 indicates "No".

At this time, another detour path is set in the detour path available bandwidth management table 2505 for the destination node B obtained in step S2902. Therefore, the destination in step S2905 indicates "Yes", and the process in step S2903 is performed. In step S2903, the available bandwidth of 5 in the detour path having the second priority order for the destination node B and having the VPI=VP2 can be obtained from the detour path available bandwidth management table 2505. Since the available bandwidth of 5 is equal to or larger than the required bandwidth of 3 for the normal call from terminal unit 2, the determination in step S2904 indicates "Yes".

As a result, in step S2907, the VCI=VC1-2 is obtained as the detour circuit for the direct circuit having the VCI=VC2 and the detour path having the VPI=VP2 from the path-to-circuit correspondence table 2506 shown in FIG. 38D.

Next, in step S2908, the state of the connected call management table 2503 is changed from the state shown in FIG. 38B to the state shown in FIG. 40B.

Figure 39A:
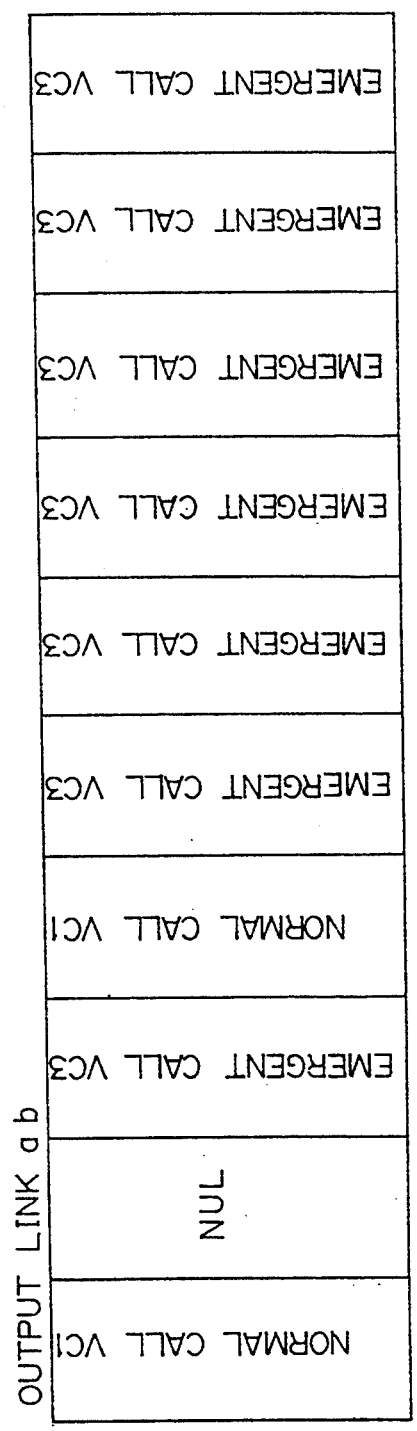
FIGS. 39A and 39B show the state of a buffer read control unit after a normal call from the second terminal unit to the node has been successfully set, and after a normal call from the first terminal unit B has been detoured, according to the second embodiment of the present invention.
Figure 39B:
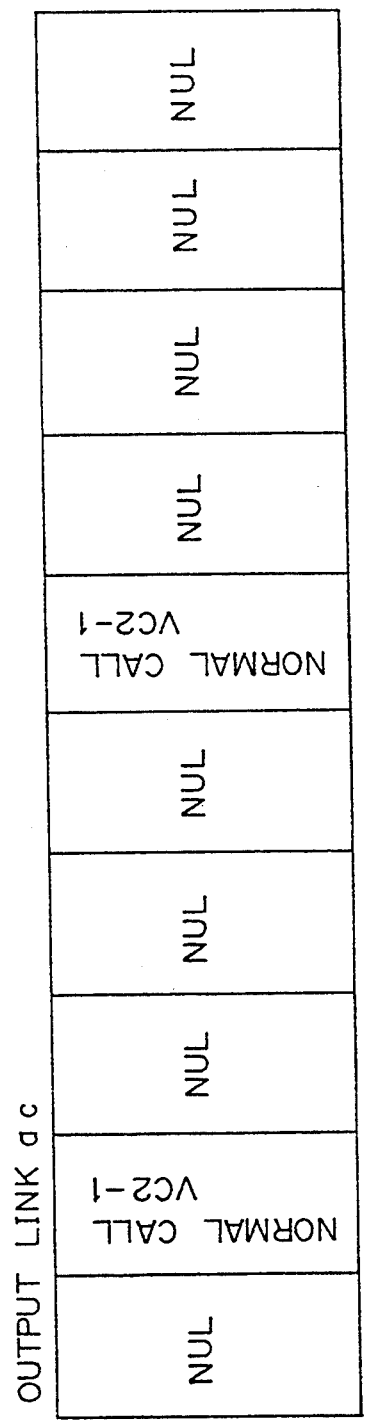
Figure 41A:
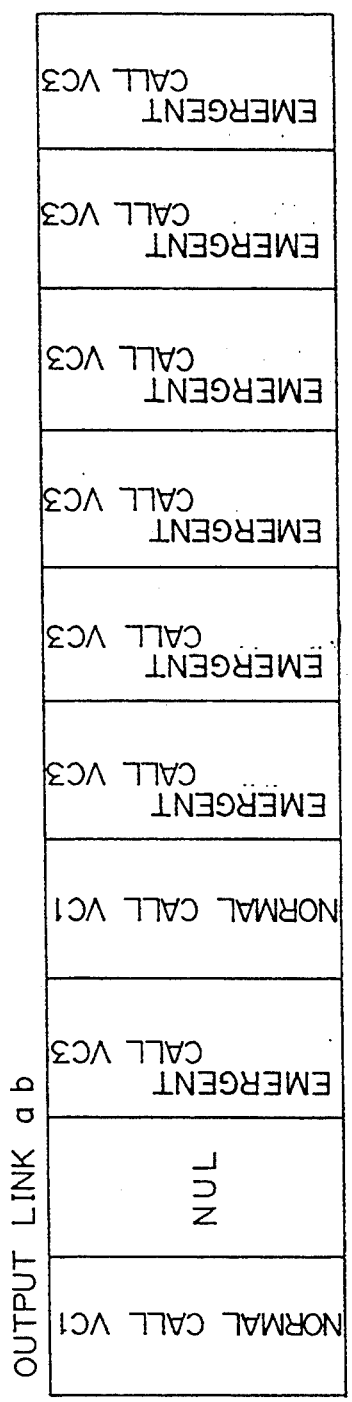
FIGS. 41A, 41B, and 41C show the state of a buffer read control unit after a normal call from the second terminal unit to the node has been successfully set, and after a normal call from the third terminal unit has been detoured, according to the second embodiment of the present invention.
Figure 41B:
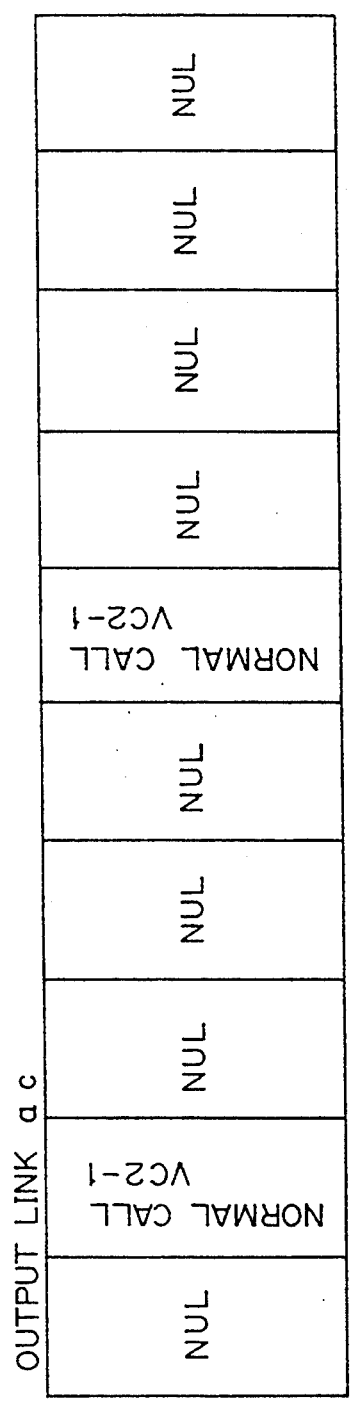
Figure 41C:
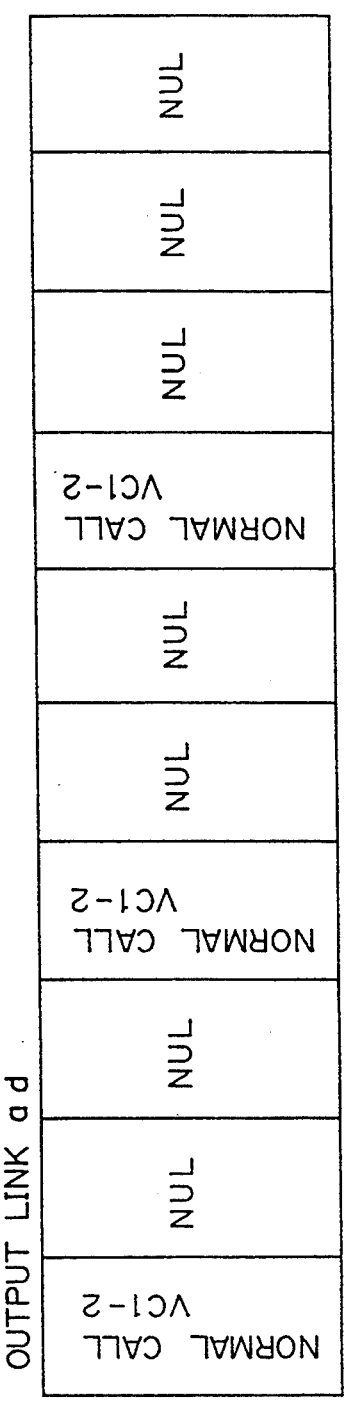

In step S2909, the states of the registers of the buffer read control units 2604 (shown in FIG. 26) for the output links of the initially assigned direct circuit and of a new detour circuit are changed from the states shown in FIGS. 39A, 39B, and 33C to the state shown in FIGS. 41A, 41B, and 41C respectively.

Next, after the processes in step S2910 and S2911, a selection flag for the detour circuit having the VCI=VC1-2 is set in the path-to-circuit correspondence table 2056 in step S2912. As a result, the state of the path-to-circuit correspondence table 2506 is changed from the state shown in FIG. 38D to the state shown in FIG. 40D.

Finally, in step S2913, the available bandwidth in output link ab of the direct circuit is increased by the service bandwidth of 3, that is, the decrement by the detour, and each of the available bandwidths of output link ab and relay links de and eb is reduced by the service bandwidth of 3, that is, the increment by the detour. As a result, the state of the link available bandwidth management table 2504 is changed from the state shown in FIG. 38C to the state shown in FIG. 40C.

In step S2913, the available bandwidth for the detour path having the VPI=VP2 for the new detour circuit having the VCI=VC1-2 in the detour path available bandwidth management table 2505 is reduced by the service bandwidth of 3, that is, the increment by the detour. As a result, the state of the detour path available bandwidth management table 2505 is changed from the state shown in FIG. 38E to the state shown in FIG. 40E.

Normal Call Improving Process in the System according to the 2nd Embodiment

Finally, if a normal call has been detoured in the above described normal call detouring process, and if a request to connect an emergent call has been issued to a direct circuit sharing the same output link with the detour circuit to which the normal call has been detoured, then the service bandwidth of the normal call can be reduced again by the above described emergent call setting process shown in FIG. 28.

In this case, the communication quality of the normal call initially set in the above described direct circuit is deteriorated if necessary after the communication quality of the detoured normal call has been deteriorated first. Thus, the quality of the normal call initially set in the above described direct circuit can be guaranteed to the utmost.

Furthermore, if the communication quality of the detoured normal call is deteriorated, a communication quality improving process is performed to check whether or not it is possible to reassign the normal call to the initially assigned direct circuit.

Figure 30:
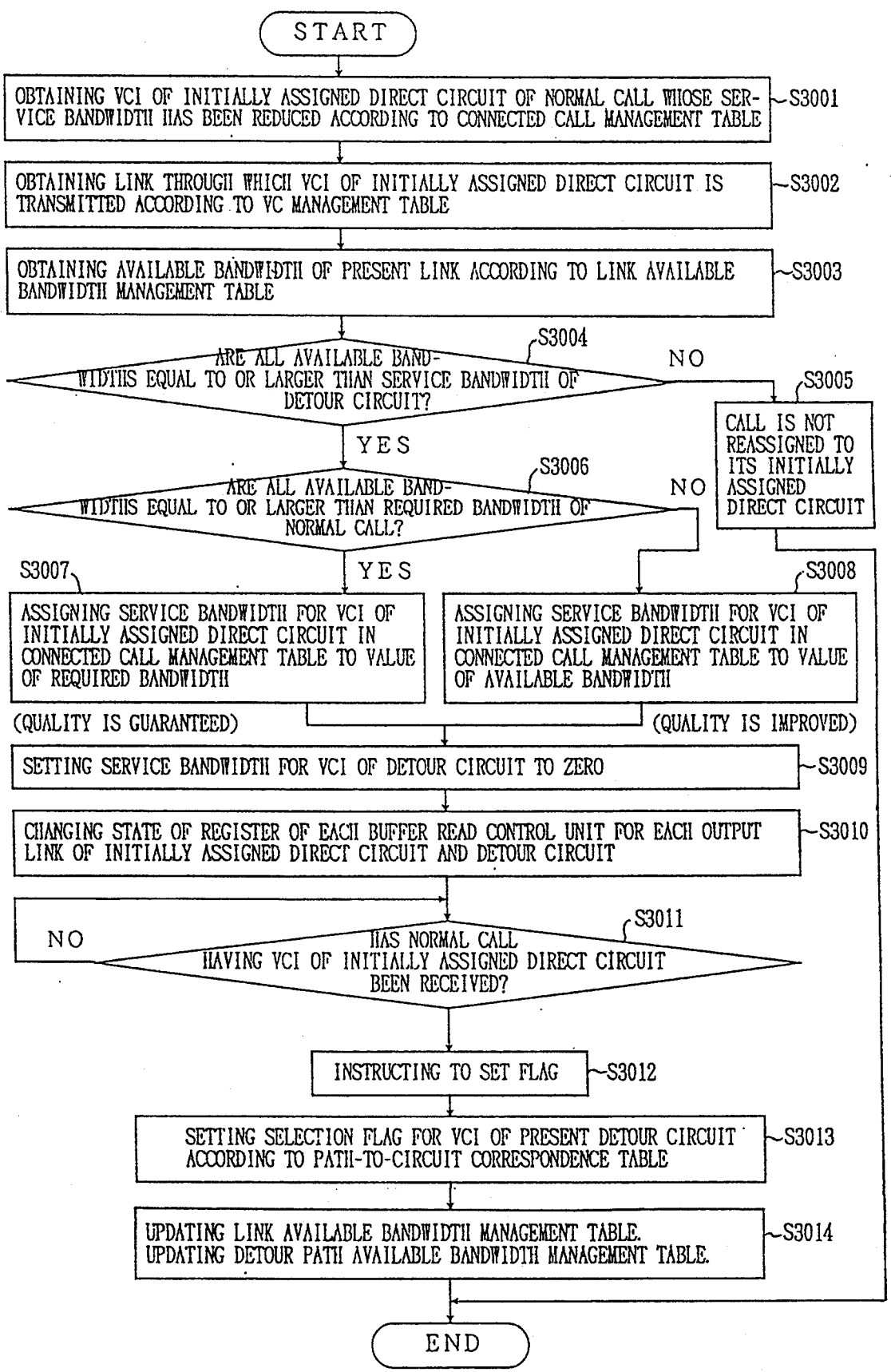
FIG. 30 is the flowchart indicating the operation of improving the communication quality of a normal call according to the second embodiment of the present invention.

FIG. 30 is the flowchart indicating the operation of improving the quality of a normal call, as a program process or a firmware process carried out by the bandwidth control unit 2501 shown in FIG. 25. The operation is explained below by referring to FIG. 30.

First, in step S3001, the VCI of the initially assigned direct circuit of the normal call whose service bandwidth has been reduced in the detour circuit is detected in the connected call management table 2503. If there are a plurality of normal calls, they are sequentially selected in the order from the smallest required bandwidth.

Next, in step S3002, the output link set corresponding to the VCI of the above described initially assigned direct circuit is retrieved from the VC management table 2502. If the direct circuit includes a plurality of nodes and there are a plurality of links forming the direct circuit, all links are retrieved.

In step S3003, the available bandwidth in the output link detected in step S3002 is read from the link available bandwidth management table 2504.

Next, in step S3004, it is determined whether or not all available bandwidths read as described above are equal to or larger than the service bandwidth in the detour circuit of the normal call to be reassigned its initially assigned direct circuit. The service bandwidth of the normal call is read from the connected call management table 2503.

If the determination in step S3004 indicates "No", then the normal call cannot be reassigned its initially assigned direct circuit (step S3005).

If the determination in step S3004 indicates "Yes", then the normal call can be reassigned its initially assigned direct circuit.

In this case, in step S3006, it is determined whether or not all available bandwidths read as described above are equal to or larger than the required bandwidth of the normal call to be reassigned its initially assigned direct circuit. The required bandwidth of the normal call is read from the connected call management table 2503.

If the determination in step S3006 indicates "Yes", the service bandwidth for the VCI of the initially assigned direct circuit in the connected call management table 2503 is set to the value of the required bandwidth of the normal call to be reassigned its initially assigned direct circuit in step S3007.

If the determination in step S3006 indicates "No", the service bandwidth for the VCI of the initially assigned direct circuit in the connected call management table 2503 is set to the minimum value of the available bandwidth obtained in step S3003 in step S3008.

Next, in step S3009, the service bandwidth of the detour circuit is set to 0 in the connected call management table 2503.

In the next step S3010, the state of the register of each buffer read control unit 2604 (shown in FIG. 26) for each output link of the initially assigned direct circuit and the detour circuit is changed.

Next, in step S3011, the bandwidth control unit 2501 shown in FIG. 25 waits for the communication data on the normal call having the VCI of the initially assigned direct circuit received by an input link by monitoring the output of the circuit ID detecting unit 2507.

If the communication data on the normal call have been received and the determination in step S3011 indicates "Yes", then the bandwidth control unit 2501 shown in FIG. 25 outputs a flag set instruction to the flag setting unit 2509 in step S3012. As a result, the flag setting unit 2509 sets a flag in a predetermined data area of the received communication data on the normal call having the VCI of the initially assigned direct circuit. The VCI of the communication data is converted by the circuit ID converting unit 2510 from the VCI of the initially assigned direct circuit to the VCI of the above described detour circuit. As a result, a flag indicating that the present data are the last data in the detour circuit is set in a predetermined data area in the communication data on the normal call having the VCI of the above described detour circuit. The bandwidth control units 2501 of other nodes return the normal call to its initially assigned direct circuit from its detour circuit, by determining in the call receiving process described later whether or not the above described flag has been set in the communication data received by an input link.

Next, in step S3013, a selection flag for the VCI of the above described detour circuit is reset in the path-to-circuit correspondence table 2506.

Finally, in step S3014, the value of the available bandwidth for the output link of the initially assigned direct circuit and the value of the available bandwidth for the output link of the above described detour circuit are updated in the link available bandwidth management table 2504.

In step S3014, if each of the output links of the initially assigned direct circuit and the above described detour circuit are included in the output link or the relay link of any detour circuit is set in the VC management table 2502, then the contents of the detour path available bandwidth management table 2505 for the detour path are updated after the detour path for the detour circuit has been obtained from the path-to-circuit correspondence table 2506.

Afterwards, as described before, the circuit ID converting unit 2510 shown in FIG. 25 determines whether or not the detour circuit for the direct circuit corresponding to the VCI has been selected from the path-to-circuit correspondence table 2506 each time the circuit ID detecting unit 2507 detects a VCI in the communication data on the normal call inputted through an input link. If the selection of a detour circuit has been released in step S3013, then the circuit ID converting unit 2510 stops replacing the VCI of the direct circuit added to the communication data on the normal call inputted through an input link with the VCI of the selected detour circuit. Thus, a normal call can be reassigned to its initially assigned direct circuit from its detour circuit.

Call Receiving Process according to 2nd Embodiment

Next, a call receiving process performed to detour or improve the quality (reassign an initially assigned direct circuit) of a normal call in nodes other than the node in which the normal call is first detoured or improved in quality (reassigned its initially assigned direct circuit) is explained below.

Figure 31:
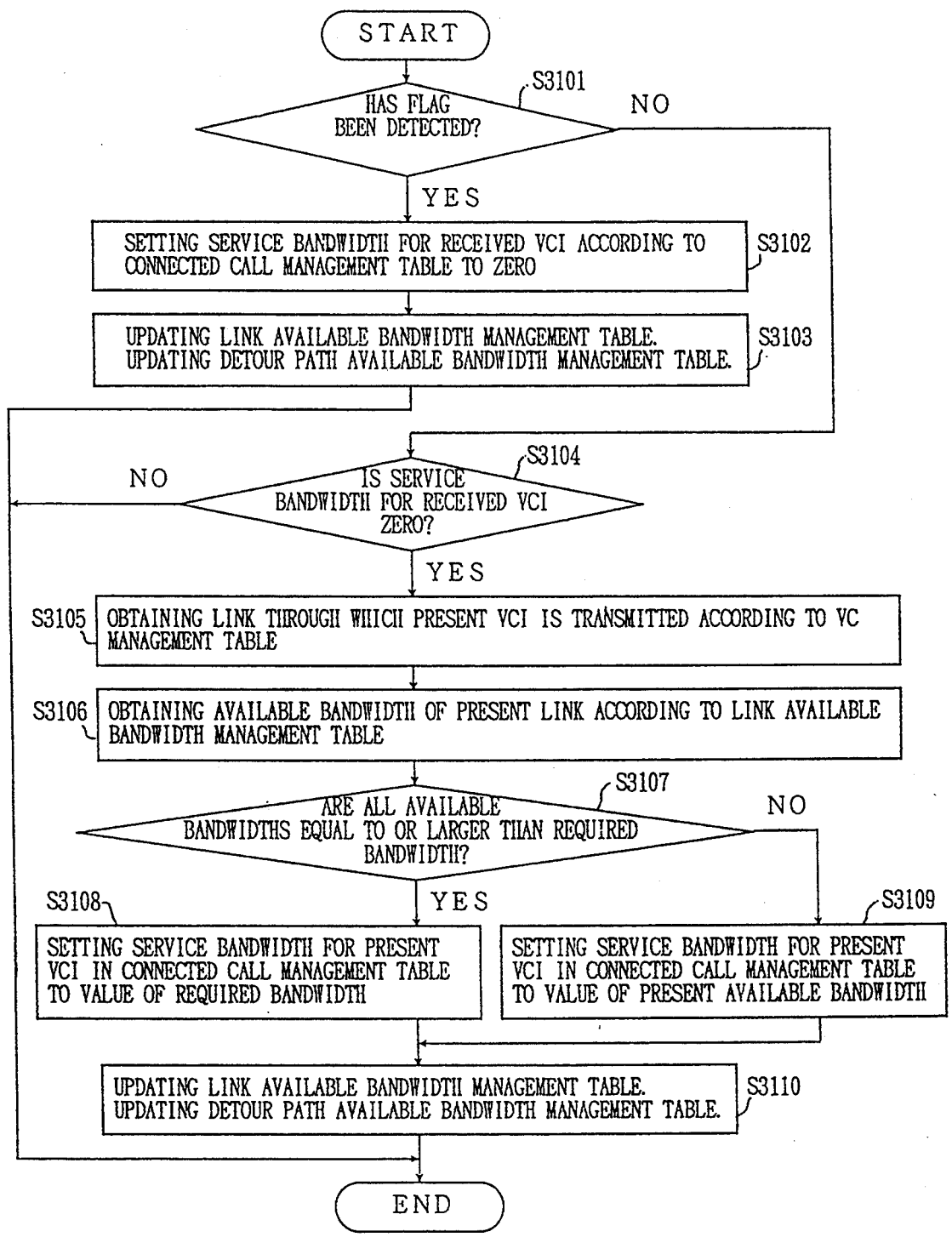
FIG. 31 is the flowchart indicating the operation of receiving a call according to the second embodiment of the present invention.

FIG. 31 is the flowchart indicating the operation of receiving a call carried out as a program process or a firmware process. The operation is explained by referring to FIG. 31.

First, in step S3101, the bandwidth control unit 2501 in a node determines whether or not the flag detecting unit 2508 has detected the above described flag in a predetermined data area of the communication data received by an input link.

As described above, the bandwidth control unit 2501 (shown in FIG. 25) in the first node to detour, improve in terms of quality, or reassign a normal call adds to the last communication data on a normal call received in the circuit a flag indicating that the data are the last in the circuit when detouring a normal call having one VCI from a direct circuit to a detour circuit or reassigning (improving in quality) it from its detour circuit to its initially assigned direct circuit.

In a node other than the first node to detour or improve a normal call, the service bandwidth for the VCI detected by the circuit ID detecting unit 2507 according to the above described communication data is set to zero in the connected call management table 2503 in step S3102 when the above described flag is detected and the determination in step S3101 indicates "Yes". The process corresponds to the process in step S2908 shown in FIG. 29 or in step S3009 shown in FIG. 30 performed by the bandwidth control unit 2501 in the first node to detour or improve a normal call.

In step S3103, the value of the available bandwidth for the output link of the initially assigned direct circuit and the value of the available bandwidth for the output link of a new circuit are updated in the link available bandwidth management table 2504. Furthermore, in step S3103, if each of the output links of the initially assigned direct circuit and a new circuit is included in either the output link or the relay link of any detour circuit set in the VC management table 2502, then the contents of the detour path available bandwidth management table 2505 for the detour path corresponding to the detour circuit are updated after the detour path has been obtained from the path-to-circuit correspondence table 2506. The process corresponds to the process in step S2913 shown in FIG. 29 or in step S3014 shown in FIG. 30, as performed by the bandwidth control unit 2501 in the first node to detour or improve a normal call.

According to the processes in step S3102 and S3103, the communication in the initially assigned direct circuit of a normal call is terminated in a node other than the first node to detour or improve a normal call.

Next, if the above described flag is not detected and the determination in step S3101 indicates "No", then it is determined whether of not the service bandwidth for the VCI detected by the circuit ID detecting unit 2507 in the communication data received by an input link should indicate "0" in step S3104.

If the communication data transmitted through a new circuit from the first node to detour or improve a normal call have first arrived at a node other than the above described first node, then the service bandwidth for the VCI of the new circuit remains in the connected call management table 2503 in the node other than the first node.

In a node other than the first node to detour or improve a normal call, if the determination in step S3104 indicates "Yes", then a link set corresponding to the VCI detected in the above described received communication data is retrieved from the VC management table 2502 in step S3105. If the circuit includes a plurality of nodes and there are a plurality of links forming the circuits, then all links are retrieved. The process corresponds to the process in step S3002 shown in FIG. 30 as performed by the bandwidth control unit 2501 in the first node to detour or improve a normal call.

Next, in step S3106, the available bandwidth of the link detected in step S3002 is read from the link available bandwidth management table 2504. The process corresponds to the process in step S3003 shown in FIG. 30 performed by the bandwidth control unit 2501 in the first node to detour or improve a normal call.

Furthermore, in step S3107, it is determined whether or not the available bandwidths read as described above (all available bandwidths) are equal to or larger than the required bandwidth for the VCI detected in the above described received communication data. The required bandwidth is read from the connected call management table 2503. The process corresponds to the process in step S3006 shown in FIG. 30 as performed by the bandwidth control unit 2501 in the first node to detour or improve a normal call.

If the determination in step S3107 indicates "Yes", the service bandwidth for the VCI detected in the above described received communication data in the connected call management table 2503 is set to the value of the required bandwidth for the VCI in step S3108. The process corresponds to the process in step S2908 shown in FIG. 29 or in step S3007 shown in FIG. 30 performed by the bandwidth control unit 2501 in the first node to detour or improve a normal call.

If the determination in step S3107 indicates "No", the service bandwidth for the VCI in the connected call management table 2503 and detected in the above described received communication data is set in step S3109 to the minimum value of the available bandwidth obtained in step S3106. The process corresponds to the process in step S3008 shown in FIG. 30 performed by the bandwidth control unit 2501 in the first node to detour or improve a normal call.

Then, in step S3110, the value of the available bandwidth for the output link of the initially assigned direct circuit and the value of the available bandwidth for the output link of a new circuit are updated in the link available bandwidth management table 2504. Further, in step S3103, if each of the output links of the initially assigned direct circuit and a new circuit are included in the output link or the relay link of any detour circuit set in the VC management table 2502, then the contents of the detour path available bandwidth management table 2505 for the detour path are updated after the detour path for the detour circuit has been obtained from the path-to-circuit correspondence table 2506. The process corresponds to the process in step S2913 shown in FIG. 29 or in step S3014 shown in FIG. 30 performed by the bandwidth control unit 2501 in the first node to detour or improve a normal call.

According to the processes in steps S3104 through 3110, the communication state in a new circuit can be set in a node other than the first node to detour or improve a normal call.

Communication Data Sequential Arrival Guaranteeing Process in the System according to the 2nd Embodiment If a normal call is detoured from its direct circuit to a detour circuit, or if the normal call is reassigned from its detour circuit to its initially assigned direct circuit according to the above described normal call detouring process, the normal call improving process, or the call receiving process, then the following problem can arise undesirably.

That is, if the buffer waiting time in the normal call buffer 2602 shown in FIG. 26 for the output link of the circuit used before the detouring process or the reassigning process (improving process) is longer than the buffer waiting time in the normal call buffer 2602 for the output link used after the detouring process or the reassigning process, then the communication data to be handled in the detouring process or the reassigning process both remain in the normal call buffer 602 connected to the output link of the circuit used before the detouring process. Alternatively, the reassigning process may arrive at a destination node later than the communication data to be handled in the detouring process or the reassigning process and transmitted through a new circuit immediately after the detouring process or the reassigning process. When the communication data to be handled in the detouring process or the reassigning process both remain in the normal buffer 602 connected to the output link of the circuit used immediately before the detouring process, the reassigning process maybe transmitted to the destination node through the circuit.

That is, the communication data sent before may arrive later than the communication data sent later, thereby failing to maintain the sequence for the entire communication data.

Figure 42:
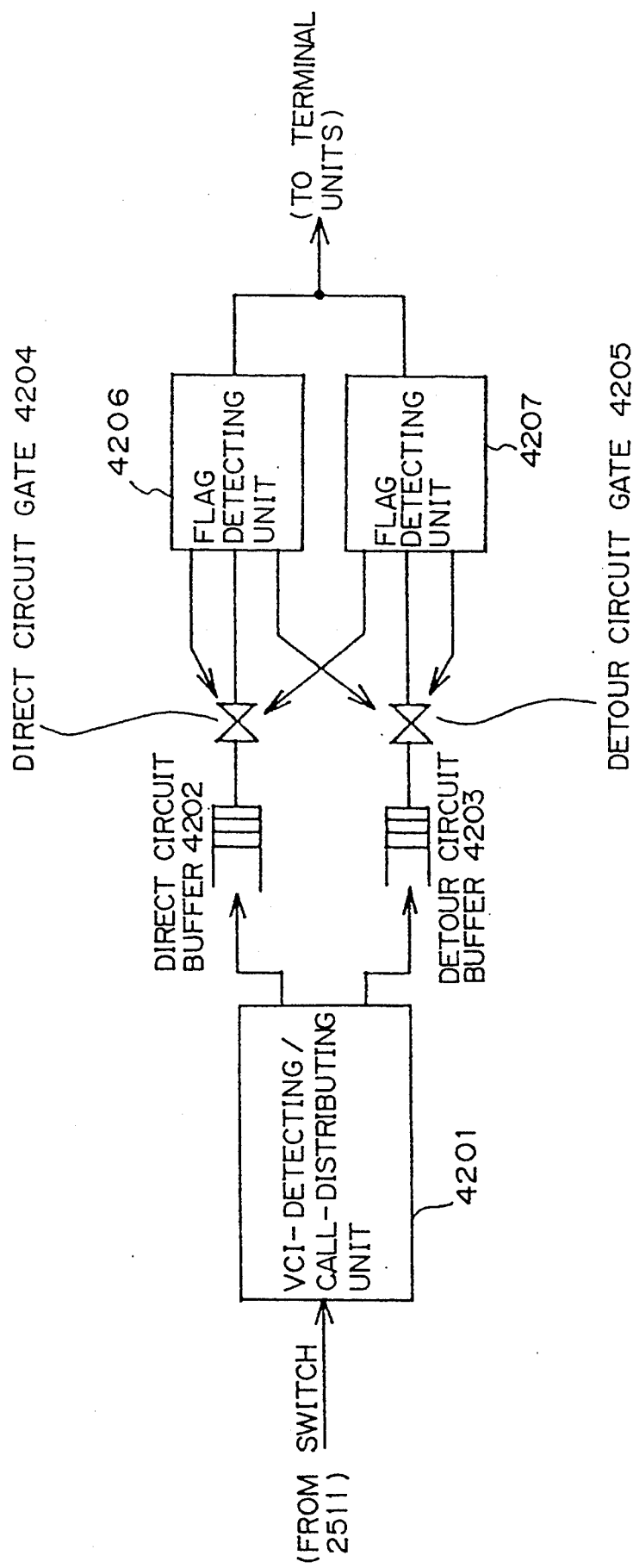
FIG. 42 shows the configuration of one embodiment of an terminal input unit for guaranteeing the sequential arrival of communication data, according to the second embodiment of the present invention.

To prevent this, a configuration is designed between the switch 2511 shown in FIG. 25 and an input unit to a terminal unit (not shown in FIG. 25), so as to guarantee the sequential arrival of communication data as shown in FIG. 42.

First, a VCI detecting/call distributing unit 4201 writes the communication data in a direct circuit buffer 4202 for the source node of the communication data when the VCI refers to that of a direct circuit, and writes the communication data in a detour circuit buffer 4203 for the source node of the communication data when the VCI refers to that of a detour circuit by determining the VCI added to the communication data to be sent to a terminal unit and applied from through the switch 2511.

For example, if communication data are transmitted from one source node through a direct circuit, then a direct circuit gate 4204 for the source node is open, while a detour circuit gate 4205 for the source node is closed.

In this state, a flag detecting unit 4206 reads communication data in association with the source node, from the direct circuit buffer 4202 through the direct circuit gate 4204, and applies them to a terminal unit. At this time, the flag detecting unit 4206 determines whether or not the above described flag is set in the communication data.

As described above, the bandwidth control unit 2501 (shown in FIG. 25) in the first node to detour or improve a normal call adds to the communication data of the last normal call in the circuit, a flag indicating that the data is the last in the circuit, when the normal call is detoured from a direct circuit to a detour circuit or reassigned (improved) to its initially assigned direct circuit from its detour circuit.

When the flag detecting unit 4206 detects that the above described flag is set for communication data, it closes the direct circuit gate 4204, and opens the detour circuit gate 4205 for the above described source node. As a result, in association with the source node, communication data can be controlled to be sequentially applied to a terminal unit, so that communication data can be applied to the terminal unit through a new detour circuit from the detour circuit buffer 4203 after the last communication data have been applied to a terminal unit from the direct circuit buffer 4202 through a direct circuit.

On the other hand, for example, if communication data is transmitted through a detour circuit in association with a source node, the detour circuit gate 4205 for the source node is remaining open, while the direct circuit gate 4204 for the source node is closed.

In this state, in association with the above described source node, a flag detecting unit 4207 reads communication data from the detour circuit buffer 4203 through the detour circuit gate 4205 and applies them to a terminal unit. At this time, the flag detecting unit 4207 determines whether or not the communication data is provided with the above described flag.

Then, when the flag detecting unit 4207 detects that a flag is set for communication data, it closes the detour circuit gate 4205 for the above described source node, and opens the direct circuit gate 4204 for the above described source node. As a result, communication data can be controlled in an entry order to a terminal unit, such that the communication data are applied from the direct circuit buffer 4202 to a terminal unit through a direct circuit after the last communication data, to be transmitted through the detour circuit having been applied from the detour circuit buffer 4203 to a terminal unit in association with the above described source node.

Thus, the sequential arrival of communication data on a normal call to be handled in a detouring process or a reassigning process can be guaranteed.

Detouring Process of a Normal Call in which it can be simultaneously detoured to a plurality of detour circuits of the System according to the 2nd Embodiment Next, a normal call detouring process in which a normal call can be simultaneously detoured to a plurality of detour circuits is explained below. The process is performed when the service bandwidth of a normal call is reduced by the above described emergent call setting process, and the normal call should be detoured to a detour circuit.

In the normal call detouring process performed according to the operational flowchart shown in FIG. 29, a normal call is detoured to a detour circuit having an available bandwidth equal in size to the required bandwidth of the normal call to be detoured. By contrast, in the following detouring process, a normal call is detoured from a direct circuit to a plurality of detour circuits collectively having an available bandwidth to meet the requirement of the required bandwidth of the normal call to be detoured.

To realize this, the path-to-circuit correspondence table 2506 shown in FIG. 44 is used. The table shows the extension of the configuration shown in FIG. 32D.

Figure 43:
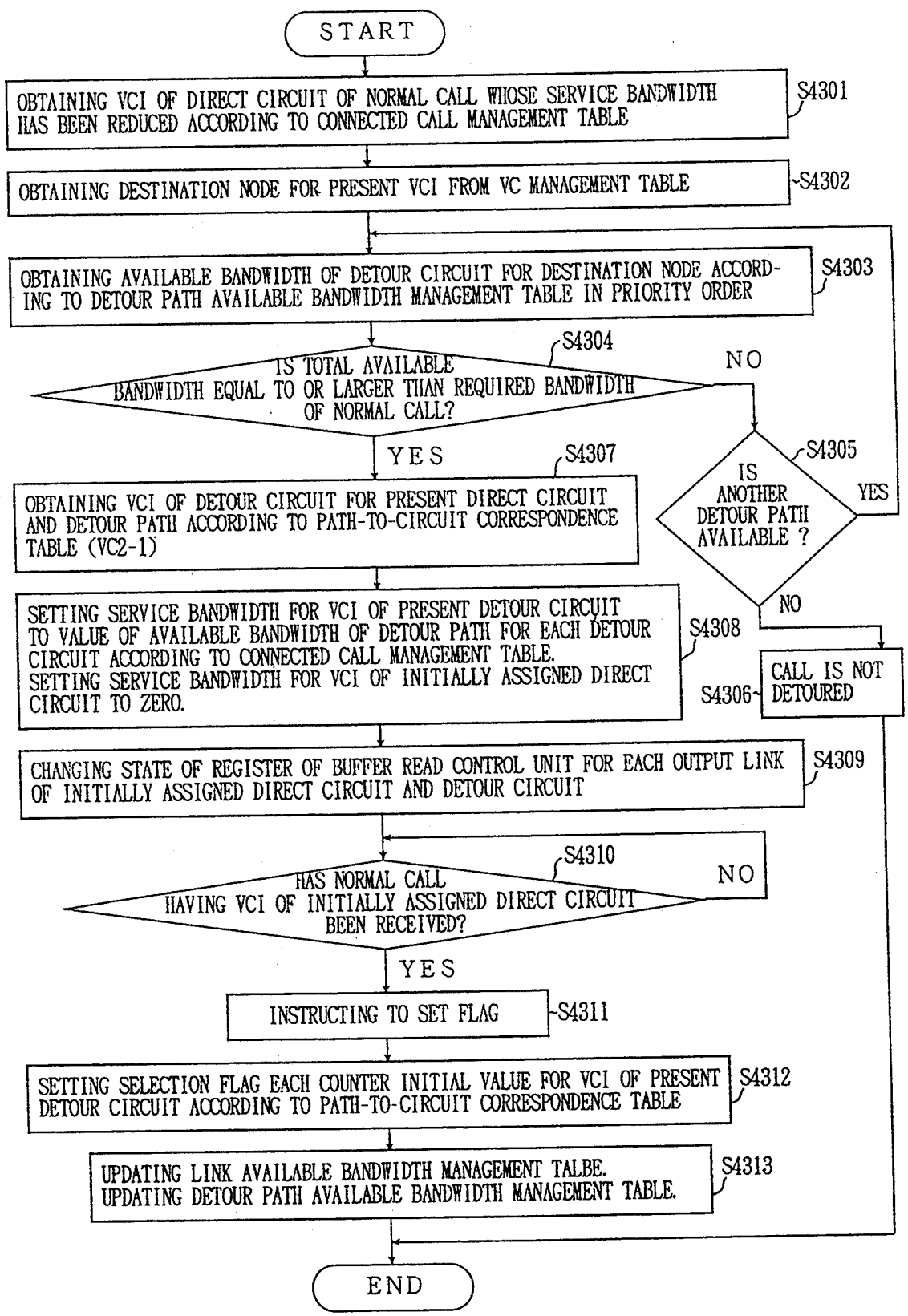
FIG. 43 is the flowchart indicating the operation of detouring a normal call requesting to be simultaneously detoured to a plurality of detour circuits, according to the second embodiment of the present invention.

FIG. 43 is a flowchart indicating the normal call detouring process performed as a program process or a firmware process carried out by the bandwidth control unit 2501 shown in FIG. 25, in which a normal call can be detoured simultaneously to a plurality of detour circuits. The process is explained below by referring to FIG. 43. The sequence in the operational flowchart corresponds to that shown in FIG. 29.

First, in step S4301, the VCI of the direct circuit of a normal call whose service bandwidth has been reduced is detected. If there are a plurality of normal calls whose service bandwidths have been reduced, then they are selected sequentially from the one having the smallest required bandwidth.

Next, in step S4302, a destination node for the VCI of the direct circuit is retrieved from the VC management table 2502.

Then, in step S4303, the available bandwidth of a detour path for the above described destination node is obtained from the detour path available bandwidth management table 2505 according to the priority level set for each detour circuit in the above described table.

Next, in step S4304, it is determined whether or not the sum of the available bandwidths of the present detour paths is equal to or larger than the required bandwidth of a normal call to be detoured. The required bandwidth of the normal call is read from the connected call management table 2503.

If the determination in step S4304 indicates "No", it is determined in step S4305 whether or not another detour path is set in the detour path available bandwidth management table 2505 for the destination node obtained in step S4302. If the determination indicates "Yes", the above described processes in step S4303 and S4304 are repeatedly performed. If the determination in step S4305 indicates "No", the normal call cannot be detoured (step S4306).

If the determination in step S4304 indicates "Yes", the normal call can be detoured to a plurality of detour paths.

In this case, the VCI of the direct circuit and each detour circuit for each of one or more detour paths can be obtained from the path-to-circuit correspondence table 2506 in step S4307.

Next, in step S4308, the service bandwidth corresponding to each VCI of one or more detour circuits in the connected call management table 2503 is set to the available bandwidth of each detour path obtained in step 4303 for each detour circuit. The service bandwidth of the initially assigned direct circuit is set to "0".

In the next step S4309, the state of the register of each buffer read control unit 2604 (shown in FIG. 26) for each of the output links of the initially assigned direct circuit and one or more new detour circuits is changed.

Next, in step S4310, the bandwidth control unit 2501 shown in FIG. 25 waits for the reception at an input link of the communication data of the normal call having the VCI of the initially assigned direct circuit.

If the communication data of the normal call has been received and the determination in step S4310 indicates "Yes", then the bandwidth control unit 2501 shown in FIG. 25 outputs a flag set instruction to the flag setting unit 2509 in step S4311. As a result, the flag setting unit 2509 sets in a predetermined data area of the communication data of the normal call having the VCI of the initially assigned direct circuit, a flag indicating that the data is the last in the direct circuit. The bandwidth control units 2501 in other nodes, detour a normal call by determining whether or not the above described flag is set in the communication data received by an input link in the call receiving process indicated by the operational flowchart shown in FIG. 31.

Figure 45:
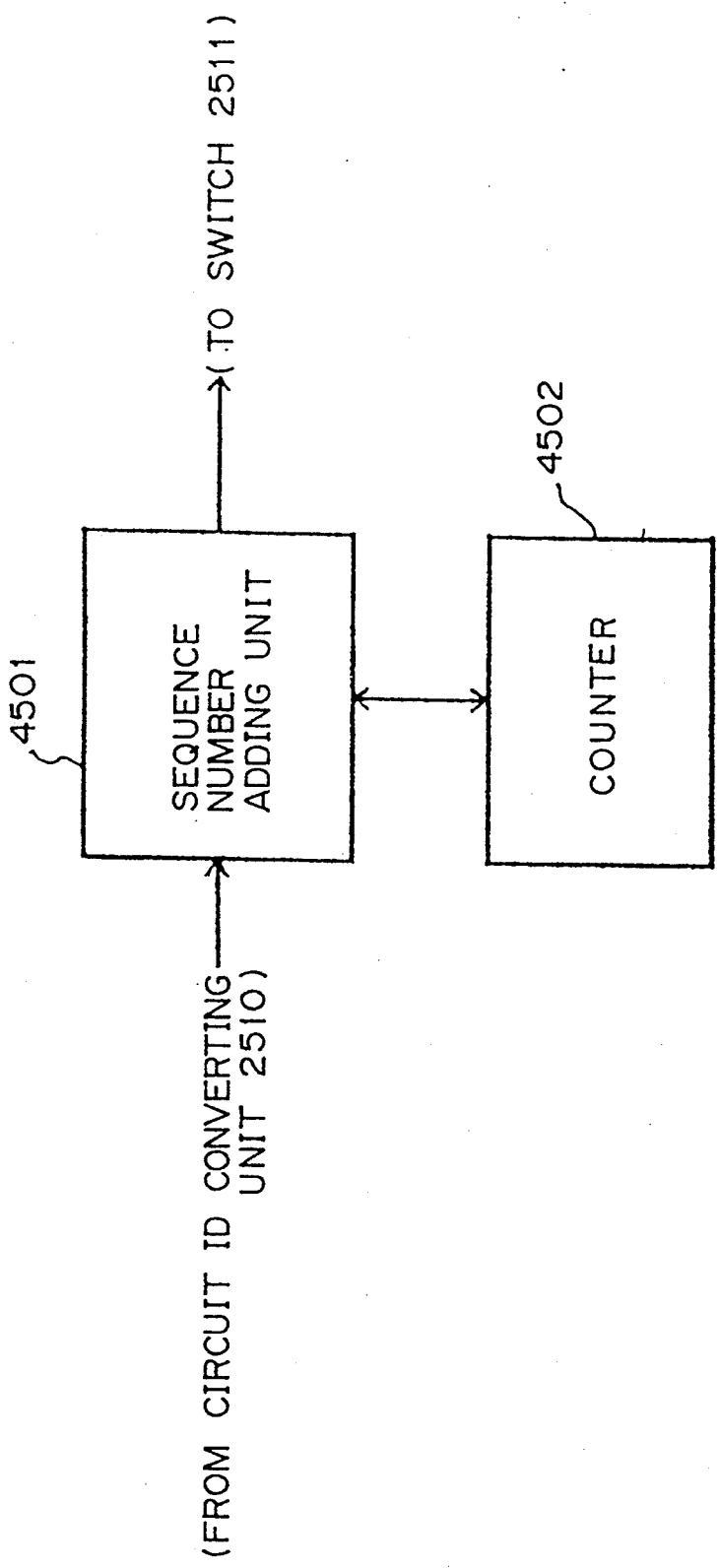
FIG. 45 shows the configuration of the sequence number adding unit according to the second embodiment of the present invention.

Next, in step S4312, each selection flag for each VCI of one or more detour circuits referred to in step S4307 is set in the path-to-circuit correspondence table 2506. Additionally, in the path-to-circuit correspondence table 2506, as shown in FIG. 45, for example, the initial value of a counter is set for each detour circuit according to the ratio of the available bandwidth in each detour path, and then, the present counter value is set for the leading detour path.

Finally, in step S4313, the value of the available bandwidth for the output link of the initially assigned direct circuit and the value of each available bandwidth for each output link of one or more new detour circuits are updated in the link available bandwidth management table 2504.

In step S4313, if each of the output links of the initially assigned direct circuit and one or more detour circuits is included in the output link or the relay link of any detour circuit set in the VC management table 2502, then the contents of the detour path available bandwidth management table 2505 for the detour path are updated after the detour path for the detour circuit has been obtained from the path-to-circuit correspondence table 2506.

After the above described normal call detouring process, the circuit ID converting unit 2510 determines whether or not the detour circuit is selected for the direct circuit for the VCI in the path-to-circuit correspondence table 2506 each time the circuit ID detecting unit 2507 detects a VCI from the communication data of a normal call applied through an input link.

If it is selected, the circuit ID converting unit 2510 replaces the VCI of the direct circuit added to the communication data of a normal call applied through an input link with the VCI of the detour circuit indicated by the present flag in the path-to-circuit correspondence table 2506, and outputs the communication data of the normal call to the switch 2511.

Simultaneously, the circuit ID converting unit 2510 decrements by 1 the present value of the counter of the detour circuit indicated by the present flag in the path-to-circuit correspondence table 2506. As a result, when the present value of the counter becomes "0", the circuit ID converting unit 2510 sets the position of the present flag in the path-to-circuit correspondence table 2506 to the value indicating the position of a selected detour circuit, and sets the present value of the counter for the detour circuit to the initial counter value for the detour circuit. For example, in FIG. 44, if the present counter value of the detour circuit having the VCI VC1-1 becomes "0", then the position of the present flag is set to the value indicating the position of the detour circuit having the VCI VC1-2, and the present counter value for the detour circuit is set to the initial counter value of 3. When the present counter value of the detour circuit having the VCI=VC1-2 becomes "0", the position of the present flag is set to the value indicating the position of the detour circuit having the VCI=VC1-3, and the present counter value for the detour circuit is set to the initial counter value of 2. Moreover, when the present counter value of the detour circuit having the VCI=VC1−3 becomes "0", the position of the present flag is set to the value indicating the position of the detour circuit having the VCI=VC1-1 again, and the present counter value for the detour circuit is set to the initial counter value of 2.

Thus, the circuit ID converting unit 2510 can distribute a normal call having the VCI of the corresponding direct circuit to one or more detour circuits selected according to the path-to-circuit correspondence table 2506, based on the ratio of an initial counter value assigned to each of the detour circuits.

If a normal call is handled in a normal call detouring process in which the normal call can be detoured to a plurality of detour circuits, and if a request is made to connect an emergent call to the direct circuit sharing the same output link with the detour circuit, then the service bandwidth of the normal call can be reduced again by the emergent call setting process shown in FIG. 28. In this case, as in the normal call improving process indicated by the operational flowchart shown in FIG. 30, the normal call can be handled in a communication quality improving process which tries to reassign the normal call to its initially assigned direct circuit.

The detailed explanation of the process can be easily obtained by extending the basic process indicated by the operational flowchart shown in FIG. 30 such that it is applied to a process using a plurality of detour circuits, and can be omitted here.

Process of Guaranteeing Sequential Arrival of Communication Data in the System according to the 2nd Embodiment According to the normal call detouring process in which a normal call can be detoured to a plurality of detour circuits or according to the corresponding normal call quality improving process or the call receiving process, communication data sent earlier, can arrive at its destination node later than the communication data sent later as described above by referring to the configuration shown in FIG. 42 when a normal call is detoured from its direct circuit to a detour circuit or when the normal call is reassigned from the detour circuit to its initially assigned direct circuit, the sequence of communication data is disturbed.

Figure 46:
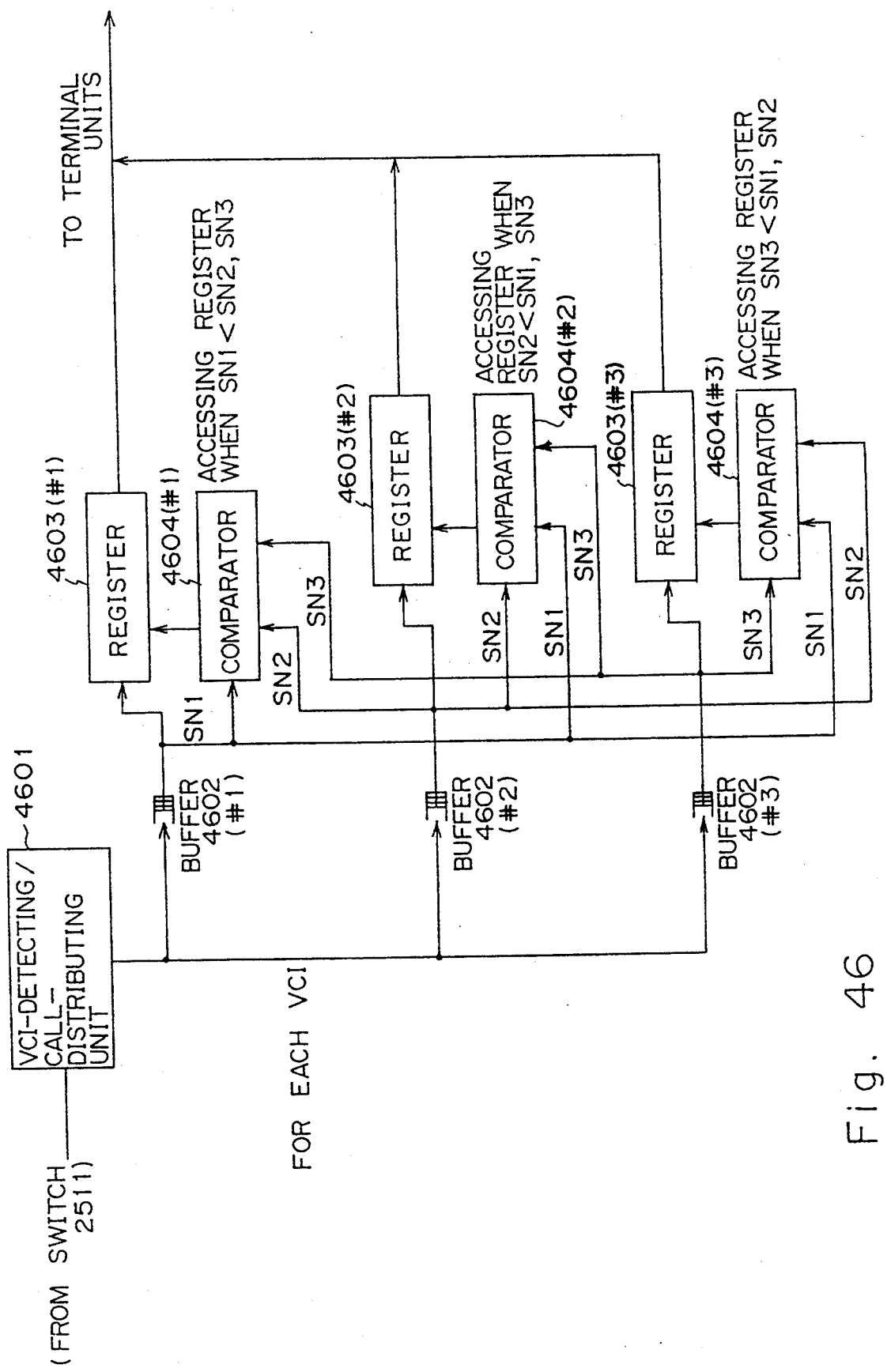
FIG. 46 shows the configuration of another embodiment of the terminal input unit for guaranteeing the sequential arrival of communications data, according to the second embodiment of the present invention.

To prevent such a problem, a structure comprising a sequence number adding unit 4501 and a counter 4502 is provided between the circuit ID converting unit 2510 shown in FIG. 25 and the switch 2511, and a structure for guaranteeing the sequential arrival of communication data shown in FIG. 46 is provided in the input unit for entering data from the switch 2511 shown in FIG. 25 to a terminal unit.

In the configuration shown in FIG. 45, the sequence number adding unit 4501 adds a counter value outputted by the counter 4502 as a sequence number in an ascending order to a predetermined data area of the communication data outputted by the circuit ID converting unit 2510.

In a node accommodating a destination node, a VCI detecting/call distributing unit 4601 determines a VCI added to the communication data addressed to the terminal unit and applied through the switch 2511, and writes the data to different buffers 4602 according to the VCIs (for example, #1–#3 in FIG. 46)

The communication data written in the buffer 4602 and sequentially stored in a register 4603 provided corresponding to each buffer and in the order of earlier arrival at each buffer. A comparator 4604 is provided for each buffer 4602. If the sequence number added to the communication data read from each buffer 4602 is the smallest in all sequence numbers added to the communication data read from other buffers 4602, then the register 4603 for the comparator 4604 is accessed and the communication data stored in the register are applied to a terminal unit. Then, the register 4603 stores the subsequent communication data from the corresponding buffer 4602.

Thus, communication data are applied to a terminal unit in the order of sequence number, and their sequence is guaranteed.

Practical Operation (1) of Deteriorating Communication Quality in the System according to the 2nd Embodiment According to an emergent call setting process performed by deteriorating the quality of a normal call (refer to the operational flowchart shown in FIG. 28), the rate of selection by the selector 2603 an output of the normal call buffer 2602 is lowered when an emergent call is set. As a result, a normal call is delayed after the increment in the amount of delay in the normal call buffer 2602 shown in FIG. 26, while an output of the emergent call buffer 2601 is selected by the selector 2603 at a rate determined according to a required bandwidth, thereby guaranteeing the quality of the emergent call.

In addition to the classification to normal calls and emergent calls, normal calls can be further classified into high priority calls and low priority calls. Low priority calls can be immediately discarded in a deteriorating process, and information can be temporarily interrupted in communications. A practical example of the low priority calls is background music to be outputted in factories.

Figure 47:
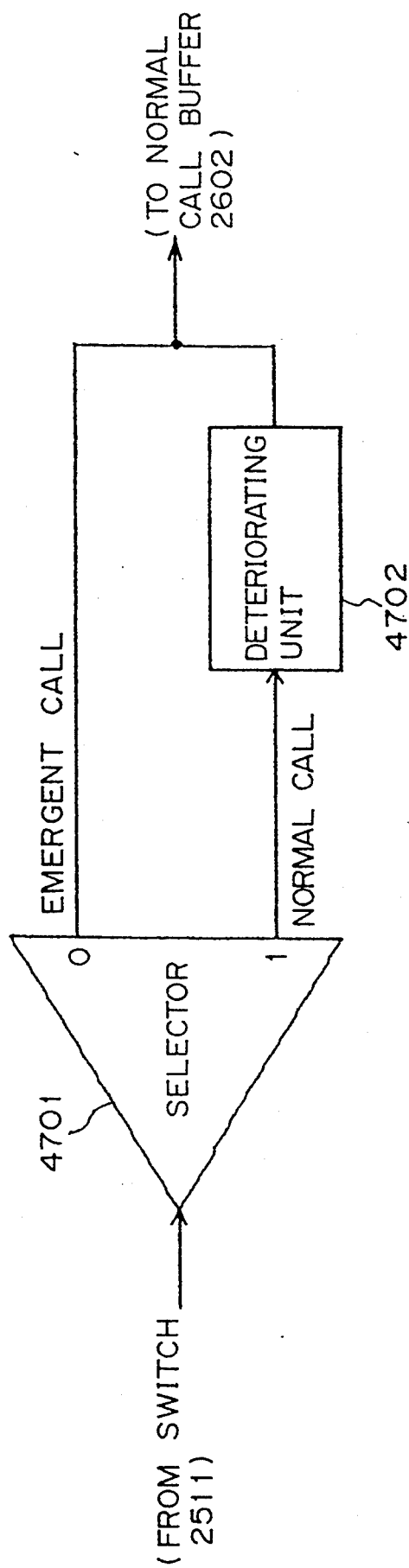
FIG. 47 shows the configuration (1) of the deteriorating unit according to the second embodiment of the present invention.

To perform different deteriorating processes separately on low priority calls and high priority calls, the structure shown in FIG. 47 is provided between the switch 2511 and the normal call buffer 2602 in the output link corresponding unit shown in FIG. 26 provided in the switch 2511.

First, in a predetermined area of communication data, a flag is set such that it indicates 1 if data is assigned a low priority level, and indicates 0 if they are assigned a high priority level.

In FIG. 47, a selector 4701 outputs communication data to the normal call buffer 2602 shown in FIG. 26 as if the received communication data are provided with the flag indicated 0. As a result, high-priority normal calls among all normal calls are handled only in the deteriorating process.

On the other hand, the selector 4701 outputs communication data to a deteriorating unit 4702 if the received communication data is provided with the flag indicating 1. The deteriorating unit 4702 discards communication data comprising only of low-priority normal calls among all normal calls, if the normal calls are handled in the deteriorating process according to the operational flowchart shown in FIG. 28 in which the service bandwidth of a normal call is reduced.

Practical Operation (2) of Deteriorating Communication Quality in the System according to the 2nd Embodiment Among the above described high-priority normal calls, some can be considered to be easily discarded, while others should not be easily discarded, but be only deteriorated and handled as delayed calls. The former refers to information, such as general conversation, providing no great problems for receivers even if a part of the information is discarded. On the other hand, the latter refers to information such as computer data.

Figure 48:
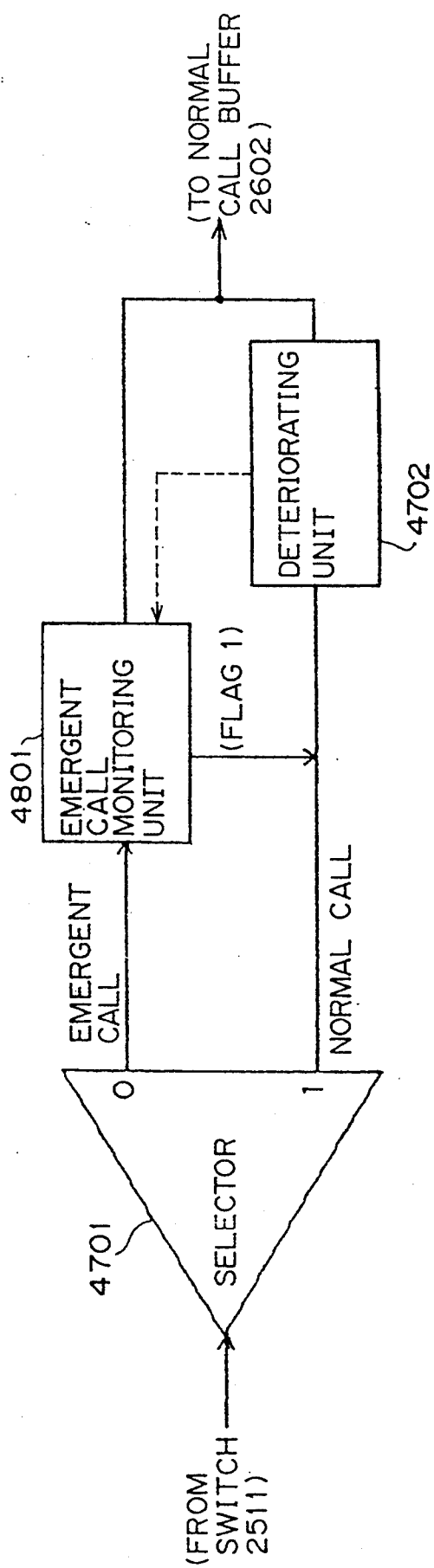
FIG. 48 shows the configuration (2) of the deteriorating unit according to the second embodiment of the present invention.

As shown in FIG. 48, a high-priority call monitoring unit 4801 for monitoring high-priority calls is provided in addition to the selector 4702 and the deteriorating unit 4702 shown in FIG. 47. The high-priority call monitoring unit 4801 sets for high-priority calls a flag, indicating a low-priority call for the number of calls to be deteriorated, and outputs the high-priority calls to the deteriorating unit 4702 if normal calls cannot be sufficiently deteriorated when the normal calls are handled in the deteriorating process according to the operational flowchart shown in FIG. 28 in which the service bandwidth of a normal call is reduced. As a result, the deteriorating unit 4702 discards the high-priority calls in communication data.

If it is not desirable to discard the communication data of high-priority calls, they should be detoured from a direct circuit to a detour circuit in the normal call detouring process according to, for example, the operational flowchart shown in FIG. 29.

If it is not necessary to delay high-priority calls, the structure shown in FIG. 48 does not have to be provided between the switch and the internal buffer 2602 of the output link corresponding unit shown in FIG. 26, but can be provided in the input link.

Thus, an appropriate deteriorating process can be performed on low- and high-priority calls.

Explanation of Other Embodiments

In the 1st and 2nd embodiments, a communication quality improving process, in which an already detoured normal call is reassigned on trial to its initially assigned direct circuit, is performed when the service bandwidth of the normal call is reduced in the detour circuit. However, the present invention is not limited to this application, the reassignment can be performed unconditionally, after the detouring process, for example.

According to the above described embodiment, the VC management table 2502, the link available bandwidth management table 2504, the path-to-circuit correspondence table 2506, and the detour path available management table 2505 are provided for each node. However, the present invention is not limited to this configuration, but can, for example, comprise these tables in a specific node only, and have each of the other nodes issue an inquiry to the node so as to refer to these tables.

What is claimed is:

1. A call accommodation system for accommodating high-priority emergent calls and normal calls in a mixed state, comprising a plurality of communication nodes, each communication node comprising:

connected call managing means for individually managing a bandwidth of each call accommodated in said node; and normal call communication deteriorating means for deteriorating the communication quality of a normal call connected to a node thereof by referring to or controlling said connected call managing means, when an emergent call is set so that a required bandwidth of said emergent call can be successfully reserved.

2. The call accommodation system according to claim 1, wherein each communication node further comprises:

circuit managing means for managing each circuit in a network;

available bandwidth managing means for managing an available bandwidth in each link in a network; and normal call detouring means for obtaining a detour circuit to be reserved for a normal call deteriorated in communication quality by said normal call communication deteriorating means by referring to or controlling said connected call managing means, said circuit managing means, and said available bandwidth managing means, and for assigning the normal call to an appropriate detour circuit on detecting said appropriate detour circuit.

3. The call accommodation system according to claim 2, wherein each communication node further comprises:

normal call setting means for setting in said connected call managing means a direct circuit having a service bandwidth sufficient to meet the requirement of a normal call when it is set, and for predetermining in said connected call managing means a detour circuit having a service bandwidth of 0, wherein said normal call detouring means refers to the detour circuit predetermined in said connected call managing means, when the normal call should be detoured.

4. The call accommodation system according to claim 3, wherein said normal call detouring means sends detour instruction data to the direct circuit initially assigned to a normal call;

on receiving the detour instruction data, said normal call detouring means of each node connected to the initially assigned circuit sets to 0, the service bandwidth of the direct circuit managed by said connected call managing means;

said normal call detouring means sends detour setting data to a detour circuit of the normal call; and on receiving the detour setting data, said normal call detouring means of each communication node connected to the detour circuit sets the service bandwidth of the detour circuit managed by said connected call managing means to the value of the required bandwidth of the normal call.

5. The call accommodation system according to claim 2, wherein each communication node further comprises:

normal call sequential arrival guaranteeing means for obtaining, when a normal call is detoured, the delay of the time taken in the transmission from a source node of a normal call to a destination node, and for delaying, by the obtained value, the timing at which the communication data on the normal call is transmitted to a detour circuit.

6. The call accommodation system according to claim 2, wherein when a new emergent call is set in a direct circuit after a normal call was detoured to a detour circuit an output line of which is shared with said direct circuit, said normal call communication deteriorating means deteriorates the communication quality of the normal call which had been detoured to the detour circuit, when another normal call was assigned the direct circuit.

7. The call accommodation system according to claim 2, wherein each communication node further comprises:

normal call reassigning means for trying to reserve a required bandwidth of a normal call in an initially assigned direct circuit, by reassigning the normal call to the direct circuit after the normal call has been detoured.

8. The call accommodation system according to claim 2, wherein each communication node further comprises:

normal call reassigning means for comparing the service bandwidth of a detoured normal call with the available bandwidth in said initially assigned direct circuit, after the communication quality of the detoured normal call is deteriorated in the detour circuit by said normal call communication deteriorating means, and for reassigning the normal call to said initially assigned direct circuit such that the service bandwidth of the normal call is smaller than the available bandwidth in said initially assigned direct circuit by referring to or controlling said connected call managing means, said circuit managing means, and said available bandwidth managing means if the available bandwidth is larger than the service bandwidth.

9. A call accommodation system for accommodating high-priority emergent calls and normal calls in a mixed state, comprising a plurality of communication nodes, each communication node comprising:

detour circuit managing means for managing one or more detour circuits for each of the normal calls being connected to said communication nodes; and normal call detouring means for determining a detour circuit required to reserve a required bandwidth of the normal call from among one or more detour circuits managed by said detour circuit managing means, and for detouring the normal call to the detour circuit when an emergent call is set and a normal call should be detoured.

10. The call accommodation system according to claim 9, wherein each node further comprises:

identification information adding means for adding to the last normal call to be sent via a circuit assigned before said last normal call is detoured to its detour circuit, the identification information indicating that the normal call is the last data in the circuit before the detour when a normal call is detoured to a detour circuit; and a terminal unit having an input portion;

the input portion of the terminal unit accommodated in each node including:

circuit information detecting means for detecting circuit information identifying each source node in a received normal call;

direct circuit buffer means, provided for each source node identified by said circuit information, for sequentially storing the normal call when said circuit information detecting means receives a normal call assigned to a direct circuit associated with the source node;

detour circuit buffer means, provided for each source node identified by said circuit information, for sequentially storing a normal call when said circuit information detecting means receives the normal call assigned to a detour circuit associated with the source node;

direct circuit gate means, provided at an output portion of said direct circuit buffer means, for receiving a normal call from said direct circuit buffer means to a respective terminal unit;

detour circuit gate means, provided at an output portion of said detour circuit buffer means, for receiving a normal call from said detour circuit gate buffer means to a respective terminal unit; and first gate control means, provided at an output portion of said direct circuit gate means, for closing said direct circuit gate means and opening said detour circuit gate means, if identification information is added to a normal call to be received by a terminal from said direct circuit buffer means through said direct circuit gate means when said direct circuit gate means is open.

11. The call accommodation system according to claim 9, wherein said detour circuit managing means for managing one or more detour circuits for each normal call together with a priority level assigned to each normal call in the order from the smallest number of nodes included in each detour circuit; and said normal call detouring means determines according to priority levels, one or more detour circuits, from among one or more detour circuits managed by said detour circuit managing means for the normal call.

12. The call accommodation system according to claim 9, further comprising:

normal call setting means, provided for each node, for setting as the circuit of a normal call, a direct circuit having a service bandwidth enough to meet the requirement of the required bandwidth of the normal call when the normal call is set and for simultaneously assigning to the normal call a detour circuit having a service bandwidth of 0, wherein said normal call detouring means detours a normal call by setting to 0 the service bandwidth of the circuit assigned to the normal call before the detour by said normal call setting means, and by setting a predetermined bandwidth to the value of the service bandwidth of the detour circuit of the detoured normal call.

13. The call accommodation system according to claim 12, wherein said normal call detouring means detours a normal call, when the normal call is received from an external node, to a detour circuit by setting a predetermined bandwidth to the value of its service bandwidth if, the service bandwidth of the circuit of the received normal call managed by said normal call setting means is "0".

14. The call accommodation system according to claim 12, further comprising:

identification information adding means, provided for each node, for adding, when a normal call is detoured to the last normal call to be sent via the circuit assigned before it has detoured the identification information indicating that the normal call is the last data in the circuit assigned before the detour, wherein on receiving from an external node a normal call provided with identification information, said normal call detouring means detours the normal call to a detour circuit by setting to 0, the service bandwidth of the circuit of the received normal call managed by said normal call setting means.

15. The call accommodation system according to claim 9, further comprising:

normal call reassigning means, provided for each node, for trying to reassign the normal call to its initially assigned direct circuit and satisfy the requirement of the required bandwidth of the normal call in the direct circuit after a normal call has been detoured.

16. The call accommodation system according to claim 15, further comprising:

identification information adding means, provided for each node, for adding to the last normal call to be sent via the circuit assigned before it is reassigned to its initially assigned direct circuit, the identification information indicating that the normal call is the last data in the circuit before the reassignment when a normal call is reassigned to it initially assigned direct circuit, and further comprising in an input portion of a terminal unit accommodated in each node:

circuit information detecting means for detecting circuit information identifying each source node in a received normal call;

direct circuit buffer means, provided for each source node identified by circuit information, for sequentially storing the normal call when said circuit information detecting means receives the normal call assigned to a direct circuit associated with the source node;

detour circuit buffer means, provided for each source node identified by circuit information, for sequentially storing a normal call when said circuit information detecting means receives the normal call assigned to a detour circuit associated with the source node;

direct circuit gate means, provided at an output portion of said direct circuit buffer means, for receiving a normal call from said direct circuit buffer means to a terminal unit;

detour circuit gate means, provided at an output portion of said detour circuit buffer means, for receiving a normal call from said detour circuit gate buffer means to a terminal unit; and second gate control means, provided at an output portion of said detour circuit gate means, for closing said detour circuit gate means and opening said direct circuit gate means, if identification information is added to a normal call to be received by a terminal from said detour circuit buffer means through said detour circuit gate means, when said detour circuit gate means is open.

17. The call accommodation system according to claim 15, further comprising:

normal call setting means, provided for each node, for setting as a circuit of a normal call a direct circuit having a service bandwidth enough to meet the requirement of the required bandwidth of the normal call when the normal call is set, and for simultaneously assigning to the normal call a detour circuit having a service bandwidth of 0, wherein said normal call detouring means detours a normal call by setting to 0 the service bandwidth of the circuit assigned to the normal call before the detour by said normal call setting means, and by setting a predetermined bandwidth to the value of the service bandwidth of the detour circuit of the detoured normal call; and said normal call reassigning means, reassigns said normal call to its initially assigned direct circuit by setting to "0"the service bandwidth of the detour circuit, set by said normal call setting means, of said normal call before being reassigned, and by setting to the value of a predetermined bandwidth the service bandwidth of the direct circuit of said normal call after the reassignment.

18. The call accommodation system according to claim 17, wherein said normal call detouring means detours the normal call, when a normal call is received from an external node, to a detour circuit by setting a predetermined bandwidth to the value of its service bandwidth, if the service bandwidth of the circuit of the received normal call managed by said normal call setting means is "0"; and said normal call reassigning means reassigns said normal call to its initially assigned direct circuit by setting said service bandwidth to the value of a predetermined bandwidth, if the service bandwidth of the direct circuit of said received normal call set by said normal call setting means is "0" when said normal call is received from said external node.

19. The call accommodation system according to claim 17, further comprising:

identification information adding means, provided for each node, for adding to the last normal call to be sent via the circuit assigned before it is detoured to its detour circuit or reassigned to its initially assigned direct circuit the identification information indicating that the normal call is the last data in the circuit before the detour or the reassignment when the normal call is detoured to a detour circuit or reassigned to its initially assigned direct circuit, wherein said normal call detouring means detours a normal call to a detour circuit by setting to 0 the service bandwidth of the circuit of the received normal call managed by said normal call setting means, when the normal call provided with identification information is received from an external node; and said normal call reassigning means, reassigns said normal call to its initially assigned direct circuit when it receives said normal call provided with said identification information from said external node by setting to "0" the service bandwidth of the detour circuit, set by said normal call setting means, of said normal call.

20. A call accommodation system having a plurality of communication nodes for accommodating high-priority emergent calls and normal calls in a mixed state, comprising in each communication node:

detour circuit managing means, for managing one or more detour circuits for each of the normal calls connected to said node;

normal call detouring means for detouring a normal call to a detour circuit after determining one or more detour circuits required to reserve a required bandwidth of the normal call in total, from among one or more detour circuits managed by said detour circuit managing means when the emergent call is set and a normal call should be detoured; and call distributively outputting means, for outputting a normal call to one or more detour circuits determined by said normal call detouring means, after distributing it at a rate appropriate for the bandwidth available in each detour circuit.

21. The call accommodation system according to claim 20, each node further comprising:

order information adding means, for adding order information to a normal call outputted by said call distributively outputting means; and order guaranteeing means, provided at the input portion of a terminal unit accommodated in each node, for receiving a normal call and having the terminal unit receive it in due order according to the order information added to the normal call.

22. The call accommodation system according to claim 20, wherein said detour circuit managing means for managing one or more detour circuits for each normal call together with a priority level assigned to each normal call in the order from the smallest number of nodes included in each detour circuit; and said normal call detouring means determines according to priority levels, one or more detour circuits from among one or more detour circuits managed by said detour circuit managing means, for the normal call.

23. The call accommodation system according to claim 20, further comprising:

normal call setting means, provided for each node, for setting as the circuit of a normal call, a direct circuit having a service bandwidth enough to meet the requirement of the required bandwidth of the normal call when it is set, and for simultaneously assigning to the normal call a detour circuit having a service bandwidth of 0, wherein said normal call detouring means detours a normal call by setting to 0 the service bandwidth of the circuit assigned to the normal call before the detour by said normal call setting means, and by setting a predetermined bandwidth to the value of the service bandwidth of the detour circuit of the detoured normal call.

24. The call accommodation system according to claim 23, wherein said normal call detouring means detours a normal call, when the normal call is received from an external node, to a detour circuit by setting a predetermined bandwidth to the value of its service bandwidth if, the service bandwidth of the circuit of the received normal call managed by said normal call setting means is "0".

25. The call accommodation system according to claim 23, further comprising:

identification information adding means, provided for each node, for adding, when a normal call is detoured, to the last normal call to be sent via the circuit assigned before it is detoured the identification information indicating that the normal call is the last data in the circuit assigned before the detour, wherein on receiving from an external node a normal call provided with identification information, said normal call detouring means detours the normal call to a detour circuit by setting to 0 the service bandwidth of the circuit of the received normal call managed by said normal call setting means.

26. The call accommodation system according to claim 20, further comprising:

normal call reassigning means, provided for each node, for trying to reassign the normal call to its initially assigned direct circuit and satisfy the requirement of the required bandwidth of the normal call in the direct circuit after a normal call has been detoured.

27. The call accommodation system according to claim 26, further comprising:

normal call setting means, provided for each node, for setting as a circuit of a normal call a direct circuit having a service bandwidth enough to meet the requirement of the required bandwidth of the normal call when the normal call is set, and for simultaneously assigning to the normal call a detour circuit having a service bandwidth of 0, wherein said normal call detouring means detours a normal call by setting to 0 the service bandwidth of the circuit assigned to the normal call before the detour by said normal call setting means, and by setting a predetermined bandwidth to the value of the service bandwidth of the detour circuit of the detoured normal call; and said normal call reassigning means reassigns said normal call to its initially assigned direct circuit by setting to "0" the service bandwidth of the detour circuit, set by said normal call setting means, of said normal call before being reassigned, and by setting to the value of a predetermined bandwidth the service bandwidth of the direct circuit of said normal call after the reassignment.

28. The call accommodation system according to claim 27, wherein said normal call detouring means detours a normal call, when the normal call is received from an external node, to a detour circuit by setting a predetermined bandwidth to the value of its service bandwidth if the service bandwidth of the circuit of the received normal call managed by said normal call setting means is "0"; and said normal call reassigning means reassigns said normal call to its initially assigned direct circuit by setting said service bandwidth to the value of a predetermined bandwidth if the service bandwidth of the direct circuit of said received normal call set by said normal call setting means is "0" when said normal call is received from said external node.

29. The call accommodation system according to claim 27, further comprising:

identification information adding means, provided for each node, for adding to the last normal call to be sent via the circuit assigned before it is detoured to its detour circuit or reassigned to its initially assigned direct circuit the identification information indicating that the normal call is the last data in the circuit before the detour or the reassignment when the normal call is detoured to a detour circuit or reassigned to its initially assigned direct circuit, wherein said normal call detouring means detours a normal call to a detour circuit by setting to 0 the service bandwidth of the circuit of the received normal call managed by said normal call setting means when the normal call provided with identification information is received from an external node; and said normal call reassigning means reassigns said normal call to its initially assigned direct circuit when it receives said normal call provided with said identification information from said external node by setting to "0" the service bandwidth of the detour circuit, set by said normal call setting means, of said normal call.

30. A call accommodation system having a plurality of communication nodes, for accommodating high-priority emergent calls and normal calls in a mixed state, said normal call being further assigned a high or low priority level, comprising in each communication node:

connected call managing means for individually managing a bandwidth of each call accommodated in said communication node; and deteriorating means for deteriorating, when an emergent call is set, the quality of a normal call having a lower level first by decreasing the bandwidth of the normal call when any normal call should be deteriorated in communication quality.

31. A call accommodation system having a plurality of communication nodes, for accommodating high-priority emergent calls and normal calls in a mixed state, said normal call being further assigned a high or low priority level, each communication node comprising:

detour circuit managing means for one or more detour circuit; and normal call detouring means for detouring, when an emergent call is set and a normal call should be detoured, a normal call having a higher priority level first after determining a detour circuit to meet the requirement of the required bandwidth of the normal call from among one or more detour circuits managed by said detour circuit managing means for the normal call.

* * * * *